US008512143B2

(12) United States Patent
Jung et al.

(10) Patent No.: US 8,512,143 B2
(45) Date of Patent: Aug. 20, 2013

(54) THIRD PARTY CONTROL OVER VIRTUAL WORLD CHARACTERS

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 938 days.

(21) Appl. No.: 11/184,567

(22) Filed: Jul. 18, 2005

(65) Prior Publication Data

US 2007/0013692 A1   Jan. 18, 2007

(51) Int. Cl.
*H04N 7/167* (2011.01)
*G06F 3/00* (2006.01)

(52) U.S. Cl.
USPC ............... 463/42; 380/200; 725/34; 725/46; 345/745

(58) Field of Classification Search
USPC .......................................................... 463/42
See application file for complete search history.

(56) References Cited

U.S. PATENT DOCUMENTS

| | | |
|---|---|---|
| 4,569,526 A | 2/1986 | Hamilton |
| 5,008,853 A | 4/1991 | Bly et al. |
| 5,192,854 A | 3/1993 | Counts |
| 5,203,848 A | 4/1993 | Wang |
| 5,220,657 A | 6/1993 | Bly et al. |
| 5,241,466 A | 8/1993 | Perry et al. |
| 5,261,045 A | 11/1993 | Scully et al. |
| 5,323,315 A | 6/1994 | Highbloom |
| 5,333,868 A | 8/1994 | Goldfarb |
| 5,337,407 A | 8/1994 | Bates et al. |
| 5,388,196 A | 2/1995 | Pajak et al. |
| 5,513,129 A | 4/1996 | Bolas et al. |
| 5,643,088 A | 7/1997 | Vaughn et al. |

(Continued)

FOREIGN PATENT DOCUMENTS

| | | |
|---|---|---|
| EP | 1 326 170 | 7/2003 |
| JP | 11143944 A | 5/1999 |

(Continued)

OTHER PUBLICATIONS

Burgess, Jed, Jahr, Michael, Keljo, Jonathan, Schroeder, Josh and Sweitzer, Wilson: "Controlling the Virtual World: Governance of On-Line Communities." Stanford University, 1999 http://www-cse.stanford.edu/classes/cs201/projects-98-99/controlling-the-virtual-world/case/index.html.*

(Continued)

Primary Examiner — Paul A D'Agostino

(57) ABSTRACT

A method and system provides arrangements creating a relationship between a real-world entity and a virtual world environment. A participant or player can participate in various virtual world experiences including activities, settings, events, purchases, sales and diverse transactions to acquire virtual products, virtual services, and/or virtual items of value. Feedback may be provided and records kept regarding the virtual world participation. In some circumstances, multiple persons can participate as a group or participate as individuals in the virtual world environment. Some embodiments provide an oversight procedure that enables a supervisory entity to exercise direct or indirect control over certain virtual world aspects of a participant or player. In some implementations the oversight procedure is at least partially based on an attribute related to the participant or player.

15 Claims, 58 Drawing Sheets

(56) References Cited

U.S. PATENT DOCUMENTS

| | | |
|---|---|---|
| 5,651,117 A | 7/1997 | Arbuckle |
| 5,696,965 A | 12/1997 | Dedrick |
| 5,788,574 A | 8/1998 | Ornstein et al. |
| 5,791,991 A | 8/1998 | Small |
| 5,795,228 A | 8/1998 | Trumbull et al. |
| 5,802,296 A | 9/1998 | Morse et al. |
| 5,806,045 A | 9/1998 | Biorge et al. |
| 5,808,612 A | 9/1998 | Merrick et al. |
| 5,823,879 A | 10/1998 | Goldberg et al. |
| 5,870,030 A | 2/1999 | DeLuca et al. |
| 5,884,029 A | 3/1999 | Brush, II et al. |
| 5,890,995 A | 4/1999 | Bobick et al. |
| 5,926,179 A | 7/1999 | Matsuda et al. |
| 5,937,391 A | 8/1999 | Ikeda et al. |
| 5,938,196 A | 8/1999 | Antoja |
| 5,946,664 A | 8/1999 | Ebisawa |
| 5,956,038 A | 9/1999 | Rekimoto |
| 5,956,700 A | 9/1999 | Landry |
| 5,964,660 A | 10/1999 | James et al. |
| 5,964,661 A | 10/1999 | Dodge |
| 5,978,780 A | 11/1999 | Watson |
| 5,983,003 A | 11/1999 | Lection et al. |
| 5,983,196 A | 11/1999 | Wendkos |
| 6,009,458 A | 12/1999 | Hawkins et al. |
| 6,024,643 A | 2/2000 | Begis |
| 6,036,601 A | 3/2000 | Heckel |
| 6,057,856 A | 5/2000 | Miyashita et al. |
| 6,106,395 A | 8/2000 | Begis |
| 6,119,229 A | 9/2000 | Martinez et al. |
| 6,135,646 A | 10/2000 | Kahn et al. |
| 6,152,856 A | 11/2000 | Studor et al. |
| 6,246,991 B1 | 6/2001 | Abe et al. |
| 6,251,017 B1 | 6/2001 | Leason et al. |
| 6,253,193 B1 | 6/2001 | Ginter et al. |
| 6,267,675 B1 | 7/2001 | Lee |
| 6,282,522 B1 | 8/2001 | Davis et al. |
| 6,298,374 B1 | 10/2001 | Sasaki et al. |
| 6,330,547 B1 | 12/2001 | Martin |
| 6,332,127 B1 | 12/2001 | Bandera et al. |
| 6,375,466 B1 | 4/2002 | Juranovic |
| 6,380,952 B1 | 4/2002 | Mass et al. |
| 6,396,509 B1 | 5/2002 | Cheng |
| 6,450,407 B1 | 9/2002 | Freeman et al. |
| 6,467,686 B1 | 10/2002 | Guthrie et al. |
| 6,476,830 B1 | 11/2002 | Farmer et al. |
| 6,505,773 B1 | 1/2003 | Palmer et al. |
| 6,523,829 B1 | 2/2003 | Walker et al. |
| 6,545,682 B1 | 4/2003 | Ventrella et al. |
| 6,571,216 B1 | 5/2003 | Garg et al. |
| 6,591,250 B1 | 7/2003 | Johnson et al. |
| 6,609,970 B1 | 8/2003 | Luciano, Jr. |
| 6,616,533 B1 | 9/2003 | Rashkovskiy |
| 6,625,578 B2 | 9/2003 | Spaur et al. |
| 6,632,142 B2 | 10/2003 | Keith |
| 6,643,751 B2 | 11/2003 | Rosenquist et al. |
| 6,663,105 B1 | 12/2003 | Sullivan et al. |
| 6,672,961 B1 | 1/2004 | Uzun |
| 6,726,427 B2 | 4/2004 | Jarvis et al. |
| 6,729,884 B1 | 5/2004 | Kelton et al. |
| 6,769,691 B1 | 8/2004 | Kim |
| 6,791,549 B2 | 9/2004 | Hubrecht et al. |
| 6,793,580 B2 | 9/2004 | Sinclair et al. |
| 6,850,643 B1 | 2/2005 | Smith et al. |
| 6,884,166 B2 | 4/2005 | Leen et al. |
| 6,935,952 B2 | 8/2005 | Walker et al. |
| 6,950,169 B2 | 9/2005 | Ma et al. |
| 6,954,728 B1 | 10/2005 | Kusumoto et al. |
| 6,965,868 B1 | 11/2005 | Bednarek |
| 7,020,632 B1 | 3/2006 | Kohls et al. |
| 7,036,082 B1 | 4/2006 | Dalrymple et al. |
| 7,054,830 B1 | 5/2006 | Eggleston et al. |
| 7,055,740 B1 | 6/2006 | Schultz et al. |
| 7,115,034 B2 | 10/2006 | Kuwahara |
| 7,124,088 B2 | 10/2006 | Bauer et al. |
| 7,147,562 B2 | 12/2006 | Ohara et al. |
| 7,169,051 B1 | 1/2007 | Mossbarger |
| 7,169,501 B2 | 1/2007 | Suganuma et al. |
| 7,228,260 B2 | 6/2007 | Fujino et al. |
| 7,249,139 B2 | 7/2007 | Chuah et al. |
| 7,275,987 B2 | 10/2007 | Shimakawa et al. |
| 7,289,130 B1 | 10/2007 | Satoh et al. |
| 7,319,992 B2 | 1/2008 | Gaos |
| 7,333,943 B1 | 2/2008 | Charuk et al. |
| 7,373,377 B2 | 5/2008 | Altieri |
| 7,455,221 B2 | 11/2008 | Shaeffer |
| 7,483,857 B2 | 1/2009 | Bansal et al. |
| 7,494,416 B2 | 2/2009 | Walker et al. |
| 7,523,486 B1 | 4/2009 | Turner |
| 7,593,864 B2 | 9/2009 | Shuster |
| 7,614,944 B1 | 11/2009 | Hughes et al. |
| 7,620,592 B2 | 11/2009 | O'Mara et al. |
| 7,660,778 B1 | 2/2010 | Nichols |
| 7,672,884 B2 | 3/2010 | Schuster et al. |
| 7,690,997 B2 | 4/2010 | Van Luchene et al. |
| 7,698,178 B2 | 4/2010 | Chu |
| 7,722,453 B2 | 5/2010 | Lark et al. |
| 7,865,566 B2 | 1/2011 | Ashtekar et al. |
| 7,901,288 B2 | 3/2011 | Barsness et al. |
| 7,908,554 B1 | 3/2011 | Blattner |
| 7,913,176 B1 | 3/2011 | Blattner et al. |
| 2001/0027430 A1 | 10/2001 | Sabourian |
| 2001/0037316 A1 | 11/2001 | Shiloh |
| 2001/0040341 A1 | 11/2001 | Kamille |
| 2001/0047328 A1 | 11/2001 | Triola |
| 2001/0054003 A1 | 12/2001 | Chien et al. |
| 2001/0056383 A1 | 12/2001 | Shuster |
| 2001/0056399 A1 | 12/2001 | Saylors |
| 2002/0013722 A1 | 1/2002 | Kanaga |
| 2002/0016655 A1 | 2/2002 | Joao |
| 2002/0019744 A1 | 2/2002 | Yamamoto |
| 2002/0022516 A1 | 2/2002 | Forden |
| 2002/0029252 A1 | 3/2002 | Segan et al. |
| 2002/0032037 A1 | 3/2002 | Segawa |
| 2002/0073043 A1 | 6/2002 | Herman et al. |
| 2002/0087465 A1 | 7/2002 | Ganesan et al. |
| 2002/0090985 A1 | 7/2002 | Tochner et al. |
| 2002/0091635 A1 | 7/2002 | Dilip et al. |
| 2002/0095375 A1 | 7/2002 | Taneda et al. |
| 2002/0095523 A1 | 7/2002 | Shimakawa et al. |
| 2002/0107756 A1 | 8/2002 | Hammons et al. |
| 2002/0113809 A1 | 8/2002 | Akazawa et al. |
| 2002/0120935 A1 | 8/2002 | Huber et al. |
| 2002/0125312 A1 | 9/2002 | Ogilvie |
| 2002/0128952 A1 | 9/2002 | Melkomian et al. |
| 2002/0138445 A1 | 9/2002 | Laage et al. |
| 2002/0142841 A1 | 10/2002 | Boushy |
| 2002/0142842 A1 | 10/2002 | Easley et al. |
| 2002/0147669 A1 | 10/2002 | Taylor et al. |
| 2002/0152155 A1 | 10/2002 | Greenwood et al. |
| 2002/0152156 A1 | 10/2002 | Tyson-Quah |
| 2002/0174055 A1 | 11/2002 | Dick et al. |
| 2002/0178054 A1 | 11/2002 | Ader |
| 2002/0178120 A1 | 11/2002 | Reid et al. |
| 2002/0186244 A1 | 12/2002 | Matsuda et al. |
| 2002/0188760 A1 | 12/2002 | Kuwahara |
| 2002/0198735 A1 | 12/2002 | Tolbert |
| 2003/0014266 A1 | 1/2003 | Brown et al. |
| 2003/0014423 A1 | 1/2003 | Chuah et al. |
| 2003/0036987 A1 | 2/2003 | Omiya |
| 2003/0037101 A1 | 2/2003 | Torabi |
| 2003/0046689 A1 | 3/2003 | Gaos |
| 2003/0064807 A1 | 4/2003 | Walker et al. |
| 2003/0069787 A1 | 4/2003 | Tendon et al. |
| 2003/0097331 A1 | 5/2003 | Cohen |
| 2003/0105688 A1 | 6/2003 | Brown et al. |
| 2003/0107173 A1 | 6/2003 | Satloff et al. |
| 2003/0115132 A1 | 6/2003 | Iggland |
| 2003/0118575 A1 | 6/2003 | Grob et al. |
| 2003/0144940 A1 | 7/2003 | Kochansky et al. |
| 2003/0154092 A1 | 8/2003 | Bouron et al. |
| 2003/0155715 A1 | 8/2003 | Walker et al. |
| 2003/0156134 A1 | 8/2003 | Kim |
| 2003/0187768 A1 | 10/2003 | Ryan et al. |
| 2003/0207237 A1 | 11/2003 | Glezerman |

| | | | |
|---|---|---|---|
| 2003/0216184 A1 | 11/2003 | Kigoshi | |
| 2004/0051718 A1 | 3/2004 | Bennett et al. | |
| 2004/0058731 A1 | 3/2004 | Rossides | |
| 2004/0073488 A1 | 4/2004 | Etuk et al. | |
| 2004/0082377 A1 | 4/2004 | Seelig et al. | |
| 2004/0128518 A1 | 7/2004 | Cavers et al. | |
| 2004/0133472 A1 | 7/2004 | Leason et al. | |
| 2004/0148221 A1 | 7/2004 | Chu | |
| 2004/0158492 A1 | 8/2004 | Lopez et al. | |
| 2004/0220850 A1 | 11/2004 | Ferrer et al. | |
| 2005/0021472 A1 | 1/2005 | Gettman et al. | |
| 2005/0043094 A1 | 2/2005 | Nguyen et al. | |
| 2005/0051965 A1 | 3/2005 | Gururajan | |
| 2005/0055296 A1 | 3/2005 | Hattersley et al. | |
| 2005/0059480 A1 | 3/2005 | Soukup et al. | |
| 2005/0060260 A1 | 3/2005 | Masuda et al. | |
| 2005/0086069 A1 | 4/2005 | Watson et al. | |
| 2005/0086605 A1 | 4/2005 | Ferrer et al. | |
| 2005/0137015 A1 | 6/2005 | Rogers et al. | |
| 2005/0137904 A1 | 6/2005 | Lane et al. | |
| 2005/0148388 A1 | 7/2005 | Vayra et al. | |
| 2005/0153766 A1 | 7/2005 | Harmon | |
| 2005/0153771 A1 | 7/2005 | Ghela | |
| 2005/0170883 A1 | 8/2005 | Muskin | |
| 2005/0177492 A1 | 8/2005 | Camping | |
| 2005/0182693 A1 | 8/2005 | Alivandi | |
| 2005/0192071 A1 | 9/2005 | Matsuno et al. | |
| 2005/0203835 A1 | 9/2005 | Nhaissi et al. | |
| 2005/0216346 A1 | 9/2005 | Kusumoto et al. | |
| 2005/0235008 A1 | 10/2005 | Camping et al. | |
| 2005/0288963 A1 | 12/2005 | Parrish | |
| 2006/0026044 A1 | 2/2006 | Smith, Jr. | |
| 2006/0080613 A1 | 4/2006 | Savant | |
| 2006/0111934 A1 | 5/2006 | Meggs | |
| 2006/0206376 A1 | 9/2006 | Gibbs et al. | |
| 2006/0224480 A1 | 10/2006 | Bent et al. | |
| 2006/0234795 A1 | 10/2006 | Dhunjishaw et al. | |
| 2007/0061202 A1 | 3/2007 | Ellis et al. | |
| 2007/0087820 A1 | 4/2007 | Van Luchene et al. | |
| 2007/0087822 A1 | 4/2007 | Van Luchene | |
| 2007/0117615 A1 | 5/2007 | Van Luchene | |
| 2007/0179867 A1 | 8/2007 | Glazer et al. | |
| 2008/0139318 A1 | 6/2008 | Van Luchene et al. | |
| 2009/0006124 A1 | 1/2009 | Sinclair et al. | |
| 2009/0204420 A1 | 8/2009 | Ganz | |

FOREIGN PATENT DOCUMENTS

| | | |
|---|---|---|
| WO | WO 02/20111 A2 | 3/2002 |
| WO | WO 02/067178 A1 | 8/2002 |
| WO | WO 02/077758 A2 | 10/2002 |
| WO | WO 2005/064502 A1 | 7/2005 |

OTHER PUBLICATIONS

Bartle, Richard A. "Designing Virtual Worlds: Bibliography", Jun. 17, 2003. Pertinent Pages: p. 4 for bibliographical information for the Stanford article.*

U.S. Appl. No. 12/005,047, Jung et al.

U.S. Appl. No. 12/004,110, Jung et al.

"About Deposits and Withdrawals"; Project Entropia; pp. 1; located at http://www.project-entropia.com/Content.ajp?id=1303; printed on Jan. 27, 2005.

"About Project Entropia"; Project Entropia; pp. 1; located at http://www.project-entropia.com/about/Index.ajp; printed on Jan. 27, 2005.

"Bank Account Game"; pp. 1-2; located at http://www.educational-learninggames.com/bank-account-game.asp; Educational Learning Games.com; printed on Dec. 10, 2004.

Becker, David; "Real cash for virtual goods"; CNET News.Com; bearing a date of Feb. 8, 2005; pp. 1-4; CNET Networks, Inc.; located at http://news.com.com/2102-1043_3-5566704.html?tag=st.util.print; printed on.Feb. 8, 2005.

Book, Betsy; "Moving Beyond the Game: Social Virtual Worlds"; State of Play 2 Conference, Oct. 2004; Cultures of Play Panel; pp. 1-13; printed on Jul. 14, 2005.

"Charge It! Math and Money Board Games"; pp. 1-2; located at http://www.educationallearninggames.com/charge-it-board-game-money-board-game.asp; Educational Learning Games.com; printed on Jan. 27, 2005.

Cringely, Robert X.; "The Wild Ones, The Best Way to Protect Sales of Virtual Goods Can Be Found Inside the Game, Itself"; bearing a date of May 13, 2004; pp. 1-3; located at http://www.pbs.org/cringley/pulpit/pulpit20040513.html; printed on Jul. 14, 2005.

"Escrow.com Protects Online Buyers and Sellers from Fraud"; bearing a date of 1999-2005; pp. 1; Escrow.com; located at https://www.escrow.com/index.asp; printed on Jul. 13, 2005.

"'Game theft' led to fatal attack"; pp. 1-2; located at http://news.bbc.co.uk/2/hi/technology/4396159.stm; BBC News; bearing a date of Mar. 31, 2005; pinted Apr. 11, 2005.

"Gaming Open Market—The next generation of game commodity trading. Frequently asked questions"; pp. 1-4; located at http://www.gamingopenmarket.com/faq.php; printed on Jul. 13, 2005

Gentile, Gary; "Advertisers seek piece of video-game action"; Seattle Post-Intelligencer; May 21, 2005; pp. A1 and A11.

Gentile, Gary; "Products Places Liberally in Video Games"; May 23, 2005; pp. 1-3; abcNews; located at http://abcnews.go.com/Business/print?id=778965; printed on Jun. 17, 2005.

Graham-Rowe, Duncan; "Gamers turn cities into a battleground"; NewScientist.com; Jun. 12, 2005; pp. 1-3; located at: http://www.newscientist.com/article.ns?id=dn7498; printed on Jun. 17, 2005.

Haines, Lester; "Spurned woman deletes ex's gaming data"; pp. 1-2; located at http://www.theregister.co.uk/2005/01/21/spurned_womans_revenge/; The Register; bearing a date of Jan. 21, 2005; printed on Apr. 14, 2005.

Harrow, Jeffrey R.; "Future Brief, a Publication of New Global Initiatives, Inc."; bearing a date of 2004; pp. 1-5; located at http://www.futurebrief.com/Harrow-12.pdf; printed on Jul. 13, 2005.

Hershman, Tania; "Advertisers: Game on"; pp. 1; located at http://www.technologyreview.com/articles/05/05/issue/forward_advertisers.asp?p=1;.TechnologyReview.com; bearing a date of May 2005; printed on Apr. 14, 2005.

Hilts, Peter; "Boys are from Neopets, Girls are from Barbie.com" Computer Bits; Jun. 2003, pp. 1-4; vol. 13 No. 6; located at http://info.neopets.com/computerbits.html; printed on May 17, 2005.

"IGE Frequently Asked Questions"; IGE; pp. 1-12; located at http://www.ige.com/FrequentyAskedQuestions.aspx; printed on Jan. 27, 2005.

Knight, Will; "Smart shoes decide on television time"; May 18, 2005; pp. 1-2; located at http://newscientist.com/article.ns?id=dn7395&print=true; NewScientist.com; printed on Jun. 17, 2005.

Kushner, David; "Engineering Everquest Online Gaming Demands Heavyweight Data Centers"; IEEE Spectrum; Jul. 2005; pp. 34-39; Institute of Electrical and Electronics Engineers, Inc.; New York, NY.

Kushner, David; "Engineering Everquest Online gaming demands heavyweight data centers"; IEEE Spectrum Online; Jul. 11, 2005; pp. 1-7; bearing a date of Jun. 30, 2005; located at http://www.spectrum.ieee.org/WEBONLY/publicfeature/jul05/0705eq.html; printed on Jul. 11, 2005.

"Monopoly Tycoon"; Atari Australia & New Zealand; pp. 1; located at http://www.atari.com.au/games/info.do?id=191; Atari Australia Pty Ltd.; printed on Mar. 1, 2005.

"New World Notes: Business Model Prototype"; Jun. 2, 2005; pp. 1-3; located at http://secondlife.blogs.com/nwn/2005/06/business_model_.html#more; printed on Jun. 8, 2005.

"Our Business"; IGE; bearing a date of 2001-2004; pp. 1-2; located at http://www.ige.com/corporate.aspx?lang=en; printed on Jan. 27, 2005.

"Penn State Behrend Establishes Credit Card Research Center"; Penn State Erie: The Behrend College; bearing dates of Nov. 22, 2004 and Sep. 27, 2004; pp. 1-2; located at http://www.pserie.psu.edu/newscal/news2004/november-creditcenter.htm; printed on Dec. 8. 2004.

Sandhana, Lakshmi; "Pacman comes to life virtually"; pp. 1-3; BBC News; bearing a date of Jun. 6, 2005; located at http://news.bbc.co.uk/1/hi/technology/4607449.stm; printed on Jun. 17, 2005.

"Second Life: Your World. Your Imagination."; bearing a date of 2005; pp. 1; Linden Research, Inc.; located at http://secondlife.com/; printed on Jun. 8, 2005.

"Spending Challenge"; The Mint: It Makes Cents; bearing a date of 2002; pp. 1-3; Northwestern Mutual; located at http://www.themint.org/tryit/spendingchallenge.php; printed on Jan. 26, 2005.

Terdiman, Daniel; "Sony Gets Real on Virtual Goods"; Wired News; bearing a date of Apr. 20, 2005; pp. 1-3; Lycos Inc.; located at http://wired.com/news/print/0,1294,67280,00.html; printed on Apr. 21, 2005.

Terdiman, Daniel; "Virtual Trade Tough Nut to Crack"; Wired News; bearing a date of Dec. 20, 2004; pp 1-3; Lycos Inc.; located at http://wired.com/news/print/0,1294,66074,00.html; printed on Jan. 27, 2005.

Thompson, Clive; "Game Theories"; The Walrus Magazine; pp. 1-3; bearing a date of 2004; located at http://www.walrusmagazine.com/article.pl?sid=04/05/06/1929205&mode=nested&tid=1; printed on Jun. 17, 2005.

"TradEnable (I-escrow): Online Payment Service"; bearing a date of 2004; pp. 1-3; Stylusinc.om; located at http://stylusinc.com/WebEnable/Sales/tradenable.php; printed on Jul. 13, 2005.

"The Entertainment of the Future is already here"; Project Entropia; bearing a date of Jan. 27, 2005; pp. 1; located at http://www.project-entropia.com/Index.ajp; printed on Jan. 27, 2005.

Walker, Frank; "Coming soon: a PC combat game that shoots back"; The Sydney Morning Herald; bearing a date of Apr. 3, 2005; pp. 1-2; located at http://www.smh.com.au/news/World/Coming-soon-a-PC-combat-game-that-shoots-back/2005/04/02/1112302293552.html?oneclick=true; printed on Apr. 11, 2005.

Ward, Mark; "Life lessons in virtual adultery"; BBC News; bearing a date of Apr. 11, 2005; pp. 1-2; located at http://news.bbc.co.uk/2/hi/technology/4432019.stm; printed on Apr. 14, 2005.

U.S. Appl. No. 11/654,398, Jung et al.
U.S. Appl. No. 11/653,092, Jung et al.
U.S. Appl. No. 11/652,379, Jung et al.
U.S. Appl. No. 11/642,991, Jung et al.
U.S. Appl. No. 11/607,794, Jung et al.
U.S. Appl. No. 11/605,939, Jung et al.
U.S. Appl. No. 11/601,599, Jung et al.
U.S. Appl. No. 11/600,602, Jung et al.
U.S. Appl. No. 11/599,631, Jung et al.
U.S. Appl. No. 11/589,318, Jung et al.
U.S. Appl. No. 11/582,837, Jung et al.
U.S. Appl. No. 11/540,911, Jung et al.
U.S. Appl. No. 11/364,895, Jung et al.
U.S. Appl. No. 11/364,498, Jung et al.
U.S. Appl. No. 11/342,368, Jung et al.
U.S. Appl. No. 11/340,832, Jung et al.
U.S. Appl. No. 11/314,967, Jung et al.
U.S. Appl. No. 11/305,878, Jung et al.
U.S. Appl. No. 11/283,551, Jung et al.
U.S. Appl. No. 11/274,759, Jung et al.
U.S. Appl. No. 11/264,824, Jung et al.
U.S. Appl. No. 11/256,695, Jung et al.
U.S. Appl. No. 11/251,624, Jung et al.
U.S. Appl. No. 11/242,647, Jung et al.
U.S. Appl. No. 11/242,619, Jung et al.
U.S. Appl. No. 11/238,684, Jung et al.
U.S. Appl. No. 11/236,875, Jung et al.
U.S. Appl. No. 11/234,878, Jung et al.
U.S. Appl. No. 11/234,867, Jung et al.
U.S. Appl. No. 11/234,848, Jung et al.
U.S. Appl. No. 11/234,847, Jung et al.
U.S. Appl. No. 11/228,043, Jung et al.
U.S. Appl. No. 11/213,442, Jung et al.
U.S. Appl. No. 11/203,686, Jung et al.
U.S. Appl. No. 11/202,964, Jung et al.
U.S. Appl. No. 11/192,342, Jung et al.
U.S. Appl. No. 11/192,320, Jung et al.
U.S. Appl. No. 11/191,252, Jung et al.
U.S. Appl. No. 11/191,248, Jung et al.
U.S. Appl. No. 11/191,233, Jung et al.
U.S. Appl. No. 11/185,524, Jung et al.
U.S. Appl. No. 11/185,446, Jung et al.
U.S. Appl. No. 11/184,567, Jung et al.
U.S. Appl. No. 11/184,564, Jung et al.
U.S. Appl. No. 12/286,532, Jung et al.
U.S. Appl. No. 12/286,530, Jung et al.
U.S. Appl. No. 12/286,127, Jung et al.
U.S. Appl. No. 12/286,096, Jung et al.
U.S. Appl. No. 12/231,298, Jung et al.
U.S. Appl. No. 12/291,349, Jung et al.
U.S. Appl. No. 12/291,336, Jung et al.
U.S. Appl. No. 12/291,160, Jung et al.
U.S. Appl. No. 12/291,020, Jung et al.
U.S. Appl. No. 12/290,679, Jung et al.
U.S. Appl. No. 12/290,674, Jung et al.
U.S. Appl. No. 12/290,653, Jung et al.
U.S. Appl. No. 12/290,458, Jung et al.
U.S. Appl. No. 12/290,358, Jung et al.

Biggs, Stuart; "Enter danger zone, Matrix-style Governments worry about the hazardous reality-blurring effects of online gaming"; South China Morning Post; bearing a date of Aug. 30, 2005; pp. 1-2; © 2005 South China Morning Post Publishers Ltd.

Krotoski, Aleks; "Online: Virtual trade gets real: Buying virtual goods on the internet is one thing; killing for it is quite another"; The Guardian; bearing a date of Jun. 16, 2005; pp. 1-5; ProQuest; London (UK); printed on Nov. 10, 2009.

Kushner, David; "My Avatar, My Self"; Technology Review; bearing a date of Apr. 2004; pp. 50-55; vol. 107 No. 3; printed on Nov. 9, 2009.

Langberg, Mike; "Virtual World There Innovative to an Extent"; bearing a date of Nov. 27, 2003; San Jose Mercury News; p. 1G; printed on Nov. 9, 2009.

Stephens, Molly; "Sales of in-game assets: An illustration of the continuing failure of intellectual property law to protect digital creators"; Texas Law Review; bearing a date of May, 2002; pp. 1513-1535; vol. 80, No. 6; printed on Nov. 6, 2009.

White, Mark; "War of the Worlds"; Independent on Sunday; bearing a date of Jul. 31, 2005; pp. 1-4; Financial Times; © 2005 Independent Digital UK Ltd.

Bartle, Richard A.; "Pitfalls of Virtual Property"; Themis Group; bearing a date of Apr. 2004; pp. 1-22.

Grimmelmann, James; "Virtual Worlds As Comparative Law"; New York Law School Law Review; bearing a date of Dec. 8, 2004; pp. 147-184; vol. 49.

U.S. Appl. No. 12/658,618, Jung et al.
U.S. Appl. No. 12/658,613, Jung et al.
U.S. Appl. No. 12/658,609, Jung et al.
U.S. Appl. No. 12/658,600, Jung et al.
U.S. Appl. No. 12/661,997, Jung et al.
U.S. Appl. No. 12/661,996, Jung et al.

"MicroLoans take offbeat collateral"; The Wall Street Journal. Sunday Gazette—Mail; Bearing a date of Feb 13, 2005; p. 5.D; Charleston, W.V.; printed on Apr. 19, 2010.

European Search Report; European App. No. EP 06 78 8839; Aug. 11, 2010 (received by our Agent on Aug. 12, 2010); pp. 1-6.

Fugazi, Nobody (Taran Rampersad); "The Evolution of Business in Second Life"; Avvenimenti Iblei Magazine Online—Business & SL; Feb. 28, 2000; printed on Feb. 7, 2011; pp. 1-4; No. 4; located at: http://www.avvenimentiiblei.com/the-evolution-of-business-in-second-life-by-nobody-fugazi-taran-rampersad.

"American Express and Zynga Announce Strategic Relationship to Make Virtual Goods and Game Cards Available for Purchase Using Membership Rewards® Points"; News: Press Release; About.American.Express.com; bearing a date Nov. 30, 2010; printed on Jan. 20, 2010; pp. 1-2; New York; located at: http://about.americanexpress.com/news/pr/2010/zynga.aspx.

Ashby, Alicia; "MindArk Brings Real Banking Into Entropia Universe"; Engage Digital; bearing a date of Mar. 18, 2009; printed on Jan. 20, 2012; pp. 1-3; located at http://www.engagedigital.com/blog/2009/03/18/mindark-brings-real-banking-into-entropia-universe/.

U.S. Appl. No. 13/373,358, Jung et al.

"Discontinuation of MetaCard Service on Feb. 28, 2010"; MetaCard Announcement; FirstMeta; printed on Jan. 20, 2012; pp. 1-4; located at: http://www.firstmeta.com/public/MCannounce.html.

"EpicWin"; iTunes Preview; Apple Store iTunes; printed on Jan. 16, 2012; pp. 1-3; located at: http://itunes.apple.com/us/app/epicwin/id37297221?mt=8&ign-mpt=uo%3D4.

"EpicWin Gives You Loot for Doing Your Chores"; STP World: Slide to Play; bearing a date of Aug. 18, 2010; printed on Jan. 16, 2010; located at http://www.slidetoplay.com/story/epicwin-gives-you-loot-for-doing-your-chores.

"EpicWin: Pre-Release Trailer"; Video, posted on YouTube; printed on Jan. 16, 2012; pp. 1-3; located at: http://www.youtube.com/watch?v=AmKwF_Si734&feature=popt00us03.

Goad, Libe; "Zynga Reinstates Offers" in PetVille and Other Games; Blog Games; bearing a date of Jun. 13, 2010; printed on Jan. 20, 2012; pp. 1-3; located at: http://blog.games.com/2010/01/13/zynga-reinstates-offers-in-farmville-and-other-games/.

Gomez, Mel; "Chinese Insurance Company Insures Virtual Goods"; www.tek-lado.com; bearing a date of Jul. 11, 2011; printed on Jan. 20, 2012; pp. 1-4; Tek Lado; located at: http://www.tek-lado.com/2011/07/11/chinese-insurance-company-insures-virtual-goods/.

"Join Xbox Live Rewards"; rewards.xbox.com; bearing a date of 2012; printed on Jan. 20, 2012; pp. 1-2; Microsoft Corporation; located at: http://rewards.xbox.com/.

"Legacy Locker—Return Home"; Legacy Locker; bearing a date of 2009; printed on Jan. 20, 2012; pp. 1-4; located at: http://legacylocker.com.

"MetaCard™"; FirstMeta; bearing a date of 2007; printed on Jan. 20, 2012; one page; located at http://firstmeta.com/consumers.

Morales, Angela; "FarmVille Netflix Sponsored Link: 150 Free Farm Cash"; Blog Games; bearing a date of Aug. 16, 2010; printed on Jan. 20, 2012; pp. 1-3; located at: http://blog.games. com/2010/08/16/farmville-netflix-sponsored-link-150-free-farm-cash/.

Osborne, Emily, et al.; "Digital Legacy"; Step Journal; bearing a date of May 2010; printed on Jan. 23, 2012; pp. 1-2; located at: http://www.stepjournal.org/journal_archive/2010/step_journal_may_2010/digital_legacy.aspx.

Saint, Nick; "Wacky: Zynga Gives Away Free FarmVille Cash With Purchases of Real Life Vegetables"; Business Insider; bearing a date of May 21, 2010; pp. 1-2; located at: http://articles.businessinsider.com/2010-05-21/tech/30016153_1_zynga-virtual-currency-farmville.

Simon, Mallory; "New Services Promise Online Life After Death"; CNN.com/technology; bearing a date of May 18, 2009; printed on Jan. 20, 2012; pp. 1-3; located at: http://www.cnn.com/2009/TECH/05/18/death.online/index.html?iref=t2test_techmon.

"World of Warcraft Rewards Visa$_{ADDAC;AXA}$®"; us.battle.net; bearing a date of 2012; printed on Jan. 20, 2012; pp. 1-2; Blizzard Entertainment, Inc.; located at http://us.battle.net/wow/en/services/rewards-visa/.

Cook, Michelle; "Cyber Stars Taking Over?: Some Have Albums, Others Have Shows. Now One Will Star With Al Pacino"; The Vancouver Sun; bearing a date of Aug. 17, 2000; pp. 1-2; The Vancouver Sun; Vancouver, B.C.

Gwinn, Eric; "Space Invaders: Why Ads are Infiltrating Video Games"; Edmonton Journal; beaing a date of Apr. 23, 2004; pp. 1-3; Edmonton Journal; Edmonton, Alta.

U.S. Appl. No. 13/532,238, Jung et al.

Monk, Katherine; "Demand for Virtual Ad Space Growing: Companies Targeting Segment of 18-to-34 Year-Old Males"; The Windsor Star; bearing a date of Sep. 4, 2004; pp. 1-2; The Windsor Star; Windsor, Ont.

"Social Networks Research Report"; Wildbit; bearing a date of 2005; pp. 1-36; Wildbit, LLC; located at http://www.wildbit.com.

Solman, Gregory; "Wow Factor About to Spike for Ads in Online Games"; Adweek; bearing a date of May 24, 2004; pp. 1-2; vol. 45, Iss. 21; VNU eMedia, Inc.; New York.

Stanley, T.L.; "Massive Launches Ad Server for Games"; Advertising Age; bearing a date of Oct. 18, 2004; pp. 1-2; vol. 75, Iss. 42; Crain Communications, Incorporated; Chicago.

"Virtual Advertising: Digitopia"; New Media Age; bearing a date of Mar. 18, 2004; pp. 1-4; Centaur Communications Ltd.; London.

Bloomfield, Robert; "Patenting Virtual Commerce"; pp. 1-5; located at http://terranova.blogs.com/terra_nova/2008/06/last-week-i-rec.html; printed on Jun. 25, 2008.

Patenting Virtual Commerce | Metanomics—Business and Policy in the Metaverse; "Patenting Virtual Commerce"; submitted by Robert Bloomfield; pp. 1-2; located at http://www.metanomics.net/21-jun-2008/patenting-virtual-commerce; printed on Jun. 25, 2008.

U.S. Appl. No. 11/982,393, Jung et al.
U.S. Appl. No. 11/981,635, Jung et al.
U.S. Appl. No. 11/980,315, Jung et al.
U.S. Appl. No. 11/975,723, Jung et al.
U.S. Appl. No. 11/975,367, Jung et al.
U.S. Appl. No. 11/974,515, Jung et al.
U.S. Appl. No. 11/974,174, Jung et al.
U.S. Appl. No. 11/906,777, Jung et al.
U.S. Appl. No. 11/827,376, Jung et al.

Baig, Edward C.; "Slip into a second skin with an online avatar"; USA Today; bearing a date of Nov. 11, 2003; pp. 1-3; located at http://www.usatoday.com/tech/columnist/edwardbaig/2003-11-11-baig_x.htm; printed on Apr. 1, 2008.

Castronova, Edward; "Virtual Worlds: A First-Hand Account of Market and Society on the Cyberian Frontier"; bearing a date of Dec. 2001; pp. 1-40; located at http://papers.ssrn.com/abstract=294828; Munich, Germany.

Rhode, Steve; "Avoid credit card balance transfers requiring new purchases"; Gannett News Service; bearing a date of Jul. 18, 2003; pp. 1-3; Myvesta.org Inc.; printed on Apr. 8, 2008.

"Star Wars Galaxies: An Empire Divided"; Adventure Manual; bearing a date of Jun. 26, 2003; total pp. 1-9; LucasFilm Entertainment Company Ltd.

"Star Wars Galaxies: An Empire Divided"; Adventure Manual; bearing a date of Jun. 26, 2003; total pp. 75; LucasFilm Entertainment Company Ltd.

"There, Inc. Delivers a Brave New Online World to Consumers; Company Unveils There 'Limited Access' and Teams With Industry Leaders Including ATI, HP, and iVillage to Provide Consumers with compelling 3D World; Nike and Levi's Provide Immersive Brand Experience to Members."; Goliath Business Knowledge on Demand; bearing a date of Oct. 27, 2003; pp. 1-7; PR Newswire; Menlo Park, CA; printed on Apr. 8, 2008.

U.S. Appl. No. 12/221,446, Published Jul. 31, 2008, Jung et al.
U.S. Appl. No. 12/221,459, Published Jul. 31, 2008, Jung et al.
U.S. Appl. No. 12/221,447, Published Jul. 31, 2008, Jung et al.
U.S. Appl. No. 12,221,254, Published Jul. 30, 2008, Jung et al.
U.S. Appl. No. 12/220,675, Published Jul. 24, 2008, Jung et al.

* cited by examiner

FIG. 27A

GAME ACCOUNT STATUS — 980

RESPONSIBLE REAL-WORLD PARTY ⟵ 1030
REAL-WORLD CONTACT INFORMATION ⟵ 1032

| VALUE CATEGORY 1000 | PAYABLE AMOUNT 1020 | IDENTITY OF CREDITOR(S) 1022 | RECEIVABLE AMOUNT 1024 | IDENTITY OF DEBTOR(S) 1026 | CURRENTLY OWNED NOW 1028 |
|---|---|---|---|---|---|
| VIRTUAL CURRENCY 1002 | | | | | |
| DISCOUNT COUPONS 1004 | | | | | |
| AWARD POINTS 1006 | | | | | |
| ACCESS TICKETS 1008 | | | | | |
| EXPERIENCE MEDAL 1010 | | | | | |
| LEVEL PERMITS 1012 | | | | | |
| BONUS VOUCHERS 1014 | | | | | |
| SKILL MERITS 1016 | | | | | |
| OTHER VALUE SYMBOLS 1018 | | | | | |

| STATUS DATE 1034 | USER ID 1035 | VIRTUAL CHARACTER ID 1036 | GAME ACCOUNT NUMBER 1037 | PERFORMANCE RATING 1038 |
|---|---|---|---|---|

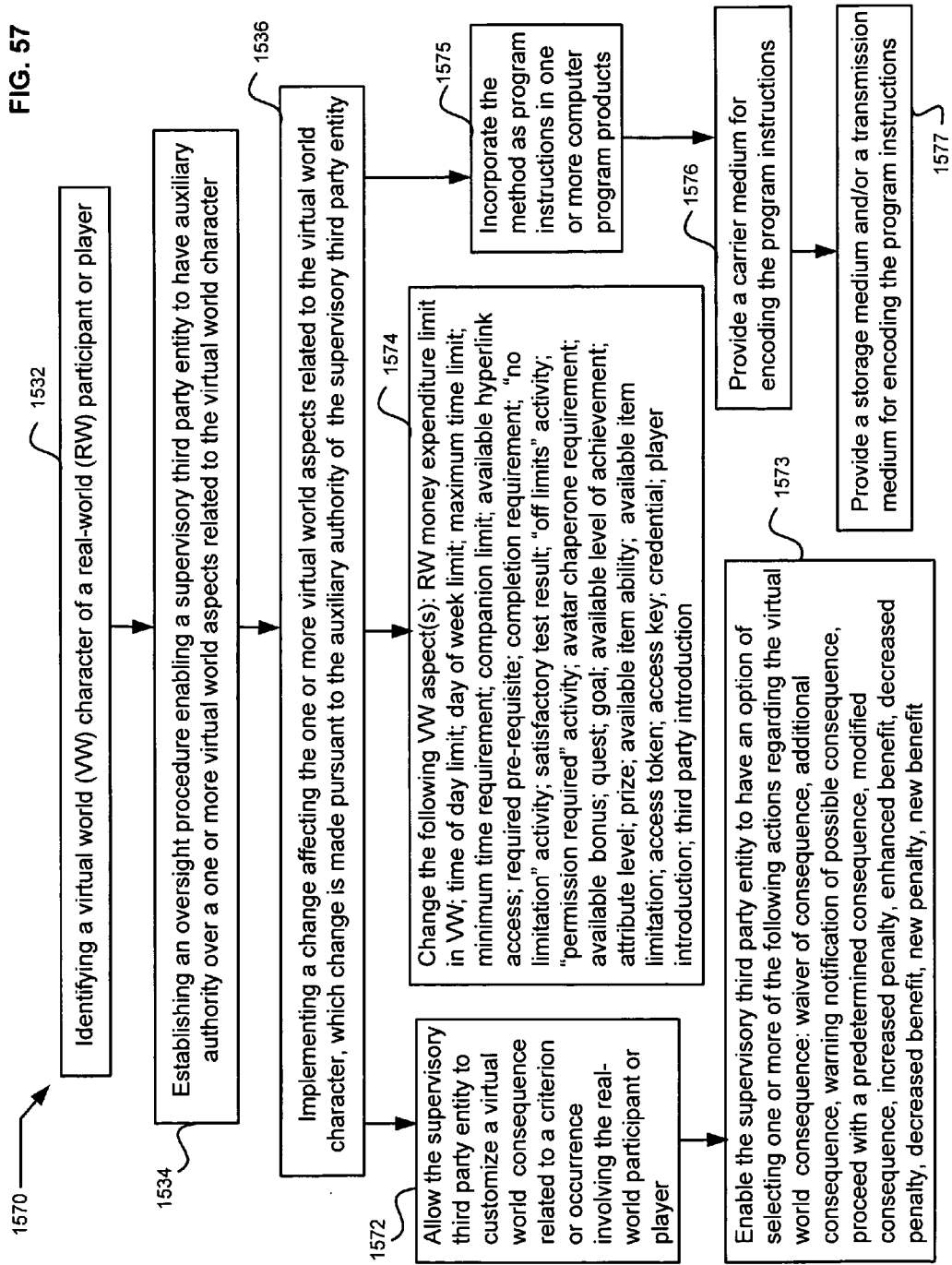

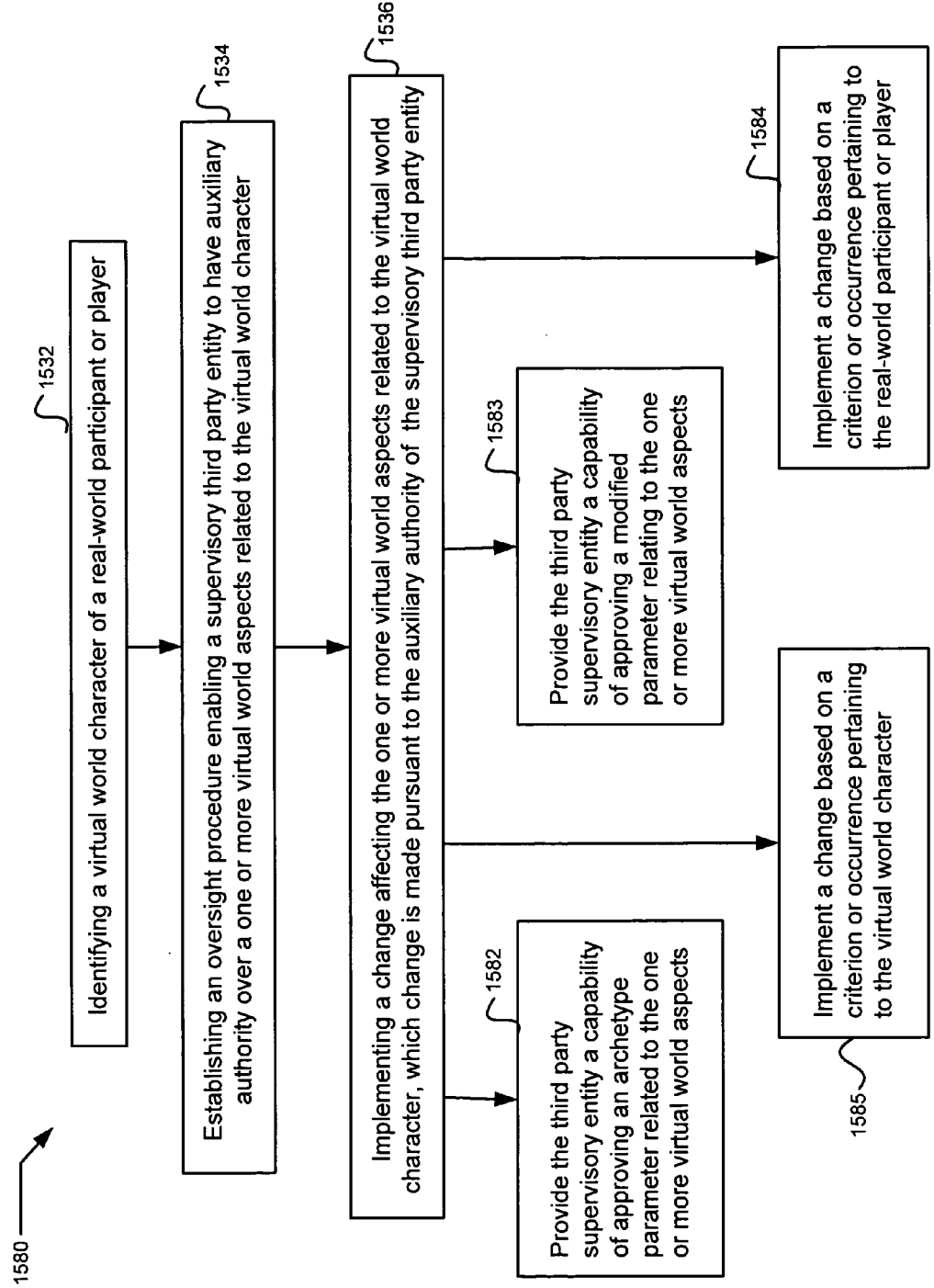

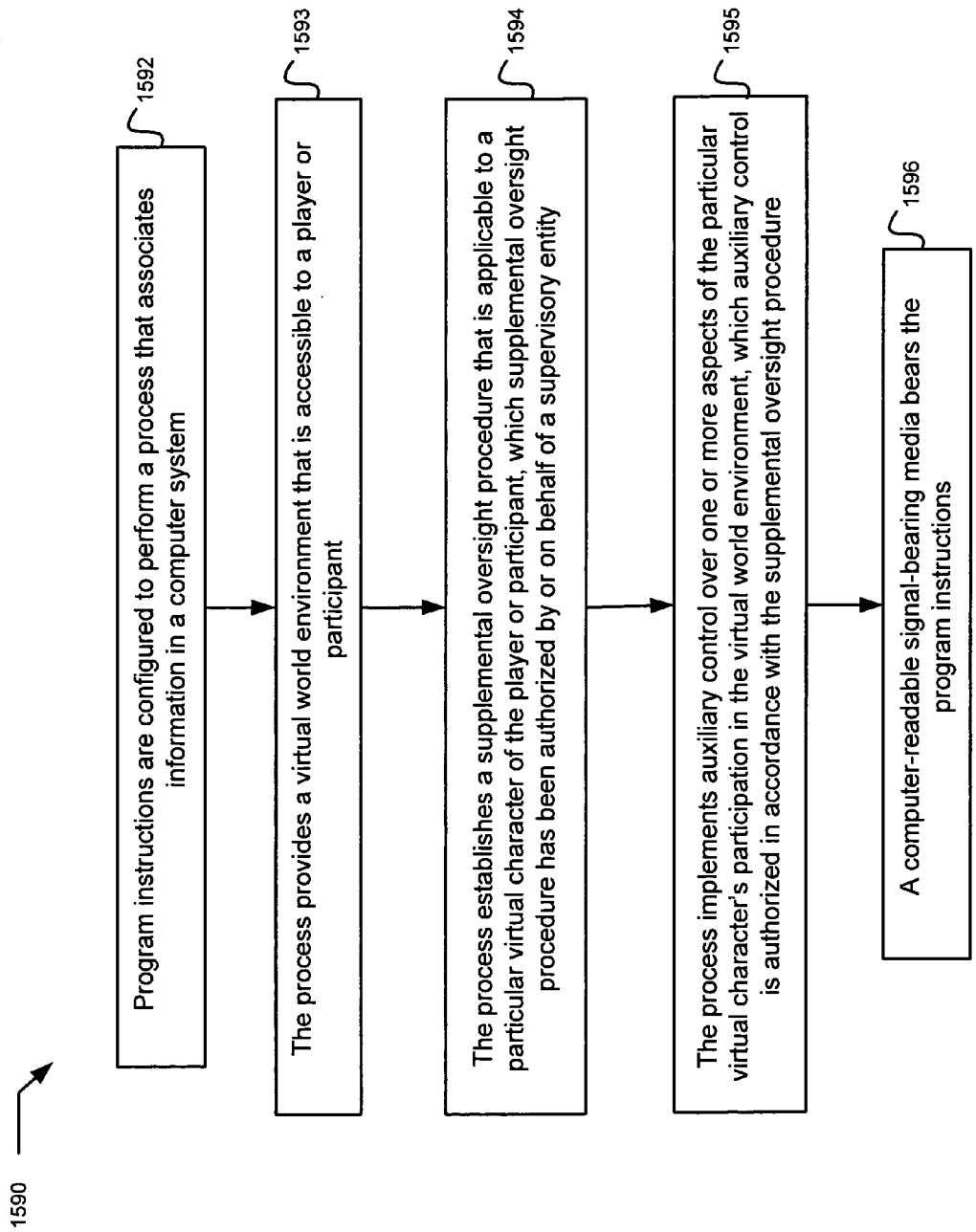

THIRD PARTY CONTROL OVER VIRTUAL WORLD CHARACTERS

CROSS-REFERENCE TO RELATED APPLICATIONS

The present application is related to, claims the earliest available effective filing date(s) from (e.g., claims earliest available priority dates for other than provisional patent applications; claims benefits under 35 USC § 119(e) for provisional patent applications), and incorporates by reference in its entirety all subject matter of the herein listed application(s) to the extent such subject matter is not inconsistent herewith; the present application also claims the earliest available effective filing date(s) from, and also incorporates by reference in its entirety all subject matter of any and all parent, grandparent, great-grandparent, etc. applications of the herein listed application(s) to the extent such subject matter is not inconsistent herewith. The United States Patent Office (USPTO) has published a notice to the effect that the USPTO's computer programs require that patent applicants reference both a serial number and indicate whether an application is a continuation or continuation in part. The present applicant entity has provided below a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

For purposes of the USPTO extra-statutory requirements, the present application constitutes a continuation in part of the following currently co-pending commonly owned United States patent applications. The subject matter of the applications listed below are incorporated by reference in their entirety in the present application to the extent such subject matter is not inconsistent herewith.

Ser. No. 11/051,514 filed on Feb. 4, 2005, entitled "Virtual Credit In Simulated Environments", naming Edward K. Y. Jung, Royce A. Levien, Mark A. Malamud, and John D. Rinaldo, Jr. as inventors.

Ser. No. 11/069,894 filed on Feb. 28, 2005, entitled "Financial Ventures Based on Virtual Credit", naming Edward K. Y. Jung, Royce A. Levien, Mark A. Malamud, and John D. Rinaldo, Jr. as inventors.

Ser. No. 11/069,905 filed on Feb. 28, 2005, entitled "Payment Options for Virtual Credit", naming Edward K. Y. Jung, Royce A. Levien, Mark A. Malamud, and John D. Rinaldo, Jr. as inventors.

Ser. No. 11/069,906 filed on Feb. 28, 2005, entitled "Hybrid Charge Account for Virtual World Credit", naming Edward K. Y. Jung, Royce A. Levien, Mark A. Malamud, and John D. Rinaldo, Jr. as inventors.

Ser. No. 11/068,736 filed Feb. 28, 2005, entitled "Compensation Techniques for Virtual Credit Transactions", naming Edward K. Y. Jung, Royce A. Levien, Mark A. Malamud, and John D. Rinaldo, Jr. as inventors.

Ser. No. 11/096,265 filed Mar. 30, 2005, entitled "Virtual Credit with Transferability", naming Edward K. Y. Jung, Royce A. Levien, Mark A. Malamud, and John D. Rinaldo, Jr. as inventors.

Ser. No. 11/096,212 filed on Mar. 30, 2005, entitled "Multi-Player Game Using Simulated Credit Transactions", naming Edward K. Y. Jung, Royce A. Levien, Mark A. Malamud, and John D. Rinaldo, Jr. as inventors.

Ser. No. 11/107,381 filed on Apr. 15, 2005, entitled "Follow-Up Contacts with Virtual World Participants", naming Edward K. Y. Jung, Royce A. Levien, Mark A. Malamud, and John D. Rinaldo, Jr. as inventors.

Ser. No. 11/107,380 filed on Apr. 15, 2005, entitled "Participation Profiles of Virtual World Players", naming Edward K. Y. Jung, Royce A. Levien, Mark A. Malamud, and John D. Rinaldo, Jr. as inventors.

The present application is also related to the following commonly owned co-pending United States patent application filed on the same filing date as the present application. The subject matter of the application listed below is incorporated by reference in its entirety in the present application to the extent such subject matter is not inconsistent herewith.

Ser. No. 11/184,564 filed on Jul. 18, 2005, entitled "Supervisory Authority in Virtual World Environment", naming Edward K. Y. Jung, Royce A. Levien, Robert W. Lord, Mark A. Malamud, and John D. Rinaldo, Jr. as inventors.

TECHNICAL FIELD

This application relates generally to participation in virtual world environments.

BACKGROUND

Virtual world environments often include imaginary characters participating in fictional events, activities and transactions. There are both educational and entertainment benefits in creating new and challenging ways to relate virtual world environments with real-world experiences.

SUMMARY

Method and systems pertaining to supervisory authority in a virtual world environment as disclosed herein may take different forms. For example, various components may be incorporated in a computerized system to establish supplemental control of virtual world experiences of a participant or player. An exemplary system may include computer means for creating a virtual world environment, including operating procedures for one or more virtual characters; and a supplemental oversight procedure authorized by an auxiliary supervisory entity to control one or more virtual world aspects involving a designated virtual character of the participant or player. A further feature includes a control module operably coupled with the virtual world environment, wherein the control module implements the supplemental oversight procedures that affect the one or more virtual world aspects involving the designated virtual character.

Some exemplary embodiments provide a method of control over aspects of a virtual world environment, including identifying a virtual world character of a real-world participant or player, and establishing an oversight procedure enabling a supervisory third party entity to have auxiliary authority over a one or more virtual world aspects related to the virtual world character. The method may further implement a change affecting the one or more virtual world aspects related to the virtual world character, which change is made pursuant to the auxiliary authority of the supervisory third party entity.

Certain embodiments are implemented in a computer program product having program instructions configured to perform a process that associates information in a computer system. Such an exemplary process may provide a virtual world environment that is accessible to a player or participant, and establish a supplemental oversight procedure that is applicable to a particular virtual character of the player or participant, which supplemental oversight procedure has been authorized by or on behalf of a supervisory entity. A further process feature may include implementing auxiliary control over one or more aspects of the particular virtual character's participation in the virtual world environment, which auxiliary control is authorized in accordance with the supplemental oversight procedure. The process may further provide a computer-readable signal-bearing media bearing the program instructions.

It will be understood and disclosed herein that a computer product embodiment providing control over aspects of a virtual world environment may include a signal-bearing storage medium that carries the program instructions and/or a signal bearing communication medium that carries the program instructions.

A computer product embodiment may include a process feature that provides informational status feedback regarding the supplemental oversight procedure.

Some exemplary computerized system embodiments include computer apparatus capable of interaction with a computer-simulated virtual world environment, and an interface that allows a real-world participant or player to access the computer apparatus and participate in the virtual world environment as a virtual character. A further feature may provide instructions that when executed by the computer apparatus enable the real-world participant or player to activate the virtual character in the virtual world environment, and to engage in one or more virtual world experiences which are subject to an oversight procedure authorized by a supervisory third party entity, which oversight procedure includes control over an aspect related to the one or more virtual world experiences.

The supervisory authority techniques which are disclosed herein for purposes of illustration may involve many different types of players, participants and/or entities, depending on the circumstances and potential advantages arising from various embodiments and implementations of the system and methods.

Additional features, aspects and benefits will be understood by those skilled in the art from the following drawings and detailed description for various exemplary and preferred embodiments.

BRIEF DESCRIPTION OF THE FIGURES

FIG. 27A illustrates exemplary database records for a player's virtual world game account status.

FIGS. 54-58 are other detailed flow charts showing additional exemplary embodiments.

FIG. 59 is a high level flow chart showing another exemplary process incorporated in a computer program product.

DETAILED DESCRIPTION

Figure 1:
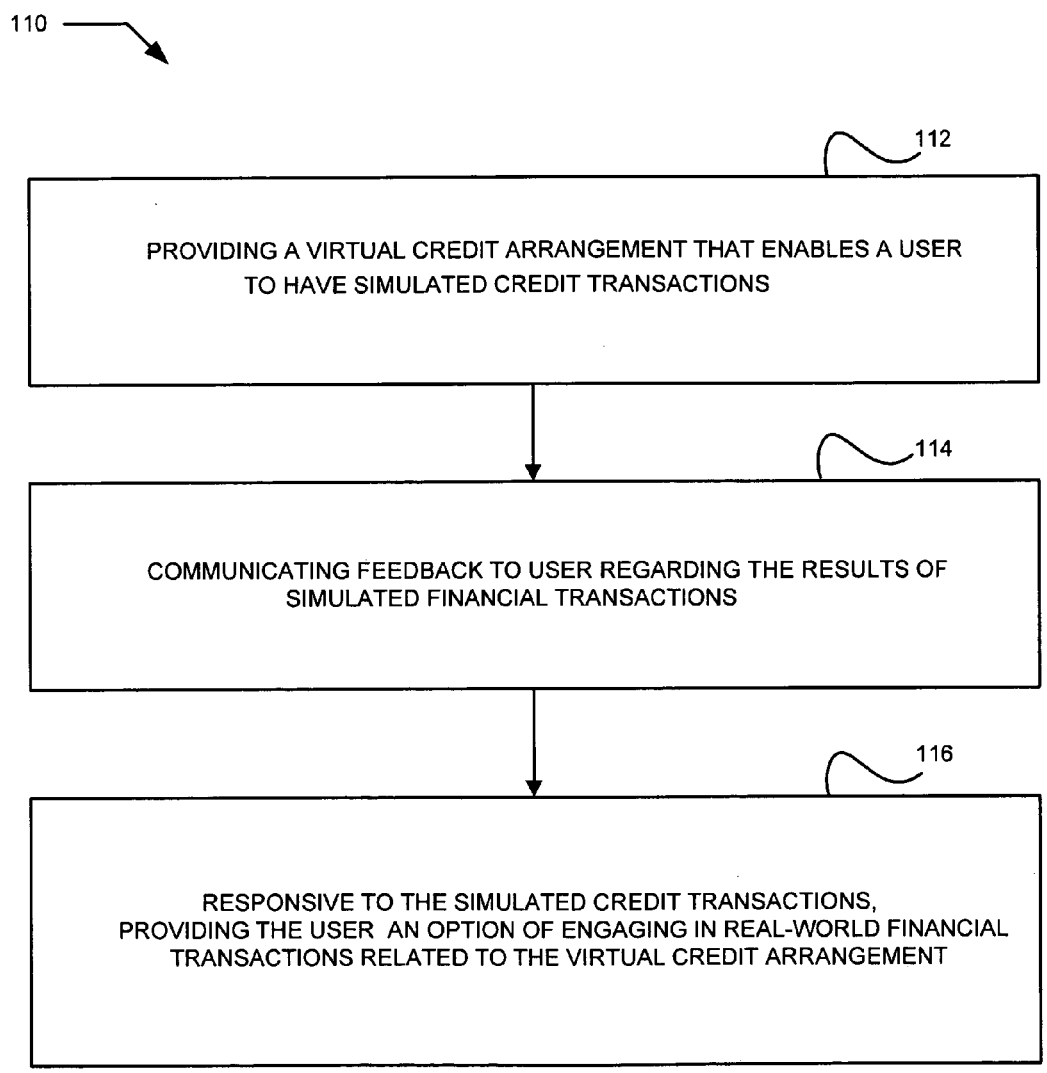
FIG. 1 is a high level flow chart showing an exemplary process for some embodiments.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use standard engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described aspects and drawings illustrate different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

As described in more detail herein, this disclosure describes some embodiments of a method and system for a virtual credit arrangement that enables a user to have simulated credit transactions. Feedback is communicated to the user regarding results of the simulated credit transactions. Responsive to the simulated credit transactions, the user is provided an option of engaging in real-world financial transactions related to the virtual credit arrangement.

In one aspect of the method and system disclosed herein, a virtual account is provided to a user. The user is enabled to make simulated purchases of goods and/or services and/or items of value. The user receives feedback regarding results of the simulated purchases. Responsive to an experience of making the simulated purchases and receiving the feedback, a transition by the user to usage of an actual financial account is facilitated. A further aspect relates to selection of credit terms for simulated purchases of virtual goods and/or services and/or items of value. In some embodiments, certain virtual account terms are programmed—e.g. automatically by a machine under program control—based on user demographic information or other past performance records. In other embodiments certain virtual account terms are varied by the user.

In some embodiments, users are enabled to make simulated purchases or incur simulated credit obligations that are posted to virtual accounts, and users are enabled to make simulated compensation against balances due or obligations owed for virtual accounts. In some instances, users are enabled to make remuneration with something of real value. In other instances, users are enabled to make remuneration with something of virtual value.

The completion of performance benchmarks may be required in some embodiments before allowing transfer to a higher participation level of a virtual credit account. Completion of performance benchmarks may be required before facilitating transition of a user to an actual financial account. In some instances, a user may have an unrestricted option to make transition to an actual financial account.

In some implementations, the system and method provides a simulated environment that enables purchases of various virtual products and/or virtual services and/or virtual items to be made by a plurality of users at different locations. Such purchases may involve credit transactions based on role playing world activities.

Referring to a process 110 shown in the exemplary flow chart of FIG. 1, a virtual credit arrangement is provided in order to enable a user to have simulated credit transactions (block 112). Feedback is communicated to the user regarding results of the simulated financial transactions (block 114). Responsive to the simulated credit transactions, the user is provided with an option of engaging in real-world financial transactions (block 116) related to the virtual credit arrangement. As discussed in more detail herein, such virtual credit arrangements can involve various types of credit arrangements made by the user, under standard or customized credit terms that may involve different forms of compensation such as real-world money, fictional money, action commitments, bartered items, etc.

Figure 2:
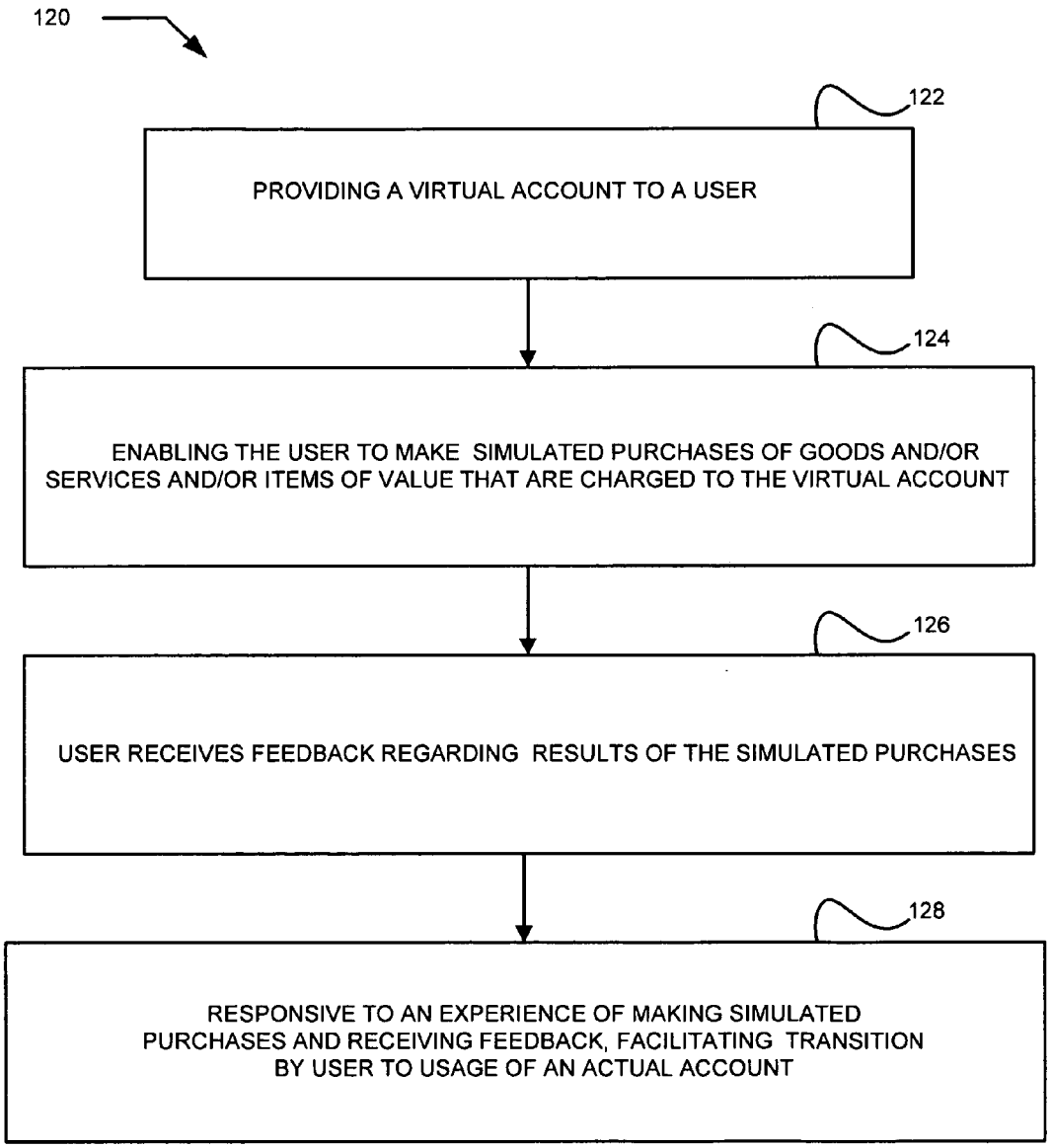
FIG. 2 is another high level flow chart showing a different exemplary process for other embodiments.

Another process 120 shown in the exemplary flow chart of FIG. 2 provides a virtual account to a user (block 122). The user is enabled to make simulated purchases of goods and/or services and/or items of value that are charged to the virtual account (block 124). The user receives feedback (block 126) regarding results of the simulated purchases. Responsive to the user's experience of making simulated purchases and receiving feedback, a transition of the user to usage of an actual account is facilitated (block 128).

The processes of FIGS. 1 and 2 can be implemented with various types of technology, including but not limited to hardware, firmware and/or software systems based on computerized data communications and processing as discussed in more detail herein.

Those skilled in the art will recognize that some aspects of the embodiments disclosed herein can be implemented in standard integrated circuits, and also as one or more computer programs running on one or more computers, and also as one or more software programs running on one or more processors, and also as firmware, as well as virtually any combination thereof. It will be further understood that designing the circuitry and/or writing the code for the software and/or firmware could be accomplished by a person skilled in the art in light of the teachings and explanations of this disclosure.

Figure 3:
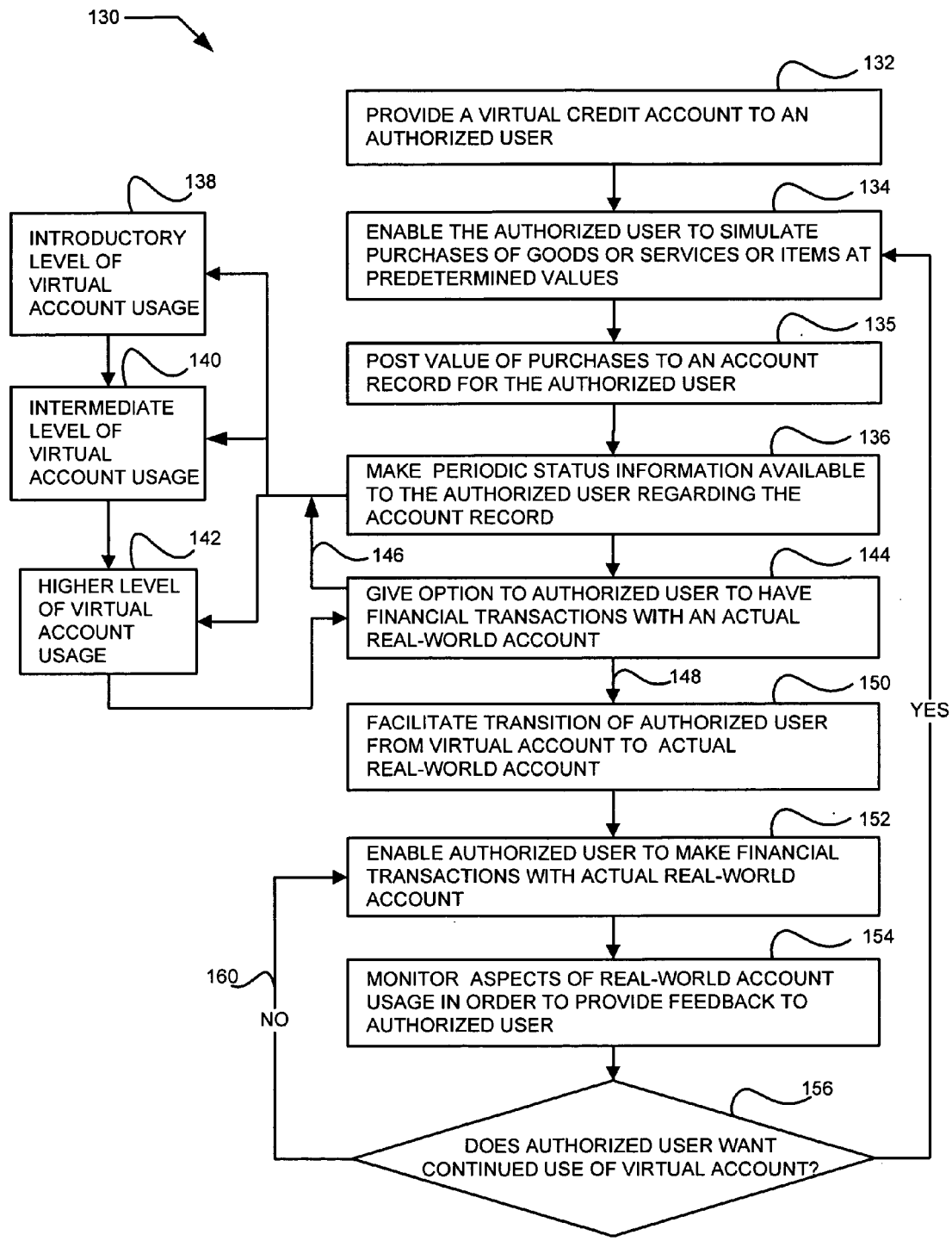
FIG. 3 is a more detailed flow chart showing a further exemplary process for additional embodiments.

A more detailed exemplary flow chart of FIG. 3 shows a process 130 involving alternative usage of both a virtual credit account and a real-world account. As an initial step for new users, a virtual credit account is provided to an authorized user (block 132). The authorized user is enabled to simulated purchases of goods or services or items at predetermined values (block 134). The value of the purchases is posted to an account record (block 135). Periodic feedback including status information is made available to the authorized user regarding the virtual credit account record (block 136).

Various levels of participation are provided for usage of the virtual credit account. Of course any number of levels with different types of credit opportunities for virtual account usage could be incorporated into embodiments, perhaps depending upon the desired financial, educational, and entertainment goals of a system designer as well as possibly depending upon the skill, experience and sophistication of the authorized user. By way of example only, the illustrated process 130 of FIG. 3 includes an introductory level (block 138), an intermediate level (block 140) and a higher level (block 142). After participating in one or more levels of virtual account usage, an authorized user is given an option to have financial transactions with an actual real-world account (block 144). The authorized user may choose to continue (see arrow 146) using the virtual credit account, or take the option (see arrow 148) for transition to the actual real-world account. In some embodiments, the user may have an unrestricted option to make the transition to the actual real-world account. Some embodiments may allow the user to have the option of using either the virtual credit account or an actual financial account during given time periods.

If the option for transition to the actual real-world account is exercised, the transition of the authorized user is facilitated from the virtual credit account to the actual real-world account (block 150). The authorized user can then be enabled to make financial transactions with the actual real-world account (block 152). Aspects of usage of the real-world account may be monitored (block 154) in order to provide feedback to the authorized user. It is to be emphasized that usage of the real-world account does not preclude continued use of the virtual credit account. If the authorized user wants to continue use of the virtual credit account (block 156), then such continued use is made available. Continued use of the real-world account is also made available (see arrow 160).

Figure 4:
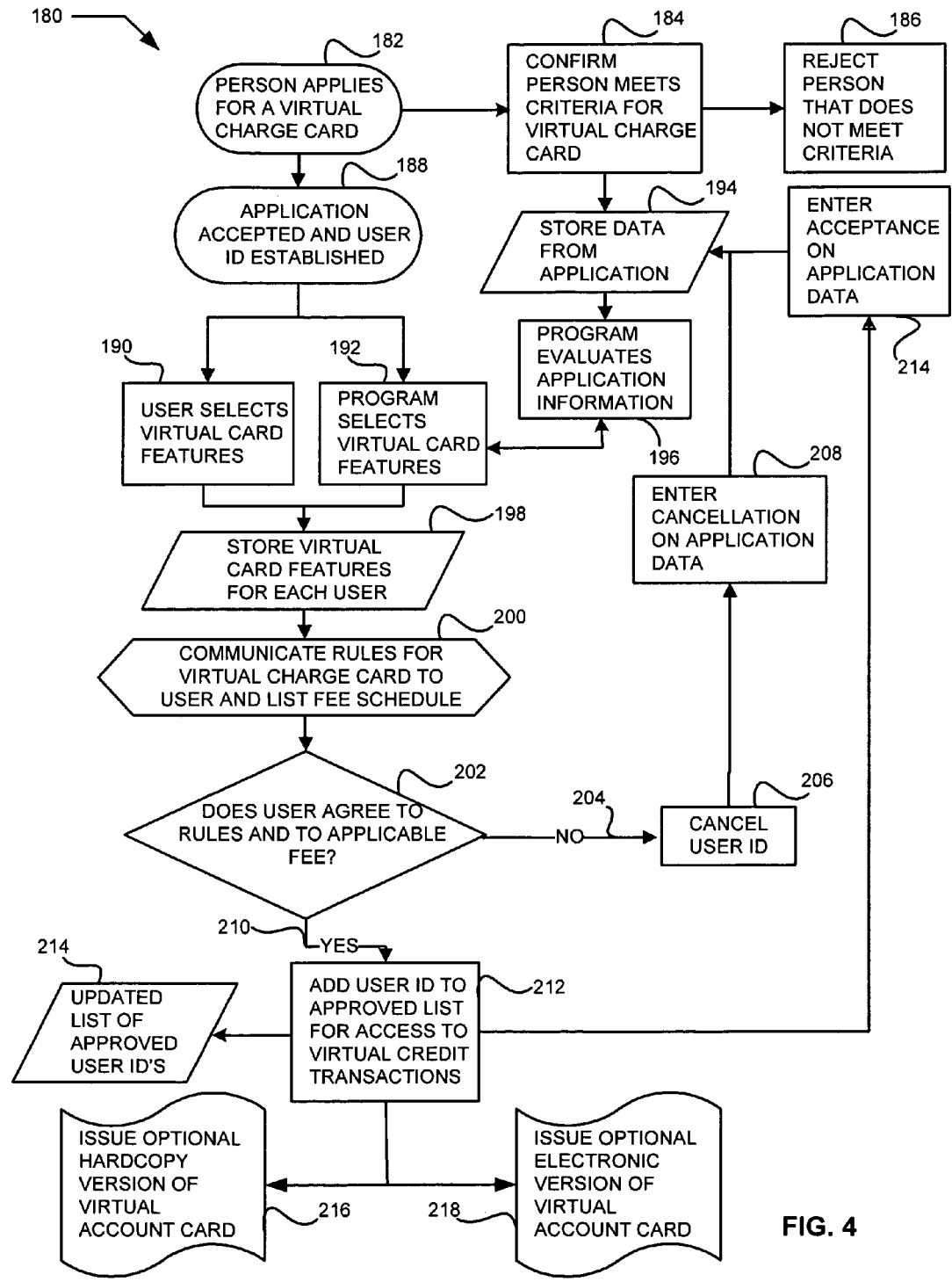
FIG. 4 is another more detailed flow chart showing an exemplary application process for a virtual charge card.

The detailed exemplary flow chart of FIG. 4 shows a process 180 for implementing an application procedure for a virtual charge card. A person who is not already an authorized user can make application (block 182) for a virtual charge card. An evaluation or screening confirms whether or not the person meets predetermined criteria (block 184) for having the virtual charge card. Persons that do not meet the criteria are rejected (block 186). When a person does meet the criteria, their application is accepted and a user ID established (block 188).

In some instances the virtual card features such as credit terms, payment terms, penalties, benefits, and the like may be selected by the user (block 190). In other instances a program may select the virtual card features (block 192), which features may be determined from stored application data (block 194) that is evaluated by the program (block 196). The virtual card features that are selected for each user are stored (block 198) for future reference. Where virtual account terms for a virtual card are being programmed for a new user, such programming may be based on user demographic information.

As part of the application procedure, a fee schedule and virtual card rules are presented to the user (block 200) for consideration. In order to continue the application process, the user decides whether to agree to the rules and applicable fees (block 202). If no agreement occurs (see arrow 204), the user ID is canceled (block 206), and the cancellation is entered (block 208) for storage with the other application data. If agreement is confirmed (see arrow 210), the user ID is added to the approved list (blocks 212, 214) that controls the access to virtual credit transactions involving the virtual credit cards, and the acceptance is also entered (block 214) for storage with the other application data.

A further feature offered to an approved user is the optional issuance of a hardcopy version of the virtual account card (block 216), and also the optional issuance of an electronic version of the virtual account card (block 218).

Figure 5:
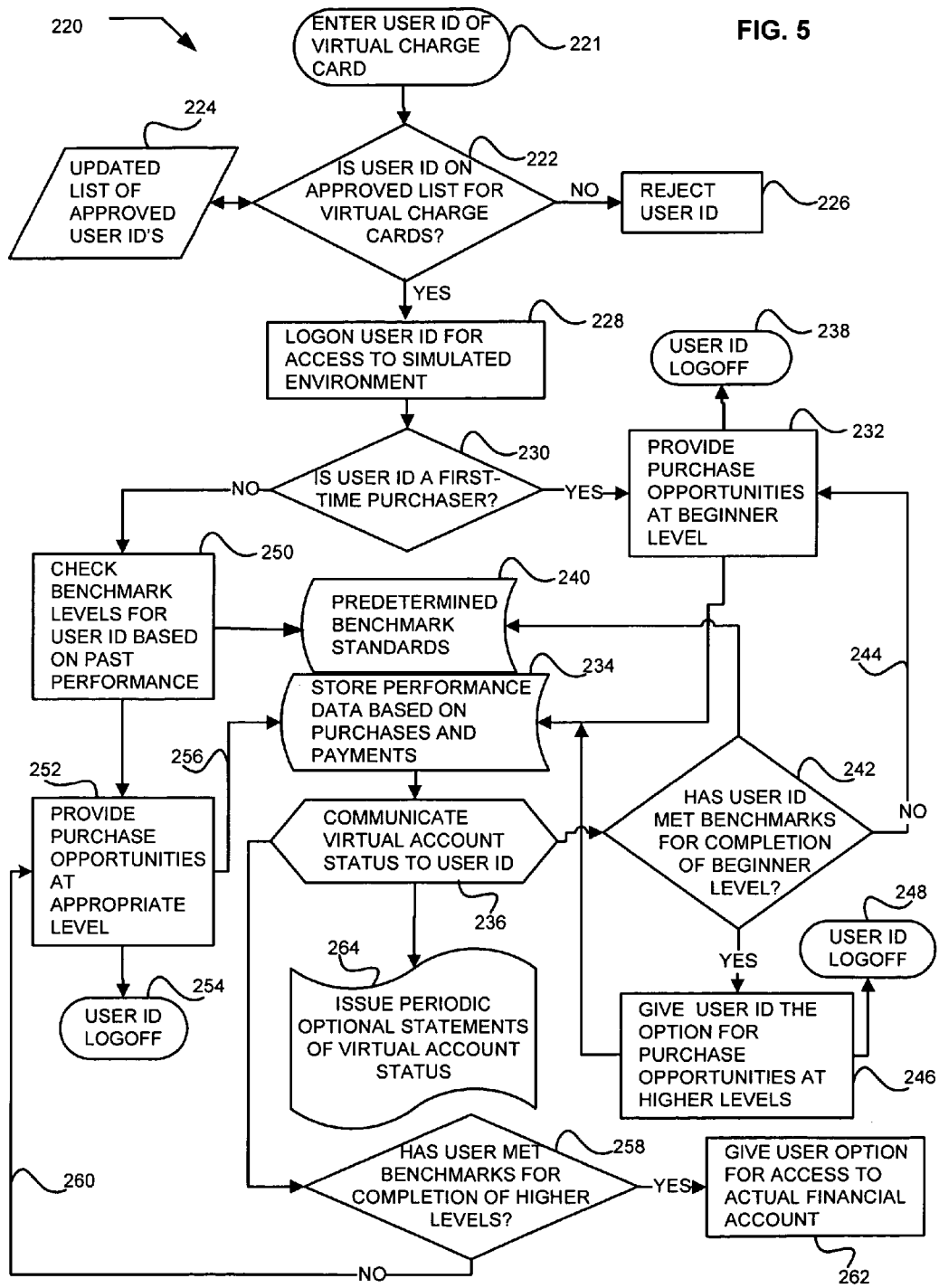
FIG. 5 is a detailed flow chart showing an exemplary manner of using a virtual charge card.

The detailed exemplary flow chart of FIG. 5 shows a process 220 for incorporating benchmark completion as a basis for giving an authorized user the option of having access to an actual financial account. A person is requested to enter the user ID (block 221) of a virtual charge card. The user ID is processed (block 222) to determine whether it is on an updated approved list (block 224). If not found on the updated approved list, the user ID is rejected (block 226). If found on the update approved list, the user ID is approved for logon to have access to a simulated environment (block 228).

A determination may be made to detect a user ID that is a first-time purchaser (block 230). If so, purchase opportunities are made available to the user ID at a beginner level (block 232). Any purchases and/or payments involving the virtual charge card are stored (block 234) as part of a performance data base for future reference. In some instances, revised virtual account terms for the virtual charge card may be programmed based on past performance records maintained in the performance data base. The virtual account status is periodically communicated to the user (block 236). There is no urgency imposed on the user to advance to another participation level, and user logoff (block 238) is available from the beginner level.

A user at the beginner level in this embodiment qualifies for advancement to another participation level when it has been determined that such user has met predetermined benchmark standards (block 240) for completion of the beginner level (block 242). Upon failure to meet such a beginner level benchmark standard, the user can return (see arrow 244) to purchase opportunities at the beginner level. In the event the beginner level benchmarks standards have been met, the user ID is given the option for purchase opportunities at higher levels (block 246). User logoff (block 248) is also available to exit from such higher levels.

When an approved user ID is not a first-time purchaser, a query is made (block 250) to check the stored past performance data (block 234) as compared to the stored benchmark standards (block 240) for this particular user ID. Based on the results of the query, purchase opportunities are provided at the appropriate participation level (block 252), along with a previously described user ID logoff (block 254). Any purchases and/or payments involving virtual credit transactions at these higher participation levels are also stored (see arrow 256) in the performance data base (block 234). The virtual account status is also periodically communicated (block 236) to the users at these higher participation levels.

When a review (block 258) determines that benchmark standards for completion at higher levels have not been met, the user can return (see arrow 260) for further purchase opportunities at such higher levels. Upon satisfactory completion of the higher level benchmark standards, the user has an option for access to an actual financial account (block 262). It is noted that this process embodiment provides for the issuance of periodic optional statements (block 264) indicating the status of the virtual charge card accounts.

Figure 6:
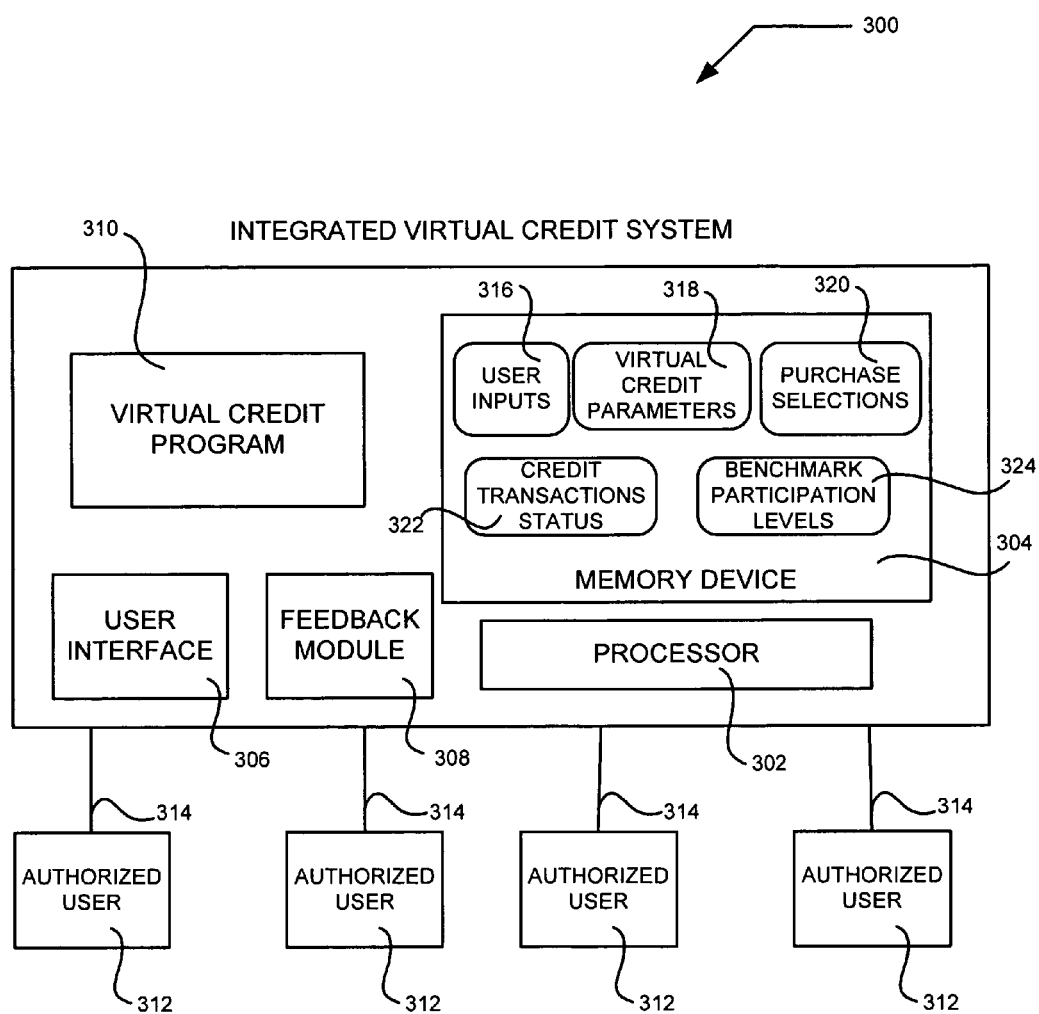
FIG. 6 is a schematic block diagram for an exemplary implementation of some embodiments.

Referring to the schematic block diagram of FIG. 6, an exemplary embodiment of an integrated virtual credit system 300 includes a processor 302, memory device 304, user interface 306, feedback module 308, and virtual credit program 310. A plurality of authorized users 312 who may be at different locations have bi-directional communication links 314 with the virtual credit system 300 in order to submit inputs via the user interface 306 and to receive informational messages from the feedback module 308. The virtual credit program 310 may include one or more computer program products with a carrier medium having program instructions thereon. Such computer program products may run on multiple computer devices or run on an integrated computer system, depending on the circumstances.

The memory device 304 provides re-writable storage capability associated with each authorized user 312. The various categories of data stored in the memory device 304 include user inputs 316, virtual credit parameters 318, purchase selections 320, credit transactions status 322, and benchmark participation levels 324. This system enables multiple users to make simulated purchases or incur simulated credit obligations that are associated with and posted to different virtual accounts. The multiple users are also enabled to make simulated compensation against balances due or obligations owed for the different virtual accounts.

Figure 7:
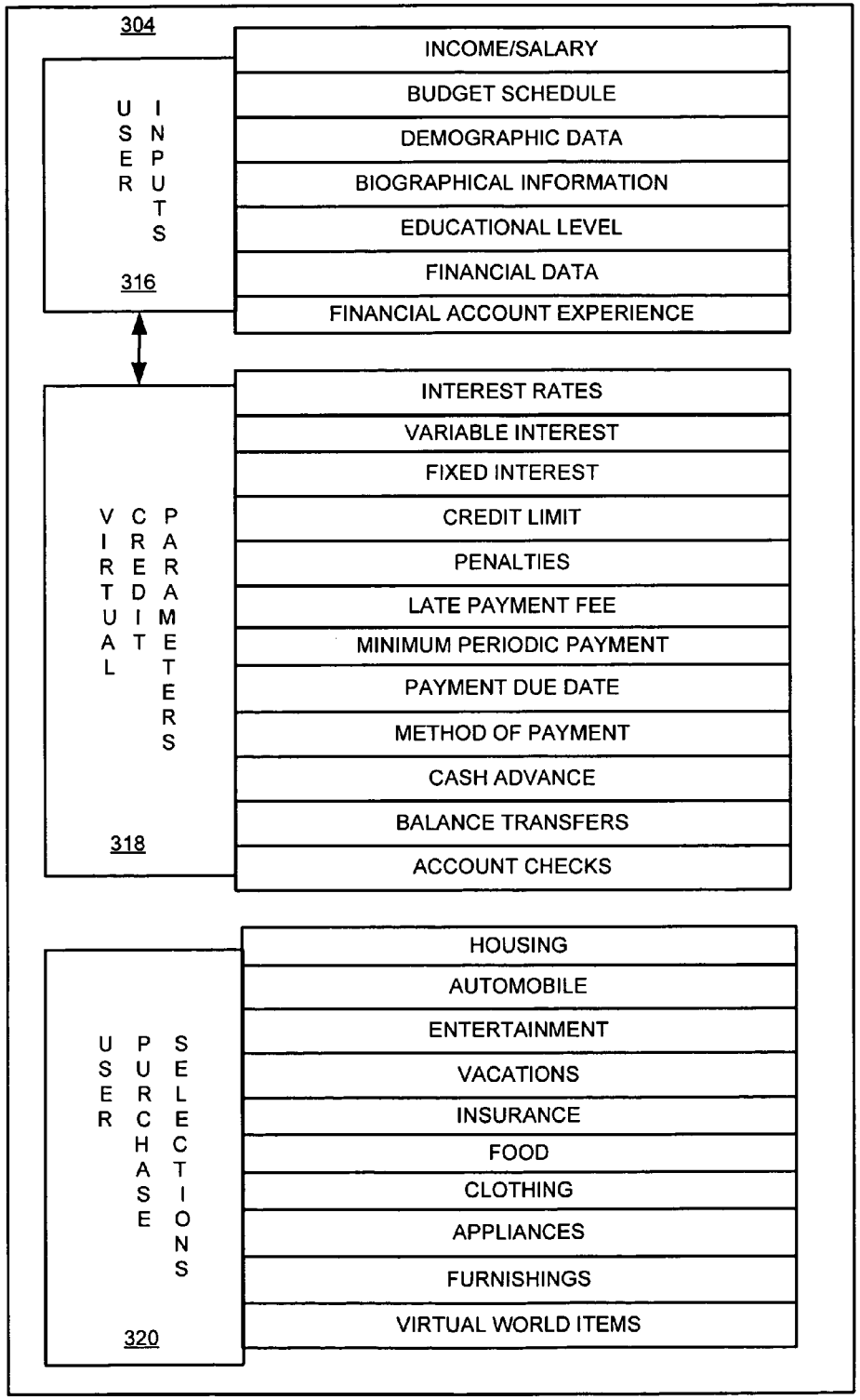
FIG. 7 is a schematic block diagram showing exemplary categories of informational data that may be involved in some embodiments.

The schematic block diagram of FIG. 7 shows an illustrative but not exhaustive list of data categories that can be accessed in the memory 304 by the user interface 306 and the feedback module 308. For example, user inputs 316 may include categories such as income/salary, budget schedule, demographic data, biographical information, educational level, financial, and financial account experience. As an additional example, virtual credit parameters 318 may include categories such as interest rates, variable interest, fixed interest, credit limit, penalties, late payment fee, minimum periodic payment, payment due date, method of payment, cash advance, balance transfers, and account checks. As a further example, user purchase selections 320 may include categories such as housing, automobile, entertainment, vacations, insurance, food, clothing, appliances, furnishings, and virtual world items.

Figure 8:
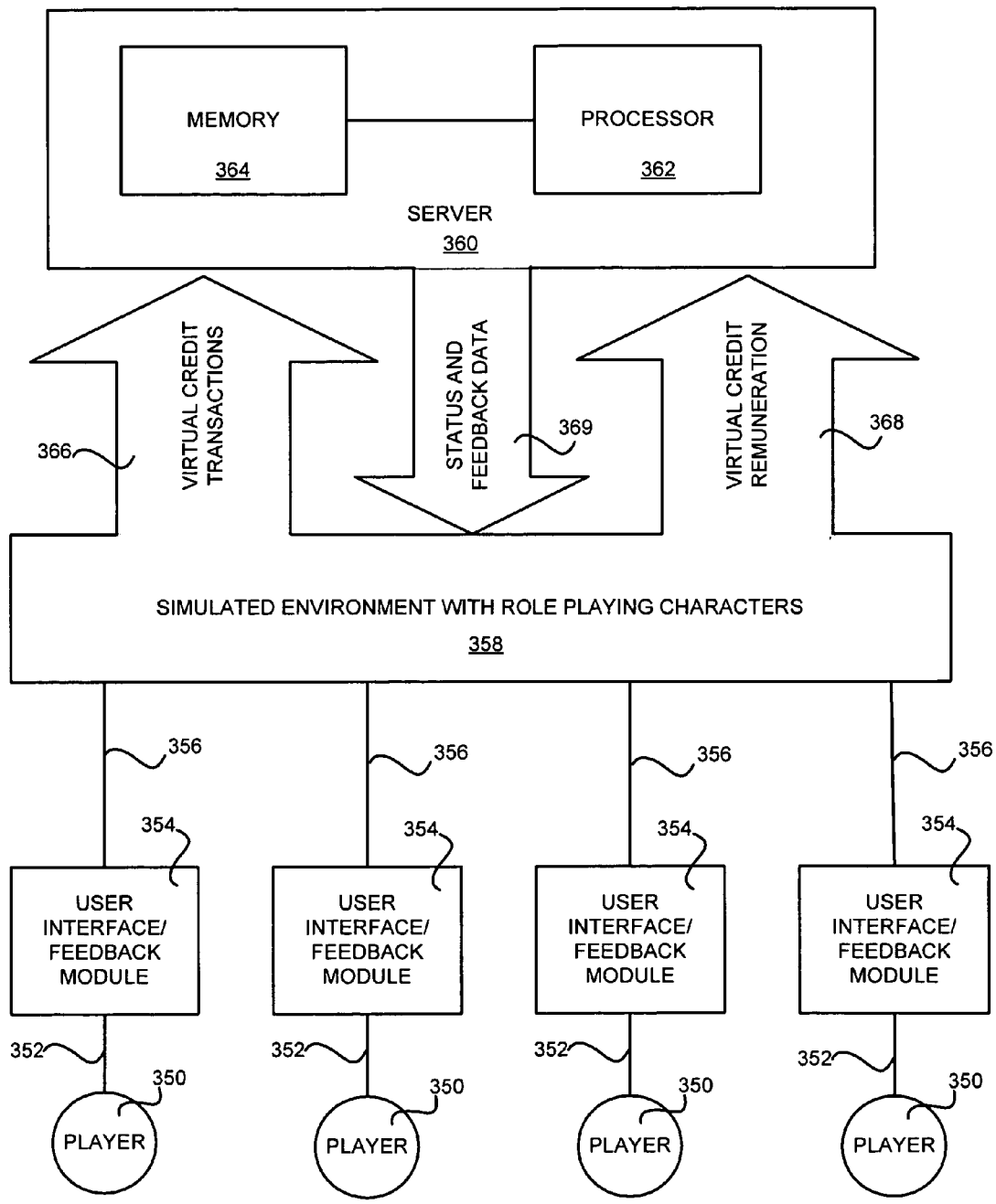
FIG. 8 is a schematic functional diagram showing a possible implementation in a simulated environment with role playing characters.

The schematic block diagram of FIG. 8 shows an exemplary embodiment for a multi-player system implemented in a simulated environment with role playing characters. Of course, other types of simulated environments have the capability for practicing the disclosed methods and techniques, particularly where multiple players interact with the simulated environment over extended periods of time. In many instances the players can logon for a period of participation, and from time to time logoff in order to carry out their real-world activities and obligations, sometimes perpetuating the fictional role playing over many weeks and months.

As shown in FIG. 8, individual players 350 have access via a first bi-directional communication link 352 to a user interface/feedback module 354 with connects through a second bi-directional communication link 356 to a simulated environment 358. Such players can interact with each other or with characters, events, purchase opportunities, competitions, and the like that are provided in the simulated environment 358. The bi-directional communication links also serve to provide player access to products and/or services and/or other items of value that can be acquired pursuant to a virtual credit arrangement.

A server 360 includes a processor 362 connected with a memory 364 in order to receive, store, update, process, and transmit information data and messages regarding virtual credit arrangements related to the simulated environment 358. In that regard, various details regarding virtual credit transactions are transmitted through a third communication link 366 to the server 360. Similarly various details regarding virtual credit remuneration or compensation are transmitted through a fourth communication link 368 to the server. Another communication link 369 enables status and feedback information to be communicated back to the simulated environment 358, and in some instances back to the players 350.

Figure 9:
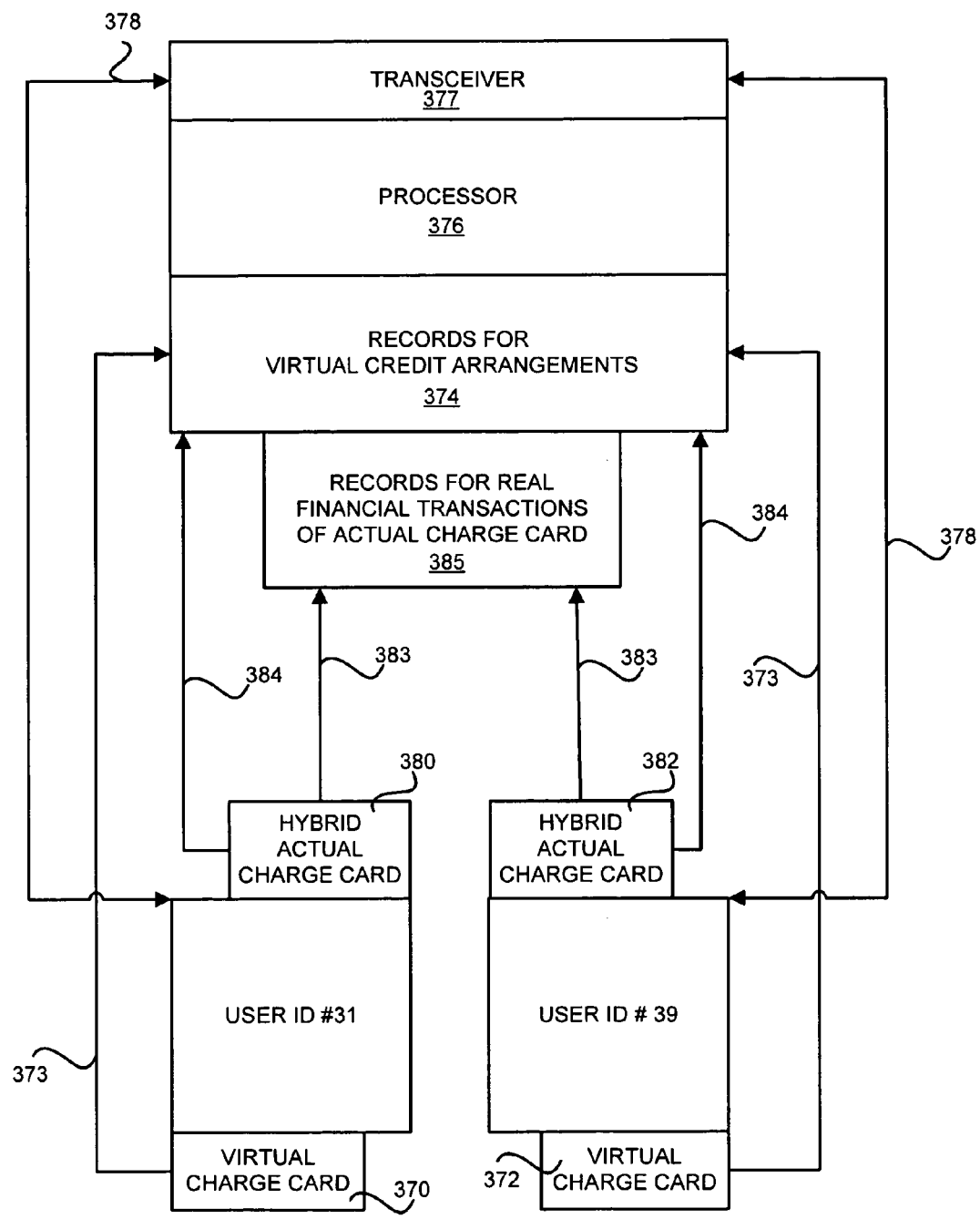
FIG. 9 is a schematic functional diagram for an exemplary system that embodies various features.

The schematic block diagram of FIG. 9 shows an exemplary embodiment wherein multiple users (e.g., user ID #31 through user ID #39) can use virtual accounts such as virtual charge cards 370, 372 in order to participate in virtual financial transactions. When the virtual charge card is used, a record of the transaction is transmitted as indicated by arrows 373 for storage in a memory device 374 that keeps records for virtual credit arrangements. A processor 376 is operatively coupled to the memory device 374 and also to a transceiver 377 for bi-directional communication regarding the virtual financial transaction through link 378 with the users #31 through #39.

These same users #31 through #39 also have access to hybrid actual charge cards 380, 382 in order to participate in actual real-world financial transactions. When the hybrid actual charge card is used, a record of the transaction is transmitted as indicated by arrows 383 for storage in a memory device 385 that keeps records for real financial transactions. Such real financial transactions may or may not be related to a virtual credit arrangement. However in some instances the hybrid actual charge card usage may be directly or indirectly related to a virtual credit arrangement, including but not limited to down payments, guarantees, compensation, renegotiation, resolution, transferability, etc. The details of such relationship will be communicated to the virtual credit arrangements storage memory device 374 as indicated by arrows 384. The bi-directional communication link 378 serves shared functional purposes for both the virtual charge card and the actual charge card, including but not limited to transmitting messages regarding credit terms associated with each different user ID account as well as feedback and status information for purchases, payments, negotiations, remuneration, and resolution involving the virtual credit arrangements.

It will be understood that the processor 376 and bi-directional link 378 are also operatively coupled with the memory device 385 in order to provide bi-directional communication regarding hybrid charge card transactions through link 378 with the users #31 through #39. Such communications may include the results or consequences of purchases and/or payments made regarding the actual charge card transactions. Such communications may also relate to terms of a credit transaction.

It will be further understood that all of the references herein to communication links with virtual account users and real-world account users may include interactive communications involving question/answer sequences, prompt/selection sequences, option/choice sequences, and the like.

It will also be understood by those skilled in the art that the various communication links can be separated into different communication channels or media as well as combined into an integrated broadband or narrowband link such as wired, wireless, cable, etc. It is further understood that integrated or separate modules can be provided for user interface functions and/or for feedback functions. The particular exemplary systems disclosed herein are provided only for illustration.

Figure 10:
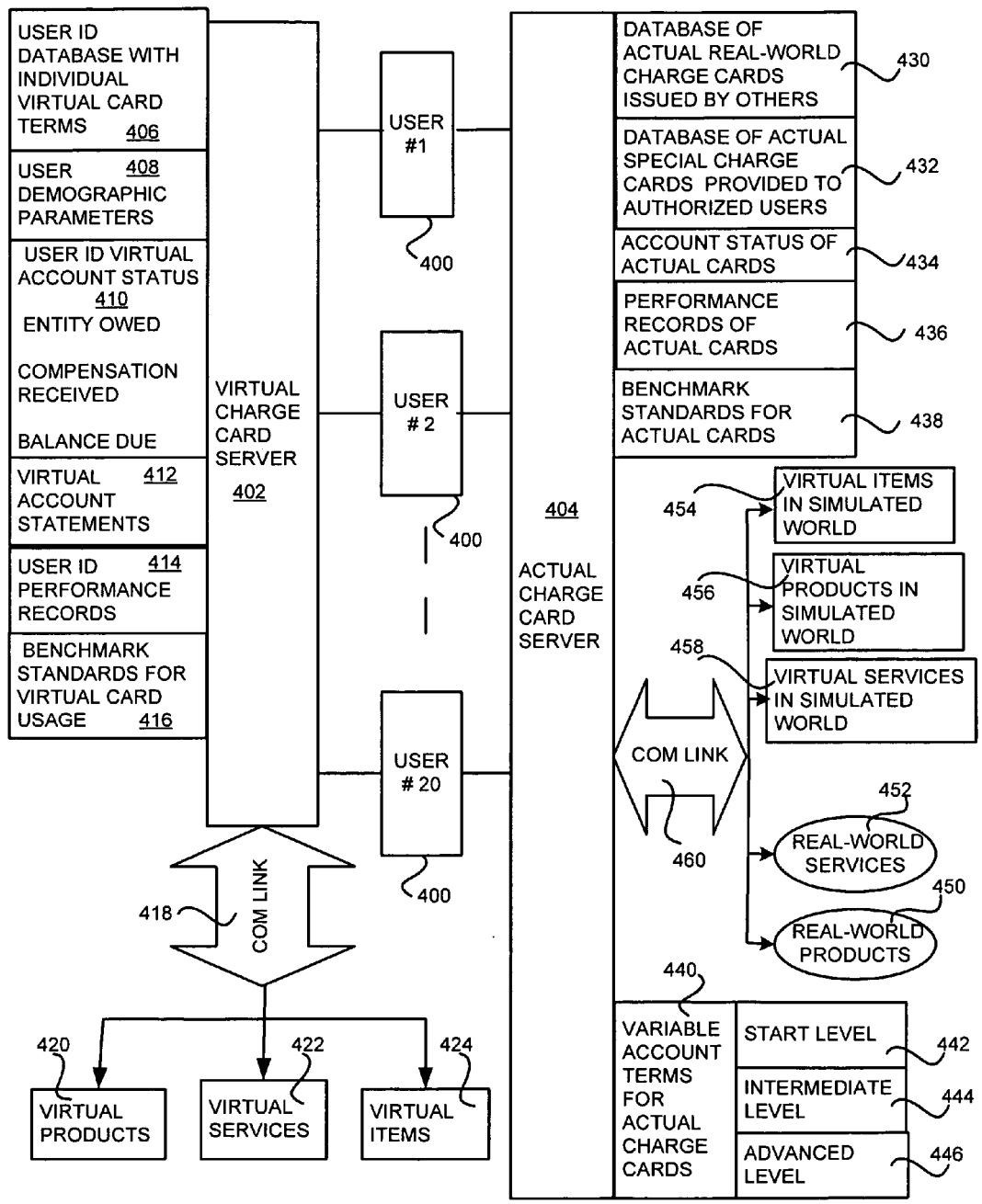
FIG. 10 is a more detailed schematic functional diagram for some embodiments that incorporate virtual charge cards and real-world charge cards.

Referring to the schematic block diagram of FIG. 10, a plurality of persons 400 (e.g., user #1, user #2 through user #20) have access to both a virtual charge card server 402 and an actual charge card server 404. The disclosed system provides for monitoring any action taken to make resolution or provide compensation that may be required by a virtual credit arrangement.

The embodiment of FIG. 10 provides a server apparatus including a memory and a processor for maintaining information regarding credit transactions involving purchases by a user of various virtual products and/or services and/or virtual items. A bi-directional user interface is provided for exchanging information messages between the user and the server apparatus regarding credit terms associated with the purchases. As described in more detail herein, the embodiment of FIG. 10 is an exemplary implementation of a system and method wherein credit transactions are capable of resolution by virtual-world compensation and by real world compensation.

The access shown for the multiple users in FIG. 10 is for purposes of illustration, and persons skilled in the art will understand that various types of communication links can be utilized to achieve the necessary functional data and message exchanges between the users and the computerized data processing and storage systems exemplified by the servers.

Also, various types of virtual credit arrangements and real-world financial accounts can be incorporated into the type of system as disclosed herein. In some instances, specific terms of a virtual credit arrangement or transaction may be based on one or more factors such as demographic information, financial account records, experience levels, completion of performance benchmarks, role play world activities, and user negotiations.

The virtual charge card server 402 includes various predetermined data records as well as other dynamically updated records that are used by the server to help provide virtual credit services based on different types of credit arrangements and accounts. Exemplary categories of records available to the virtual charge card server 402 include user ID data and related individual virtual card terms 406, user demographic parameters 408, user ID virtual account status data 410 (e.g., entity/person owed, compensation already received, and remaining balance due), virtual account statements 412, user ID performance records 414, and benchmark standards for virtual card usage 416.

A bi-directional communication link 418 enables the users 400 to have access for engaging in credit transactions involving virtual products 420, virtual services 422, and virtual items 424. When a credit transaction has been completed based on advertised or negotiated terms, the informational details are transmitted via communication link 418 to the server for appropriate processing and storage. This allows any balance due or obligation owed to be posted to the user's virtual credit account. When remuneration is made by one of the multiple users with something of real value against such balances due or obligations owed, such activity is also posted to the appropriate virtual credit account.

The actual charge card server 404 includes various predetermined data records as well as other dynamically updated records that are used by the server to help provide actual credit services based on different types of credit arrangements and accounts. Exemplary categories of records available to the actual charge card server 404 includes a database 430 of actual real-world charge cards issued to users by others such as third party issuers, a database 432 for actual special charge cards provided to authorized users, account status records 434 for actual charge cards, and performance records 436 for actual charge cards. These records help to identify actual real-world accounts selected by a user, including the actual special charge cards created for the user.

Other categories of records include benchmark standards 438 for actual charge cards, and variable account terms 440 for actual charge cards. These variable account terms 440 may be divided between exemplary levels such as start level accounts 442, intermediate level accounts 444, and advanced level accounts 446. The actual charge card server 404 may enable a user to have an option to move between different participation levels. In some instances completion of performance benchmarks may be required before allowing the user to move to a high participation level.

Many of the functional capabilities and possibilities attributable to virtual credit accounts may also be provided to actual hybrid charge card accounts. For example, the user may be enabled to vary one or more of the credit terms such as interest rate, due date, grace period, penalties, credit limit, service charge, transferability, weekly or monthly or annual fees, automatic repayment, payment of other obligations, monetary advance, re-negotiated debt, and exchange value.

Some of the actual charge cards are primarily suitable for use in purchasing real-world products 450 and real-world services 452. This may especially be true of actual charge cards issued by third parties. However, some actual financial accounts issued by third parties as well as some actual special cards such as hybrid cards described herein may also have capability to purchase or otherwise become involved in transactions related to simulated credit arrangements such as simulated purchases of virtual world items 454, virtual world products 456, and virtual world services 458. As indicated in the drawing, such virtual items, products and/or services may often be found in a simulated environment such as a role playing fictional world. A bi-directional communication link 460 enables the users to engage in the various credit transactions, and provide for transaction details to be processed by the actual charge card server 404 and stored or updated in the appropriate database.

It will be understood from the embodiments of FIGS. 9 and 10 that hybrid charge accounts can be associated with a plurality of users, respectively, for use with credit transactions involving purchases of various virtual products and/or virtual services and/or virtual items. Furthermore, an aspect of the disclosed methods and systems for hybrid charge accounts provides for their credit terms to be established or changed based at least partially on user selections, demographics, user performance, user experience, and/or benchmark parameters.

The embodiments of FIGS. 8, 9 and 10 further illustrate computer apparatus that provides virtual credit including storing and processing virtual credit transactions involving products or services or items that are available in a simulated environment. An interactive communication link with the computer apparatus enables a user to participate in the virtual credit transactions. A user interface is capable of operable connection to the interactive communication link in order for the user to transmit informational inputs and to make selections that help to provide a basis for credit terms of the virtual credit transactions.

The interactive communication link also enables the user to make remuneration of a debt or an obligation resulting from the virtual credit transactions. Such remuneration may be in the form of real-world money or fictional-world money.

Based on the foregoing descriptions and drawing disclosures of exemplary embodiments, many new and advantageous features provide benefit to the virtual credit account users, as well as benefits to the entities that provide financial account services, and benefits to entities that provide simulated role playing environments. In that regard, some embodiments enable multiple users to make remuneration with something of virtual value against balances due or obligations owed for virtual credit accounts. In some embodiments multiple users can make remuneration with something of real value as resolution of virtual debts or obligations.

Features disclosed herein also include billing simulated purchases to a virtual account that allows carry-over balances. Feedback is communicated to the user regarding results of carry-over balances such as non-payment, partial payment, and full payment of balances due. Feedback is also communicated to the user regarding consequences of related purchase and payment activity for virtual credit accounts. In some instances, the system and method provides monitoring of actions taken to make resolution or provide compensation required by a virtual credit account arrangement.

Other features include periodically changing various credit terms for a virtual credit arrangement, such as interest rates, due dates, grace periods, penalties, credit limits, service charges, transferability, weekly or monthly or annual fees, automatic repayment provisions, payment of other obligations, monetary advances, re-negotiation of the debt, and exchange value as compared to real-world or fictional money. In certain instances, the user may have the option to vary one or more of these virtual account terms.

Various types of virtual credit accounts as well as actual financial accounts can be incorporated into the disclosed methods, processes, systems and apparatus including actions allowing carry-forward balance, accounts requiring full payment, debit cards, accounts with free benefits, accounts with extra-cost benefits, accounts providing discount promotions, cash advance accounts, accounts with beneficial links, insurance product accounts, accounts with value added benefits, business and financial institution charge cards, checking accounts, lines of credit, vouchers, and installment promissory notes accounts.

Performance benchmarks for virtual credit arrangements or accounts in accordance with certain aspects of the disclosure herein may be based on the credit record of virtual accounts; credit record of real financial accounts, test results, fictional role playing achievements, fictional role playing skills acquired, previous experience, endorsements, and group memberships in real world and role playing environments. Completion of such performance benchmarks may be required before allowing the transfer to a higher participation level, and also before facilitating transition of the user to an actual financial account. Such performance benchmarks may be based on activities of the user in a role playing environment.

It is to be understood that different categories of purchases may be available to be charged to a virtual credit account, such as travel reservations, auctions, food, clothing, merchandise, vehicles, insurance, appliances, furnishings, recreation, competitions, other items having virtual monetary value, installment purchases, entertainment, rentals, education, books, publications, games, other items having real monetary value, and fictional role playing items.

Some embodiments contemplate using a simulated billing period for virtual credit account that occurs in real time at various intervals, such as a month, a week, a day, an hour, or lesser periods. The simulated billing period may be based on various parameters such as the number of purchase transactions, average balance owed, highest balance owed, user's age, user's education, user's experience level, and user's benchmark performance.

Virtual account terms can be based on various informational data, such as demographic information, past performance records, user negotiations, and choices selected by users. The terms of usage of hybrid charge accounts capable of both virtual account activities and real-world financial transactions can be established or changed based at least partially on user selections, user demographics, as well as other factors that are also used for determining virtual credit account terms.

Although the virtual credit arrangements may primarily involve transactions involving real-world money and/or fictional world money, some embodiments clearly contemplate virtual credit arrangements and accounts that may require remuneration with a non-monetary real-world item or action, as well as remuneration with a non-monetary fictional world item or action.

In some preferred embodiments, computerized components and systems enable multiple users to make purchases or incur obligations associated with different virtual credit accounts. Also such computerized implementations enable multiple users to provide compensation against balances due or obligations owed for different virtual accounts.

The exemplary system and apparatus embodiments shown in FIGS. 6-10 along with other components, devices, know-how, skill and techniques that are known in the art have the capability of implementing and practicing the methods and processes shown in FIGS. 1-5. It is to be understood that the methods and processes can be incorporated in one or more computer program products with a carrier medium having program instructions thereon. However it is to be further understood that other systems, apparatus and technology may be used to implement and practice such methods and processes.

Figure 11:
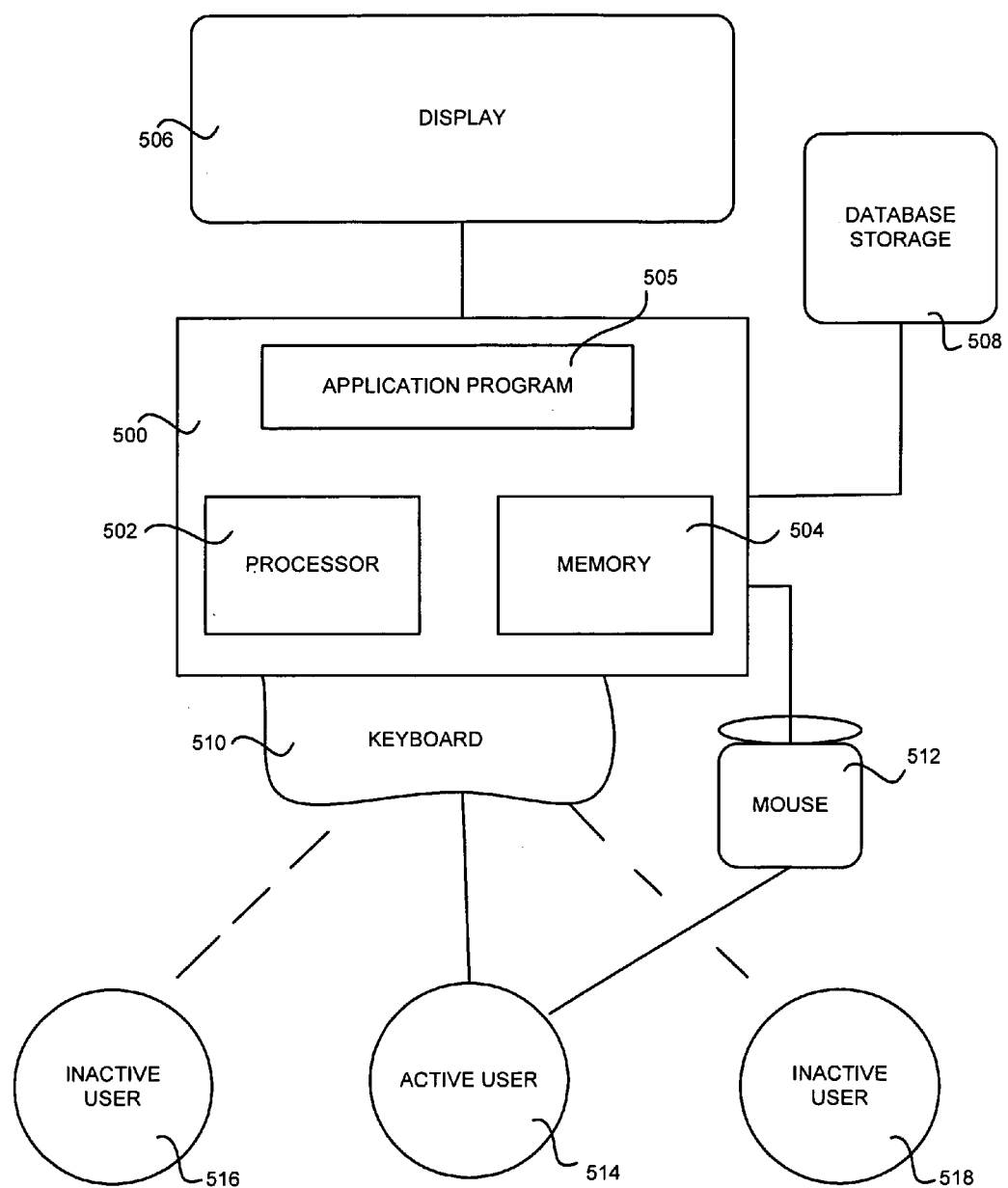
FIG. 11 is a schematic block diagram for certain embodiments implemented for one or more users sharing a computer system.

Referring to FIG. 11, a computerized implementation for the methods disclosed herein may include a computer system 500 having a processor 502 and memory 504 for running an application program 505. The application program 505 may be incorporated in one or more computer program products having a carrier medium with program instructions thereon. Peripheral components may include display 506 and database storage unit 508 as well as input devices such as keyboard 510 and mouse 512. An active user 514 may have access to features disclosed in the exemplary flowcharts of FIGS. 16-25 by running the application program 505. Inactive users 516, 518 may also periodically have access to the application program 505 including non-real time interaction through the program with each other and/or with active user 514 in order to participate in the benefits and advantages of the methods and processes disclosed herein.

Figure 12:
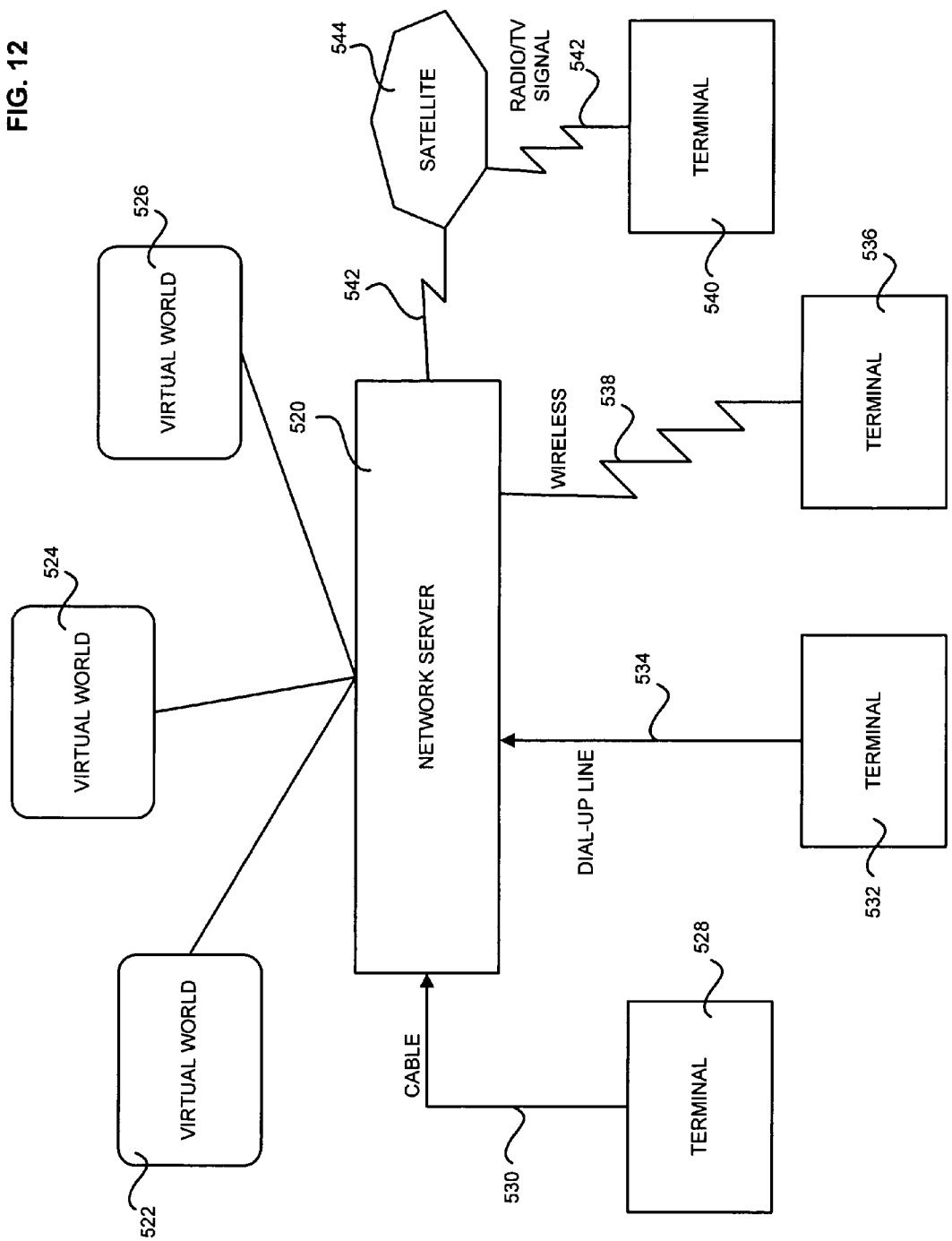
FIG. 12 is a schematic block diagram for possible implementations involving different virtual world environments accessed via exemplary types of communication links.

The schematic diagram of FIG. 12 illustrates the availability of the present methods and processes in a networking system having a network server 520 with communication links to different virtual world environments 522, 524, 526. In this exemplary version, terminal 528 has access through cable connection 530, terminal 532 has access through dial-up line 534, terminal 536 has access through wireless connection 538, and terminal 540 uses transmission signals 542 (e.g., radio or television signals) via satellite 544 for access to network server 520. As with the system of FIG. 11, players may be logged on to participate simultaneously in real-time virtual credit transactions in simulated world environments, or be respectively logged on during non-overlapping or partially overlapping time periods. Such participation may be directly with other parties or indirectly through intermediaries, depending on the circumstances involved.

Figure 13:
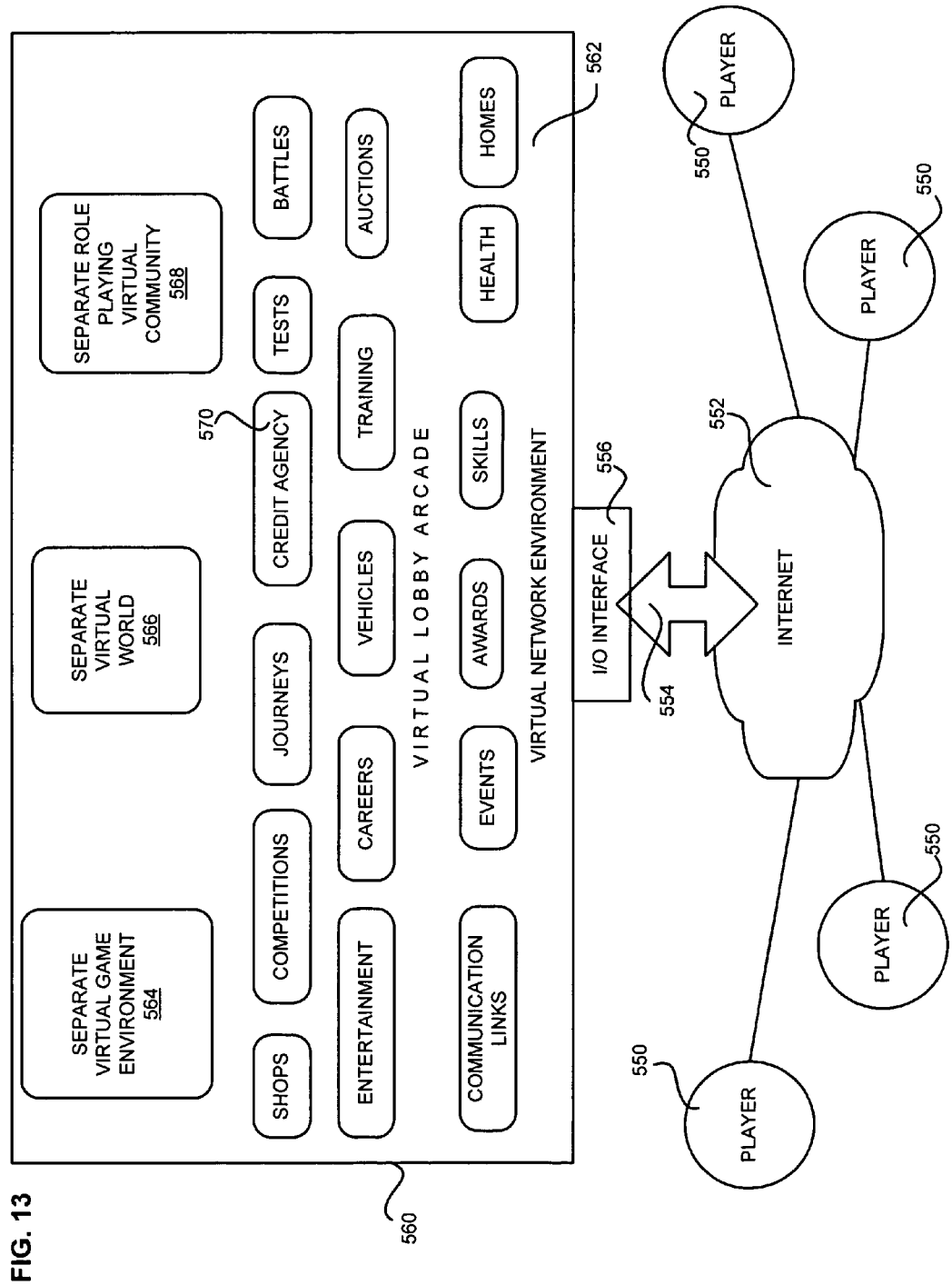
FIG. 13 is a schematic block diagram showing an embodiment providing player access via the Internet to a virtual network of separately operated virtual world environments.

Referring to the schematic diagram of FIG. 13, access to virtual network environment 560 may be accomplished for players 550 via Internet 552 having an interactive communication link 554 through I/O interface 556. Such a virtual network 560 may include a virtual lobby arcade 562 with various types of virtual opportunities. The categories for such virtual opportunities are almost unlimited, and may for example include shops, competitions, journeys, test, battles, entertainment, careers, vehicles, training, auctions, communication links, events, awards, skills, health and homes. A virtual credit agency office 570 operating, for example, as a storefront business may enable players to obtain information and issuance of virtual credit accounts usable in the virtual lobby arcade 562.

It will be understood that separately owned virtual environments may be included as part of the virtual network environment 560, including virtual game environment 564, virtual world 566, and role playing virtual community 568. The credit services of virtual credit agency office 570 may also be usable in these separate individual virtual environments based on appropriate agreements with their owners and/or operators.

Figure 14:
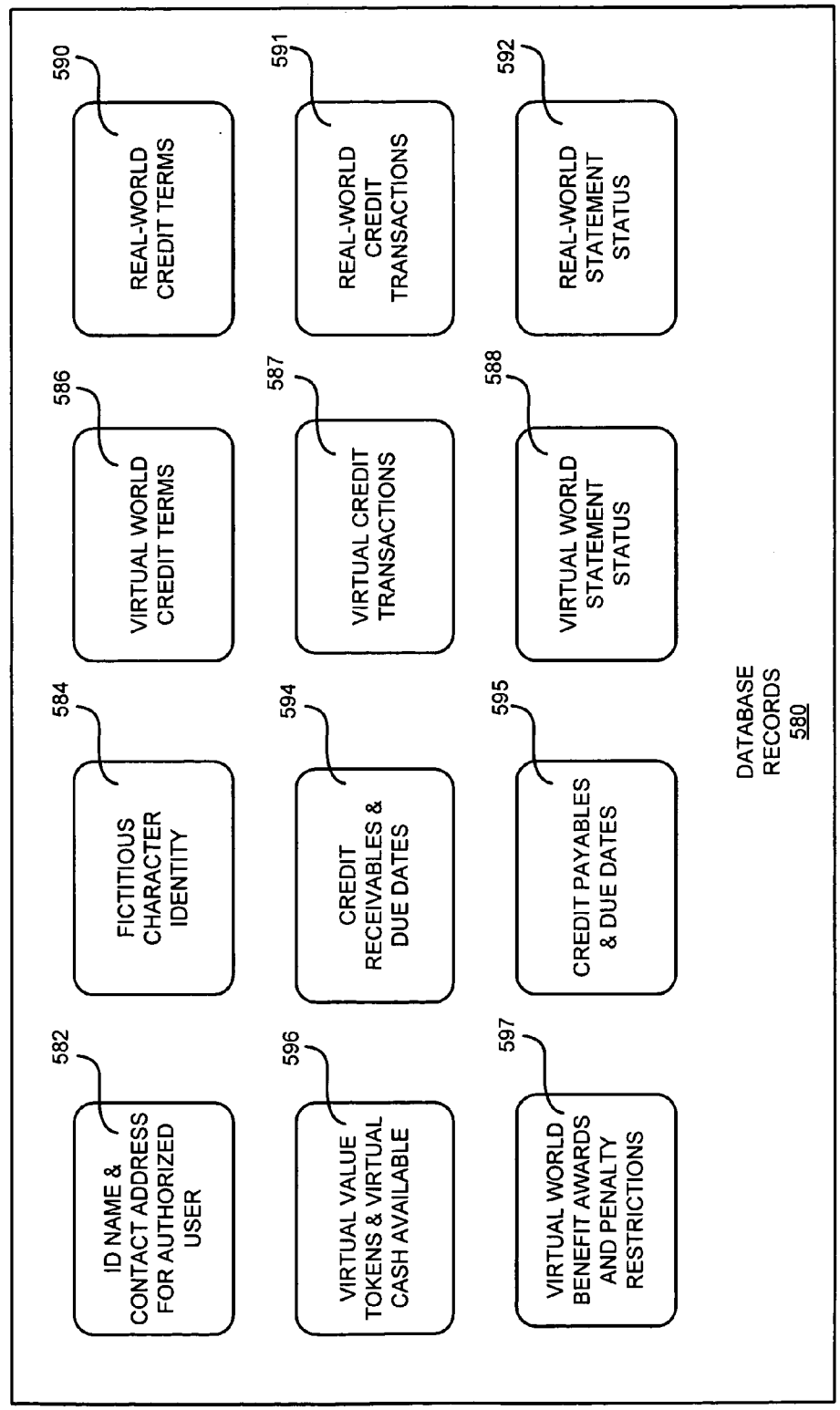
FIG. 14 shows exemplary types of database records related to real-world and virtual world credit transactions.

The schematic illustration of FIG. 14 shows exemplary database records 580 that may be used to practice the business and credit techniques disclosed herein. Various exemplary categories of records may include an ID name and contact address 582 for an authorized user, a fictitious character identity 584 for such user, virtual world credit terms 586 for a particular credit account, virtual credit transactions 587, and virtual world statement status 588. Where the credit account includes the optional features for real-world credit transactions, other exemplary categories of records may include real-world credit terms 590 for a particular credit account, real-world credit transactions 591, and real-world statement status 592.

Further exemplary categories of database records may include credit receivables and related due dates 594, credit payables and related due dates 595, virtual value tokens and virtual case available 596 for a particular player's account, and virtual world benefit awards and penalty restrictions 597 applicable to a particular player's account. It will be understood by those skilled in the art that these types of records are dynamically updated based on activity in the real-world as well as in virtual world environment. Such records are accessible as appropriate to players, credit account entities, third party business owners, virtual world environment operators and owners, and the like.

Figure 15A:
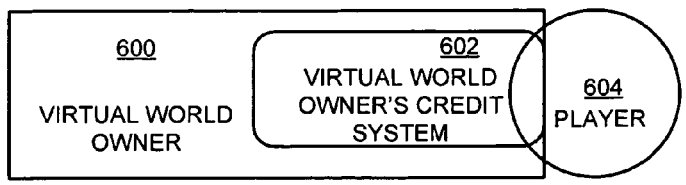
FIGS. 15A through 15E schematically illustrate some exemplary implementations of virtual credit arrangements in a simulated environment.

Various exemplary inter-relationships arising from the virtual credit transactions contemplated by the present methods and processes are illustrated in the schematic diagrams of FIGS. 15A-15E. For example, FIG. 15A depicts a virtual world publisher 600 operating a virtual world credit system 602 that extends credit to a player 604 based on the player's purchases and credit arrangements involving that particular virtual world.

Figure 15B:
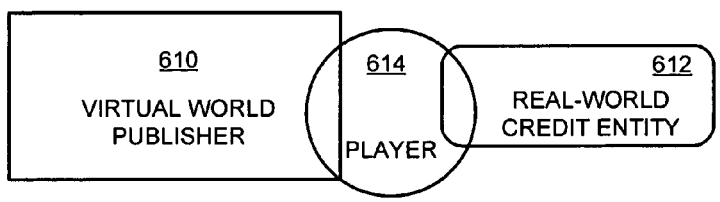

FIG. 15B shows an exemplary implementation wherein a virtual world publisher 610 engages another credit entity such as, for example, a real-world credit entity 612 for the purpose of offering virtual credit services to a player 614 who participates in that particular virtual world.

Figure 15C:
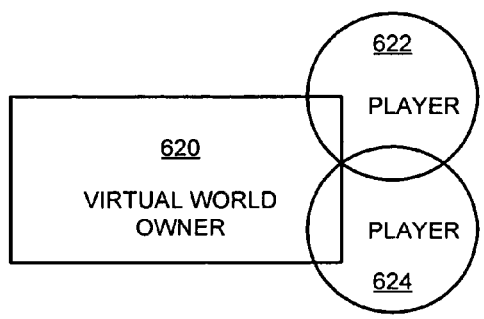

FIG. 15C shows an exemplary implementation wherein a virtual world publisher 620 enables multiple players such as 622, 624 to enter into virtual credit arrangements with each other.

Figure 15D:
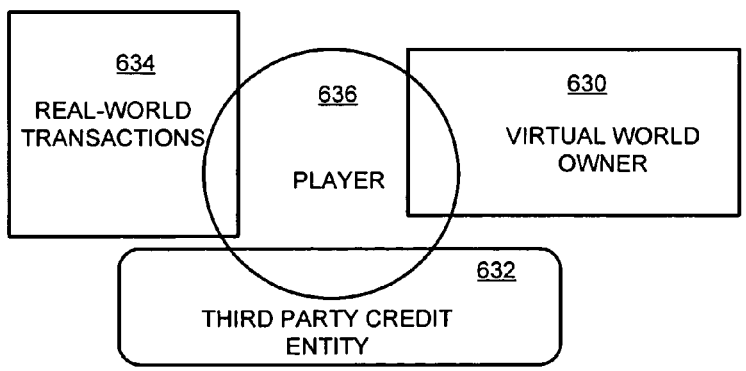

FIG. 15D shows an exemplary implementation wherein a virtual world owner 630 enables another credit entity 632 to offer either or both types of credit services: virtual world credit services to a virtual world participant or player 636, and real-world credit services involving real-world transactions 634.

Figure 15E:
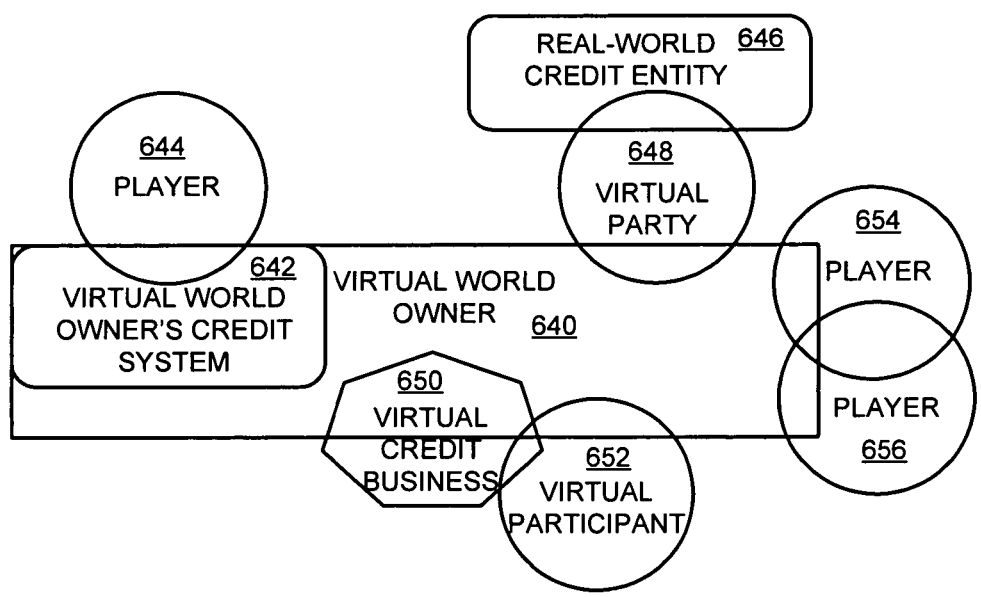

FIG. 15E shows an exemplary implementation wherein an entity or person owning virtual world rights 640 has its own virtual world credit system 642 that may involve one or more virtual participants such as player 644. A separate virtual credit business 650 operated by an authorized third party may offer its own credit account or arrangement to one or more virtual participants 652. A real-world credit entity 646 may provide virtual credit services to one or more virtual parties 648. As a final example occurring in this illustrated version of a virtual world embodiment, players 654, 656 may be enabled and allowed to arrange virtual credit transactions with each other.

It will be understood from the description and drawings herein that various embodiments of computer hardware and/or computer program products provide an opportunity for a selected credit entity to offer various types of virtual world credit services, including but not limited to virtual credit transactions between virtual world participants, virtual credit transactions between an owner or operator of the virtual world environment and one or more virtual world players, and virtual credit transactions between a third party virtual business entity and one or more virtual world players.

It will be further understood that different implementations in computer hardware and/or computer program products as disclosed herein enable a credit entity to use various forms of virtual world credit publicity and advertising including but not limited to sponsoring an event and/or an activity and/or a location in the virtual world, providing audio and/or visual and/or graphic and/or textual publicity in the virtual world, programming an activity or event in the virtual world that automatically comes to the attention of one or more virtual world players, and assuming a character role in the virtual world.

The exemplary embodiments of computer hardware and/or computer program products also enable a virtual credit card object that is issued by a credit entity to be capable of manipulation by a player in the virtual world. Such a credit entity may also have a capability of operating a real-world credit business. Such a credit entity may be controlled and/or operated by a party that also controls and/or operates the virtual world. Such a credit entity may also be involved with a credit transaction with one or more non-player third party entities in the virtual world. Such a credit entity may also be involved in a credit transaction with an owner or operator of the virtual world.

Some exemplary system embodiments disclosed herein include a processor linked to a database record and to an output device for providing a billing statement indicating payment obligations of the virtual credit account valuated in one or more of the following: fictional world money, real-world money, and non-monetary fictional world value tokens.

Some system implementations further provide a processor linked to a database record and to an output device for providing a billing statement indicating payment obligations of the virtual credit account based on one or more of the following: interest, penalties, due date, purchase activity price, real-world credit performance record, and fictional world credit performance record.

For embodiments involving special virtual credit accounts that provide both fictional world and real-world benefits, database records are capable of storing and updating advances of fictional world value given to an account user in exchange for future compensation. Such database records may be capable of storing and updating a repayment of the future compensation made one or more of the following: real-world money, fictional world money, non-monetary fictional world value tokens.

Some embodiments of the present system may include database records capable of storing and updating information relating to fictional world transactions charged to the virtual credit account. In some instances the virtual credit account may be used for real-world transactions.

One aspect of the system disclosed here includes database records that are capable of storing identity information for a real-world entity or person responsible for real-world obligations and/or fictional world obligations of the special virtual credit account. Such database records may also be capable of storing and updating information relating to real-world transactions charged to the virtual credit account.

In some instances, the virtual credit account business may provide fictional world benefits to a virtual credit account user based on performance information in the database records related to the real-world transactions charged to the special virtual credit account.

Some system embodiments may include a fictional world environment that allows purchase activity or virtual credit account business involving one or more of the following: fictional world owner, fictional world operator, third party virtual business entity, real-world credit entity, fictional world credit entity, fictional world player, fictional world participant, and fictional world character.

Figure 16:
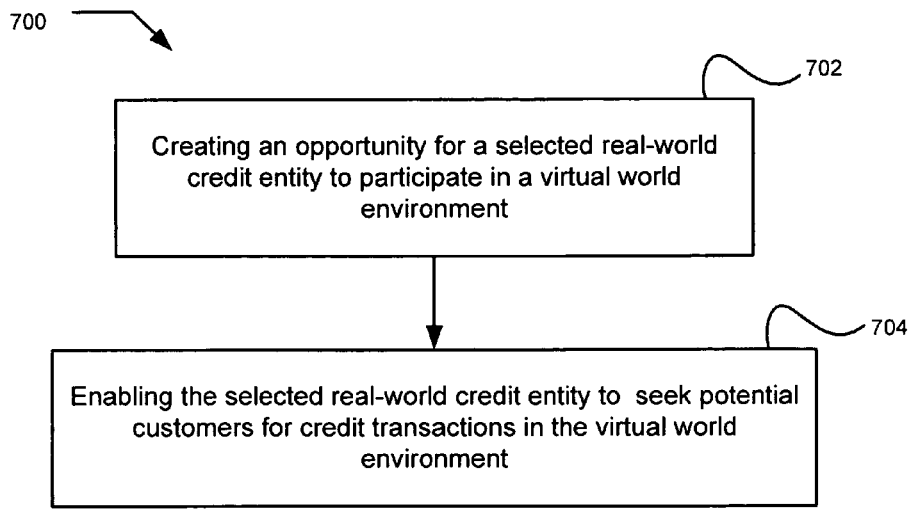
FIGS. 16 through 25 are flow charts illustrating different exemplary processes for implementing various embodiments of financial ventures involving virtual credit arrangements as disclosed herein.

Referring to the high level exemplary flow chart of FIG. 16, an exemplary process 700 creates an opportunity for a selected real-world credit entity to participate in a virtual world environment (block 702). A selected real-world credit entity is enabled to seek potential customers for credit transactions in the virtual world environment (block 704).

Figure 17:
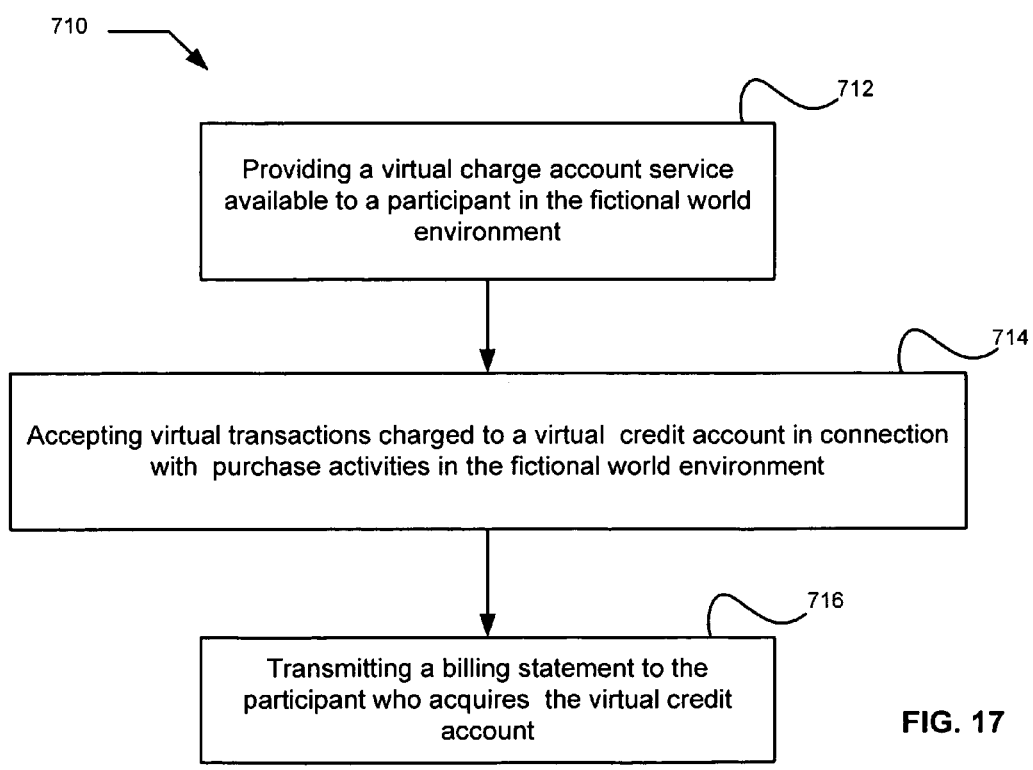

Another high level exemplary flow chart of FIG. 17 discloses a process 710 for providing a virtual charge account service available to a participant in the fictional world environment (block 712). In this implementation, the process accepts virtual transaction to be charged to a virtual credit account in connection with purchase activities in the fictional world environment (block 714). A billing statement is transmitted to the participant who acquired the virtual credit account (block 716).

Figure 18:
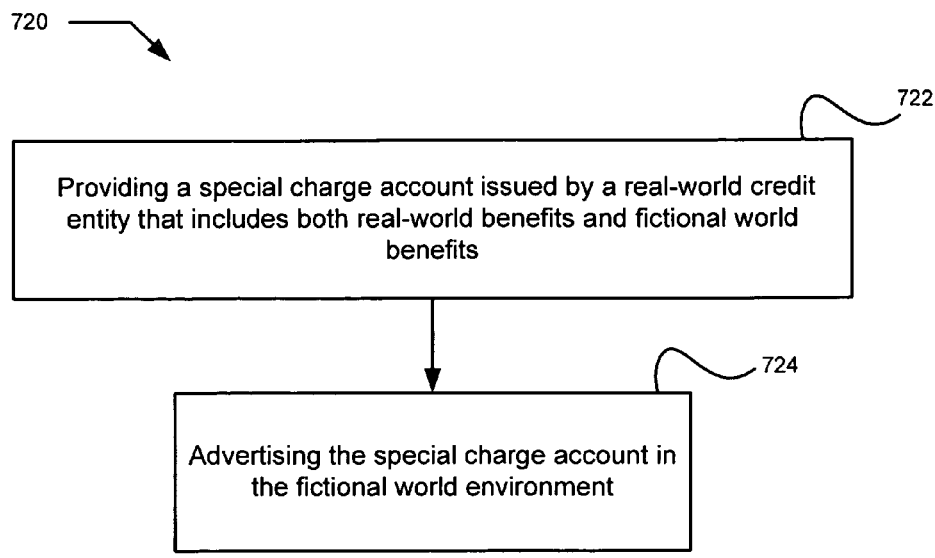

An additional process implementation 720 in the high level exemplary flow chart of FIG. 18 provides a special charge account issued by a selected credit entity that includes both real world benefits and fictional world benefits (block 722). The process further provides for advertising the special charge account in the fictional world environment (block 724).

Figure 19:
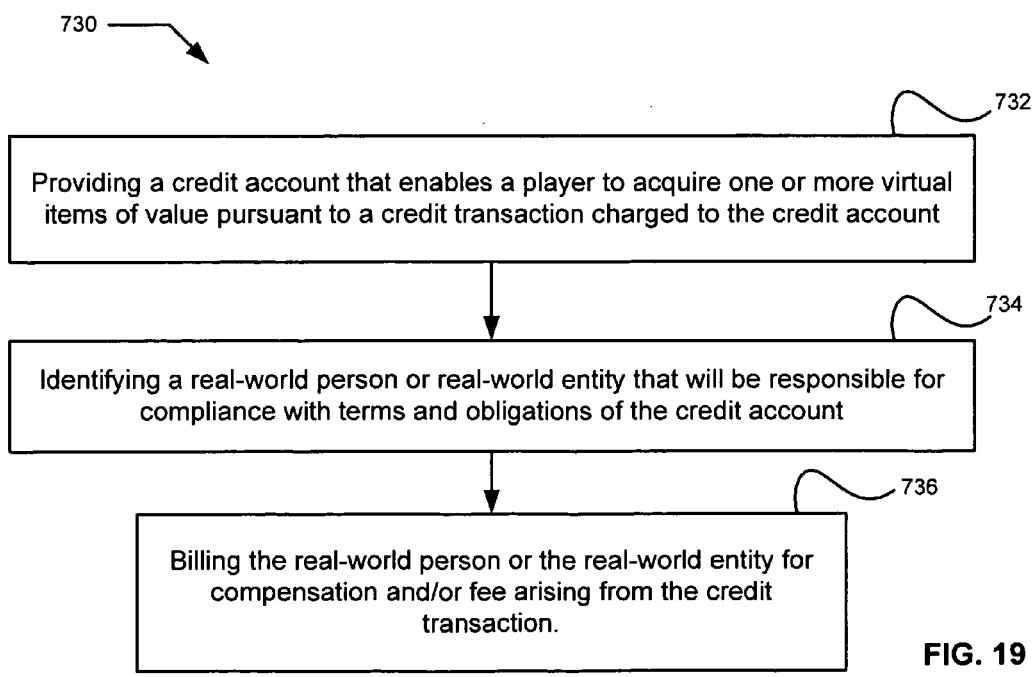

Yet another aspect of certain embodiments is disclosed in a high level exemplary process 730 of FIG. 19 that provides a credit account enabling a player to acquire one or more virtual items of value pursuant to a credit transaction charged to the credit account (block 732). A real-world person or real-world entity is identified that will be responsible for compliance with terms and obligations of the credit account (block 734). The process implements a billing to such responsible real-world person or real-world entity for compensation and/or fee arising from the credit transaction (block 736).

Figure 20:
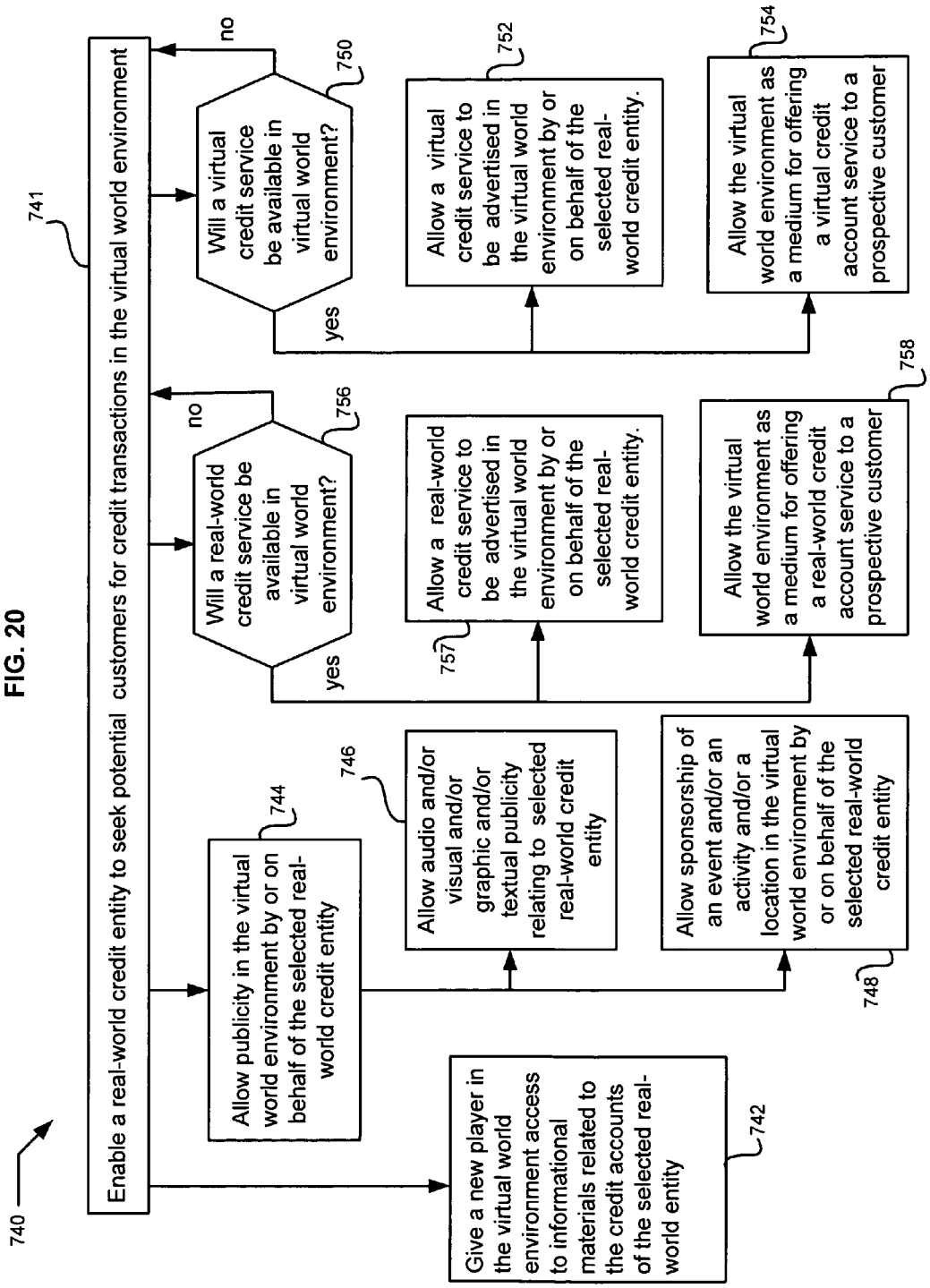

The exemplary flow chart of FIG. 20 illustrates a more detailed process 740 that enables a real-world credit entity to seek potential customers for credit transactions in the virtual world environment (block 741). One exemplary feature provides for giving a new player in the virtual world environment access to informational materials related to the credit accounts of the selected real-world entity (block 742).

Publicity is allowed in the virtual world environment by or on behalf of the selected real-world entity (block 744). Such publicity may include allowing audio and/or visual and/or graphic and/or textual publicity relating to the selected real-world entity (block 746). Other exemplary publicity may include allowing sponsorship of an event and/or an activity and/or a location in the virtual world environment by or on behalf of the selected real-world credit entity (block 748).

At some point in time a decision is made whether or not a virtual credit service will be made available in the virtual world environment (decision block 750). If not, then additional efforts seeking potential customers (block 741) may take place. If so, then the virtual credit service may be allowed to be advertised in the virtual world environment by or on behalf of the selected real-world credit entity (block 752). Also the virtual world environment may serve as a medium for actually offering the virtual credit account service to a prospective customer (block 754).

A decision is also made whether or not a real-world credit service will be made available in the virtual world environment (decision block 756). If not, then additional efforts seeking potential customers (block 741) may take place. If so, then the real-world credit service may be allowed to be advertised in the virtual world environment by or on behalf of the selected real-world credit entity (block 757). Also the virtual world environment may serve as a medium for actually offering the real-world credit account service to a prospective customer (block 758).

Figure 21:
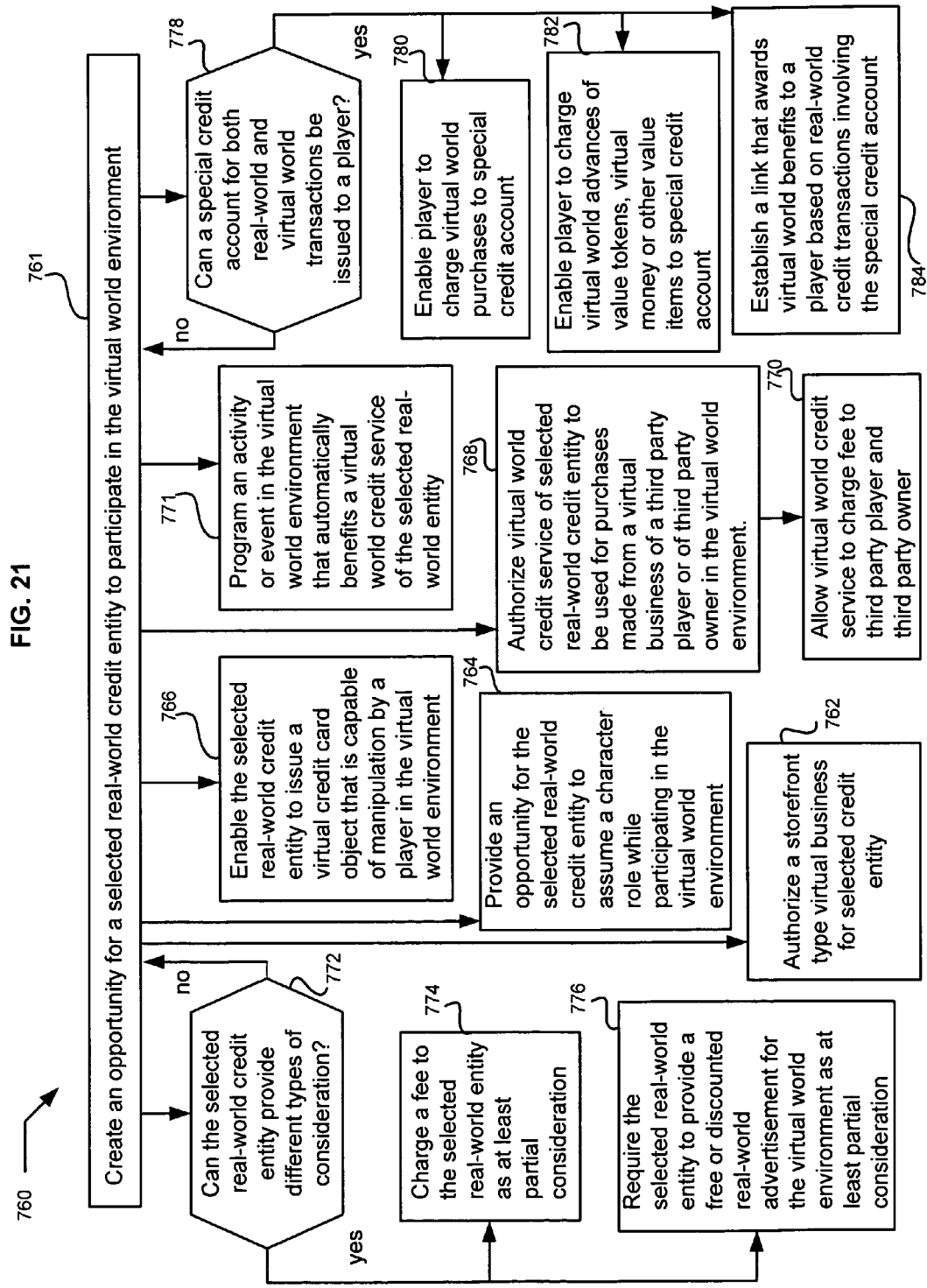

The exemplary flow chart of FIG. 21 illustrates a more detailed process 760 that creates an opportunity for a selected real-world credit entity to participate in the virtual world environment (block 761). Such an opportunity may include providing authorization for the selected credit entity to have a storefront type virtual business (block 762). Other possible opportunities for participation include the selected real-world credit entity assuming a character role while participating in the virtual world environment (block 764). Also the selected real-world credit entity may be enabled to issue a virtual credit card object that is capable of manipulation by a player in the virtual world environment (block 766).

Other types of participation may include authorizing a virtual world credit service of the selected real-world credit entity to be involved with purchases made from a virtual business of a third party player or third party owner in the virtual world environment (block 768). In some instances the virtual world credit service is allowed to charge a fee to the third party player and to the third party owner (block 770). A further type of participation may include programming an activity or event in the virtual world environment that automatically benefits a virtual world credit service of the selected real-world entity (block 771).

The participation of the selected real-world credit entity in the virtual world environment will probably require a decision about the different types of consideration to be provided by the selected real-world credit entity (decision block 772). If consideration is not considered to be necessary, then other types of participation can nevertheless proceed. When some consideration is deemed appropriate, it may be at least partially provided by charging a fee to the selected real-world credit entity (block 774). At least partial consideration may also be provided by requiring the selected real-world entity to provide a free or discounted real-world advertisement for the virtual world environment (block 776).

A choice may also involve whether a special credit account for both real-world transactions and virtual world transactions can be issued to a player (decision block 778). If the decision is negative or to be delayed, the other types of participation can still proceed: If the decision is affirmative, then various interactions involving are possible with the special credit account including but not limited to: enabling a player to charge virtual world purchases to the special credit account (block 780); and enabling a player to charge virtual world benefits received in advance such as value tokens, virtual money, or other value items to the special credit account (block 782); and establishing a link that awards virtual world benefits to a player based on real-world credit transactions involving the special credit account (block 784).

Figure 22:
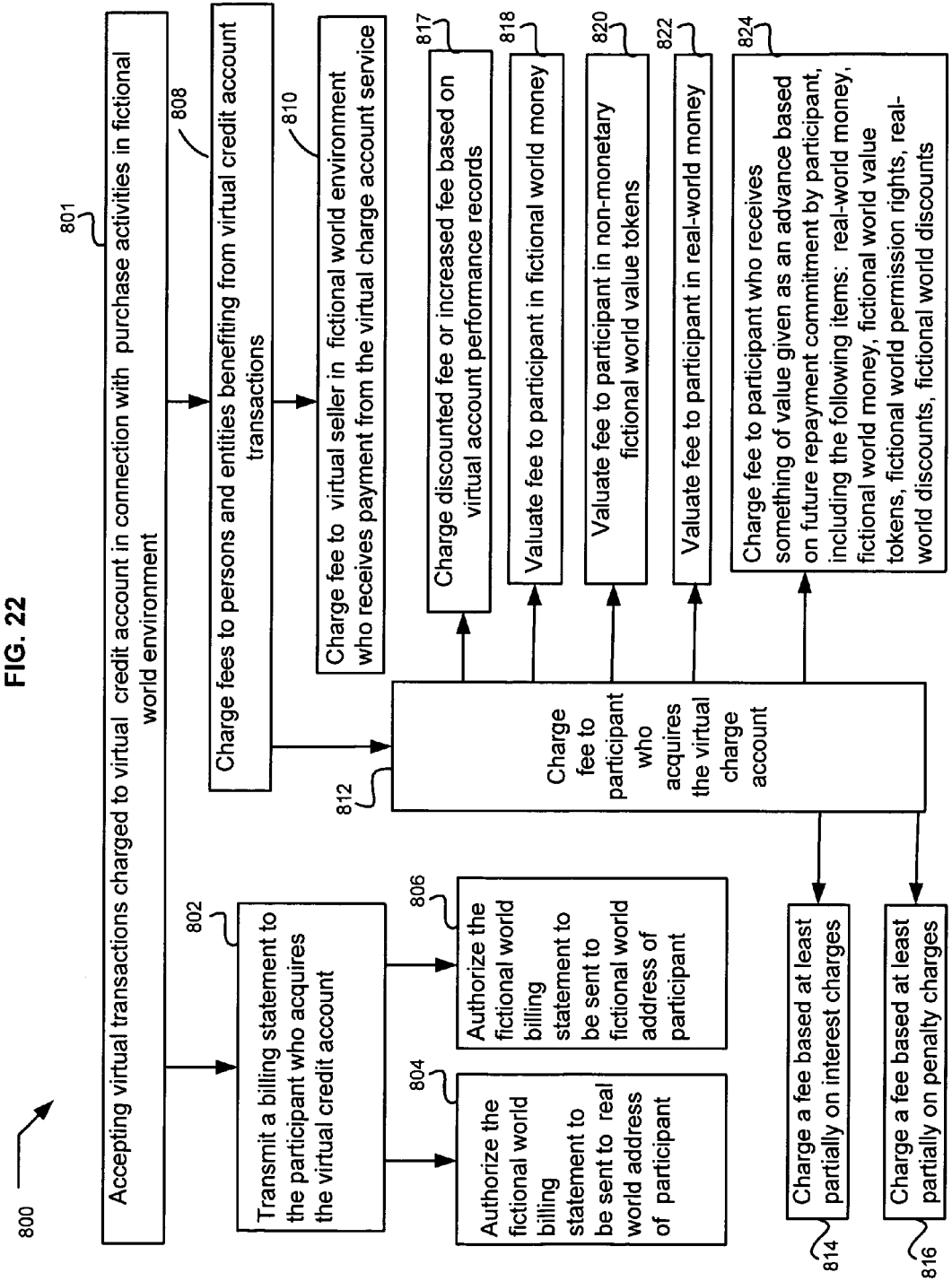

The exemplary flow chart of FIG. 22 discloses an implementation of the presently disclosed method 800 for accepting virtual transactions charged to a virtual credit account in connection with purchase activities in a fictional world environment (block 801). When such charges occur, a billing statement is transmitted to the participant who acquires the virtual credit account (block 802). Such fictional world billing statement may be authorized to be sent to a real world address of the participant account holder (block 804) or to a fictional world address of the participant account holder (block 806).

Revenue may be provided by charging fees to persons and entities benefiting from the virtual credit account transactions (block 808). Such fees may include but not be limited to the following: a fee charged to a virtual seller in the fictional world environment who receives payment from the virtual charge account services (block 810); and different types of fees charged to a participant who acquires the virtual credit account (block 812) as part of the virtual charge account service (block 812).

Examples shown for fees charged to a participant account holder may include a discounted fee or alternatively an increased fee based on the performance records for the virtual credit account (block 817). The various fees charged to a participant who owns or is responsible for the virtual credit account may be valuated in fictional world money (block 818), non-monetary fictional world value tokens (block 820), and real world money (block 822).

Another category of transactions involving the virtual credit account that may generate fees from a virtual world participant relates to advance benefits (i.e., something of value) given to the participant based on a future repayment commitment. Examples of such advance benefits funded by the virtual credit account include real-world money, fictional world money, fictional world value tokens, fictional world permission rights, real-world discounts, and fictional world discounts (block 824).

Figure 23:
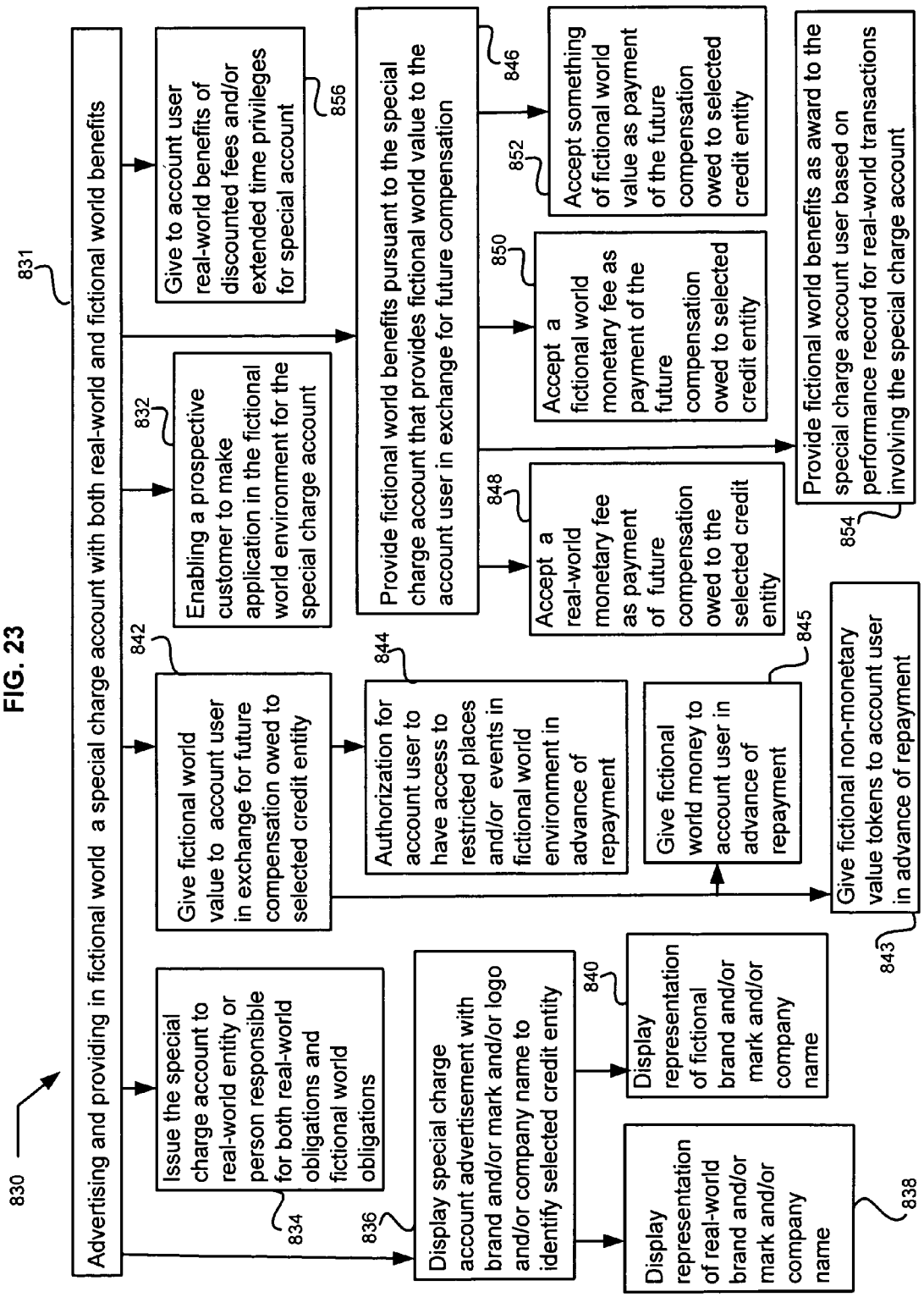

A further more detailed aspect of the method disclosed herein is shown in the process 830 of the exemplary flow chart of FIG. 23. This illustrated implementation enables a prospective customer to make application in the fictional world environment for the special charge account (block 832).

The implementation of FIG. 23 includes advertising and providing in a fictional world environment a special charge account having both real-world and fictional world benefits (block 831). Such advertising may be implemented in special charge account displays of a brand and/or mark and/or logo and/or company name identifying the real-world credit entity (block 836). Such displays may feature a real-world (block 838) as well as a fictional world (block 840) brand, mark, logo, and company name of the real-world credit entity.

Other types of special charge account activity may involve giving something of fictional world value to an account user in exchange for future compensation owed to the real-world credit entity (block 842). Such fictional world value items may include giving authorization for the account user to have access to restricted places and/or restricted events in the fictional world environment in advance of repayment (block 844). Other exemplary advance credits available with the special charge account may include giving an account user fictional non-monetary value tokens in advance of repayment (block 843). The special charge account may also give fictional world money to an account user in advance of repayment (block 845).

Some embodiments of the disclosed method provide other types of advance fictional world benefits pursuant to the special charge account services providing fictional world value to the account user in exchange for future compensation (block 846). These advance benefits may include, for example, accepting different types of future compensation for debts owed by a virtual credit account user including the accepting payment of real-world monetary fees (block 848), fictional world monetary fees (block 850), and something of fictional world value (block 852).

Fictional world award benefits may also be provided to the virtual credit account user based on the performance record for real-world transactions involving the special charge account (block 854). It is to be understood that in some embodiments such real world transactions can be directly or indirectly charged to the special charge account. Other real-world benefits may be given to special account users in the form of discounted access fees and/or extended time privileges in the fictional world environment.

Figure 24:
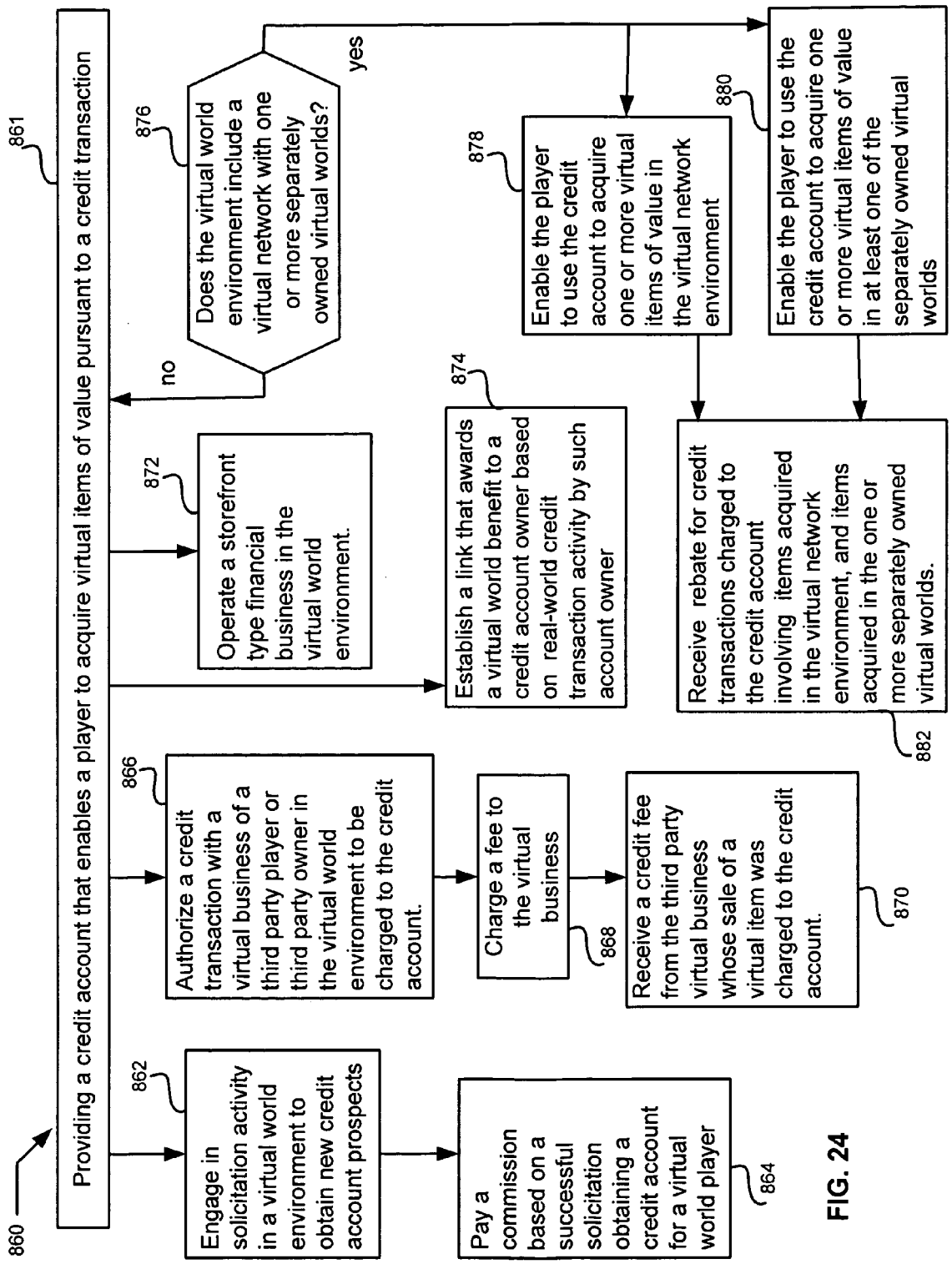

Another aspect of the presently disclosed method is illustrated in a process 860 shown in exemplary flow chart of FIG. 24 relating to providing a credit account that enables a player to acquire virtual items of value pursuant to a credit transaction (block 861). Initial activities may include engaging in solicitation activity in a virtual world environment to obtain new credit account prospects (block 862). A commission may be paid based on a successful solicitation that results in obtaining a credit account for a virtual world player (block 864).

The credit account services may include authorization of a credit transaction with a virtual business of a third party player or third party owner in the virtual world environment to be charged to the credit account (block 866). Such a credit transaction may include charging a fee to the virtual business (block 868), which may be received from the third party virtual business whose sale of a virtual item was charged to the credit account (block 870).

Other credit account activities may include operating a storefront type financial credit business in the virtual world environment (block 872). A link may be established that awards a virtual world benefit to a credit account owner based on real-world credit transaction activity by such account owner (block 874).

Some virtual world environments may be more complex, and an inquiry may determine whether the virtual world environment includes a virtual network with one or more separately owned virtual worlds (decision block 876). If not, then other activities may still be provided. If so, then it may be desirable to enable a player to use the credit account to acquire one or more virtual items of value in the virtual network environment (block 878). As a further possibility, it may be desirable to enable a player to use the credit account to acquire one or more items of value in at least one or perhaps more of the separately owned virtual worlds (block 880).

Other business relationships may be possible such as receiving a rebate for credit transactions charged to the credit account involving items acquired in the virtual network environment, as well as items acquired in the one or more separately owned virtual worlds (block 882).

Figure 25:
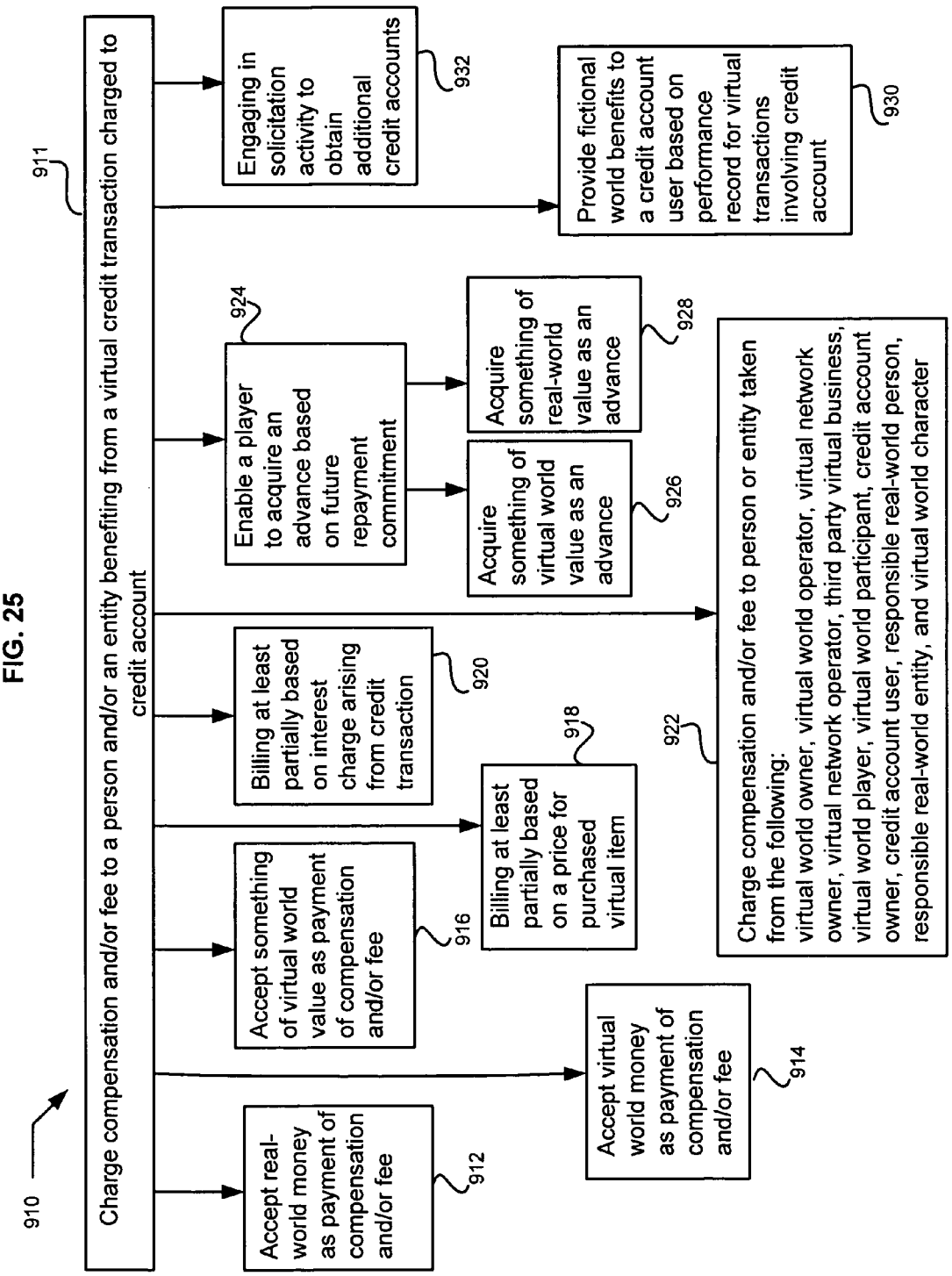

The exemplary flow chart of FIG. 25 disclosed another implementation of a method and process 910, including charging compensation and/or fee to a person and/or an entity benefiting from a virtual credit transaction charged to a credit account (block 911). Payment of the compensation and/or fee may be accepted in different forms, including but not limited to real-world money (block 912), virtual world money (block 914), and something of virtual world value (block 916). A billing such as by electronic or hardcopy statement may be at least partially based on a price for a purchased virtual item (block 918), and may also be at least partially based on an interest charge arising from the credit transaction (block 920).

It will be understood that although significant compensation and/or fees may be billed to a credit account owner or user, compensation and/or fees may be charged to one or more of the following persons or entities: virtual world owner, virtual world operator, virtual network owner, virtual network operator, third party virtual business, virtual world player, virtual world participant, credit account owner, credit account user, responsible real-world person, responsible real-world entity, and virtual world character (block 922).

Various types of credit transactions are contemplated, including enabling a player (or other interested party) to acquire an advance based on a future repayment commitment. The advance may include something or multiple things of virtual world value (block 926) as well as something or multiple things of real-world value (block 928), including combinations thereof. Of course some items that are advanced pursuant to terms of the credit account may have valuations measured or recognized in both virtual world and real-world environments.

Fictional world benefits may be provided to a credit account user based on a performance record for virtual transactions involving the credit account. It will be apparent from the present explanations that interested parties may continue to engage in solicitation activity in the virtual world environment in order to obtain additional credit accounts.

It will be understood by those skilled in the art that the various components and elements disclosed in the block diagrams herein as well as the various steps and sub-steps disclosed in the flow charts herein may be incorporated together in different claimed combinations in order to enhance possible benefits and advantages.

The exemplary system, apparatus, and computer program product embodiments shown in FIGS. 6-15E along with other components, devices, know-how, skill and techniques that are known in the art have the capability of implementing and practicing the methods and processes shown in FIGS. 1-5 and FIGS. 16-25. It is to be understood that the methods and processes can be incorporated in one or more different types of computer program products with a carrier medium having program instructions encoded thereon. However it is to be further understood by those skilled in the art that other systems, apparatus and technology may be used to implement and practice such methods and processes.

Those skilled in the art will also recognize that the various aspects of the embodiments for methods, processes, apparatus and systems as described herein can be implemented, individually and/or collectively, by a wide range of hardware, software, firmware, or any combination thereof.

One aspect of the present system and method enables a credit entity to participate in a virtual world environment with publicity and advertising in order to seek potential customers for credit transactions in the virtual world environment. In some implementations disclosed herein, a process for creating credit transactions in a fictional world environment includes making a virtual charge account service available to a participant in the fictional world environment. Virtual transactions are accepted and charged to a virtual credit account in connection with purchase activities in the fictional world environment, and a billing statement may be provided to the participant who acquires the virtual credit account.

Methods of operating a credit account business in a fictional world environment as disclosed herein may take different forms. For example, in some embodiments a special charge account may issued by a real-world credit entity that includes both real-world benefits and fictional world benefits, and advertisements for the special charge account are provided in the fictional world environment.

There are other exemplary methods and processes disclosed herein for operating a credit business in a virtual world environment. In some instances a credit account is provided that enables a player to acquire one or more virtual items of value pursuant to a credit transaction charged to the credit account. A real-world person or real-world entity may be identified that will be responsible for compliance with terms and obligations of the credit account, and be responsible for receiving a billing for compensation and/or fees arising from the credit transaction. Depending on the circumstances, a billing statement may be authorized to be sent to a real world address and/or a fictional world address of a credit account owner. One aspect provides a virtual charge account service available for use in a fictional world environment, wherein a billing statement charges various fees to a participant who acquires the virtual charge account. Such virtual charge account fees may be valuated in fictional world money, real-world money, or non-monetary fictional world value tokens.

The virtual credit billing system may include a database record for recording the virtual world credit transaction activities, and an output device may be coupled to the database record for communicating obligations arising from the credit transaction activities to a person or entity responsible for virtual credit account obligations.

Figure 26:
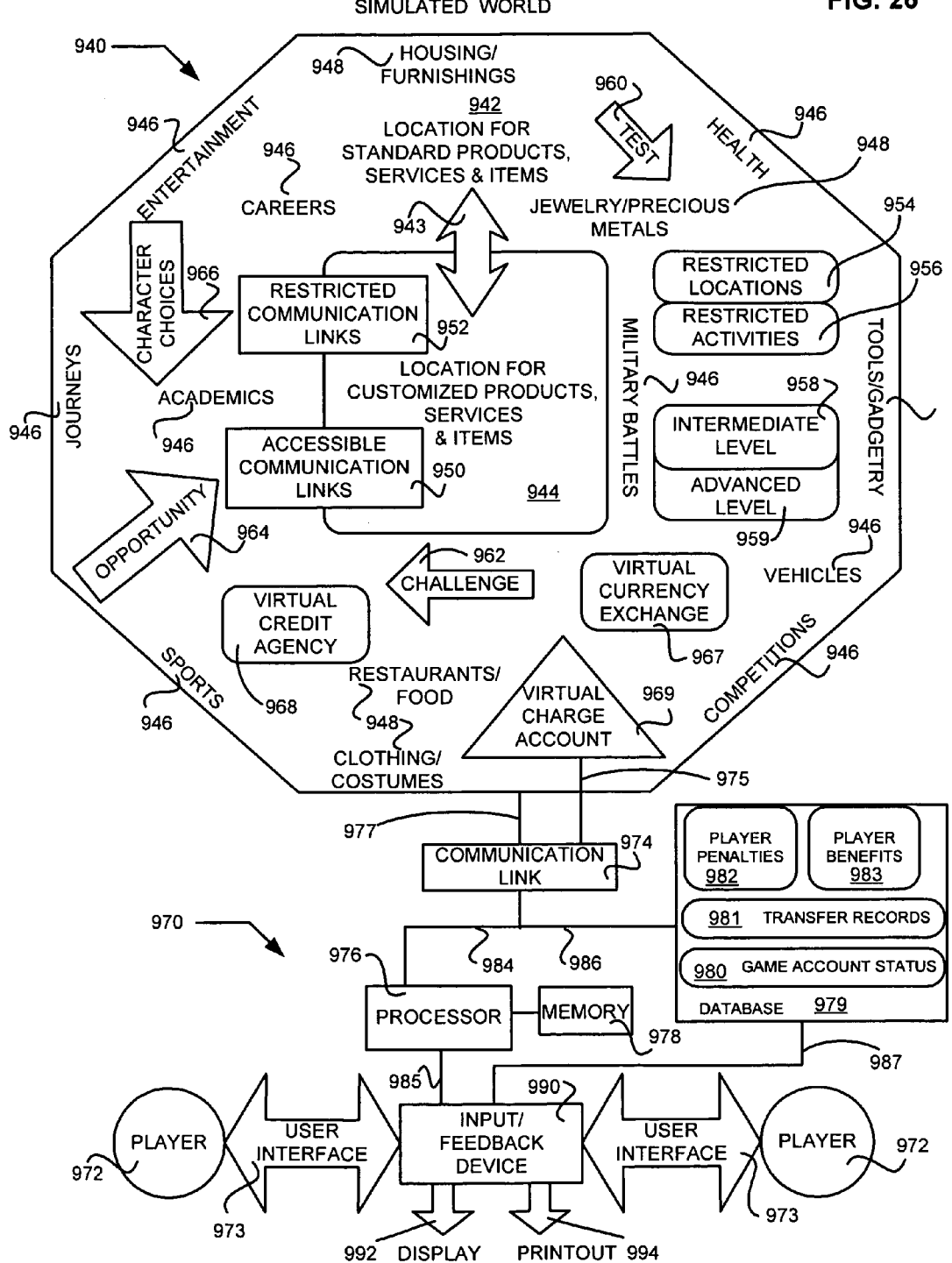
FIG. 26 is a schematic block diagram for an exemplary simulated world environment that includes an implementation of database records for player transactions.

An exemplary simulated world environment 940 is illustrated in the schematic block diagram of FIG. 26, and shows many features that may be available to one or more players 972 that participate in the simulated world environment 940. A location 942 may include standard products, services and/or items available to a player. A bi-directional access portal 943 may enable some players to visit another location 944 that includes customized products, services and/or items. Opportunities for a virtual credit transactions may be available in both locations 942, 944.

Typical exemplary activities, events and destinations may include various topics 946 such as sports, competitions, health, entertainment, journeys, vehicles, military battles, careers and academics. All of these topics are candidates for a possible virtual credit transaction. Additional combined topics 948 for activities, events and destinations involving virtual credit transactions may include clothing/costumes, restaurants/food, tools/gadgetry, jewelry/precious metals and housing/furnishings.

Further opportunities related to arranging, transferring, and/or resolving rights and obligations arising from a virtual credit transaction may be provided via accessible communication links 950, restricted communication links 952, restricted locations 954, and restricted activities 956. It will be understood by those skilled in the art that different levels of virtual credit activities may include an intermediate level 958 and an advanced level 959. A further description of such exemplary levels is provided herein with regard to FIGS. 28A and 28B.

In addition to more conventional virtual credit transactions involving products, services and potential value items, a virtual world may also include activities, events and destinations that involve other aspects of virtual credit based on participation with tests 960, challenges 962, opportunities 964, and character choices 966.

Many of the aspects related to arranging, transferring and/or resolving rights and obligations arising from a virtual credit arrangement or transaction will be facilitated by a virtual currency exchange 967, a virtual credit agency 968, and a virtual charge account 969. Of course other virtual and real world entities as well as individual players, groups of players, third parties, virtual world provides and game operators may also participate directly or indirectly in facilitating the use of virtual credit as a basis for acquiring something of possible value while logged on or otherwise participating in a virtual world environment or game.

An exemplary computerized access system 970 for the simulated world environment 940 is illustrated schematically in FIG. 26, and may include a communication link 974 operatively coupled to the virtual charge account via connection 975 and to the simulated world via connection 977. The communication link 974 is also operatively coupled via connection 984 to processor 976 and memory 978, as well as operatively coupled to database 979 via connection 986. Each player 972 may send and receive informational data and messages through user interface 973 and input/feedback device 990 via processor connection 985 and database connection 987. The input/feedback device 990 may also include a display function 992 and a printout function 994.

The database function may be implemented at various locations using many types of storage media, and may be accessed for updating and/or retrieval by many different components and signal transmissions techniques, all within the spirit and scope of the claims herein. The implementation and location shown and described are by way of example only, and may include game account status records 980, virtual credit transfer records 981, player penalty records 982 and player benefit records 983.

FIG. 27A is a schematic representation of the type of data that may be included in a player's exemplary game account status database records 980, including status date 1034, user ID 1035, virtual character ID 1036, game account number 1037, and performance rating 1038. An identification of a responsible real-world party 1030 as well as such player's real-world contact information 1032 may also be included.

Value categories 1000 for value symbols that may be involved in a virtual world credit transaction or arrangement include, by way of example, virtual currency 1002, discount coupons 1004, award points 1006, access tickets 1008, experience medals 1010, level permits 1012, bonus vouchers 1014, skill merits 1016, as well as other unlisted value symbols 1018. Exemplary data fields for each value symbol may include an owed payable amount 1020 and its related creditor(s) ID 1022, an expected receivable amount 1024 and its related debtor(s) ID 1026, and a listing of what is currently owned 1028. Other data fields may be included in addition to those disclosed herein, and in some instances some of the exemplary data fields may not be deemed desirable and therefore can be omitted.

Figure 27B:
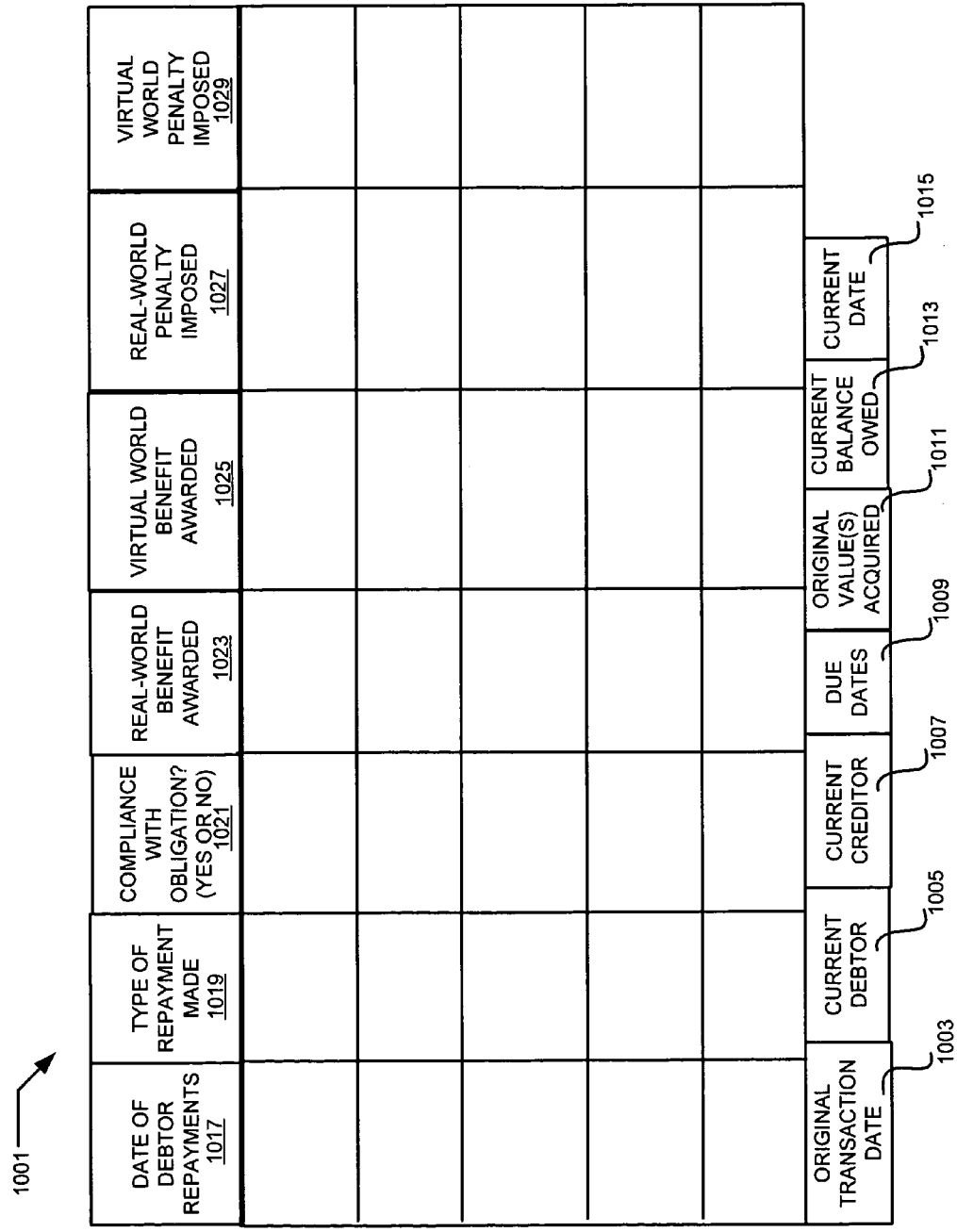
FIG. 27B illustrates exemplary database records for performance benefits and penalties associated with virtual credit transactions.

FIG. 27B is a schematic representation of the type of data that may be included in an exemplary database record 1001 that incorporates player penalties 982 and player benefits 983. Basic informational fields may include original transaction date 1003, current debtor 1005, current creditor 1007, due dates, 1009, original value(s) acquired 1011, current balance owed 1013 and current data 1015. Exemplary data fields may include date of debtor repayments 1017, type of repayment made 1019, whether there has been compliance with an obligation 1021, real-world benefit awarded 1023, virtual world benefit awarded 1025, real-world penalty imposed 1027, and virtual world penalty imposed 1029. Other data fields may be included in addition to those disclosed herein, and in some instances some of the exemplary data fields may not be deemed desirable and therefore can be omitted.

It will be understood that participation in a virtual world credit transaction is not limited to individual players or participants, but may include multiple players or parties acting collectively as a single group. Similarly an award of benefits need not be limited to an individual debtor participant who has complied with a virtual credit obligation, but such benefits may be shared with other individual participants or groups of players or parties having a direct or indirect interest in the outcome of the virtual world credit transaction. For example, a group or individual creditor participant that assumes a risk of non-payment by the debtor participant may negotiate for a bonus such as receiving a share of awarded benefits.

Figure 28A:
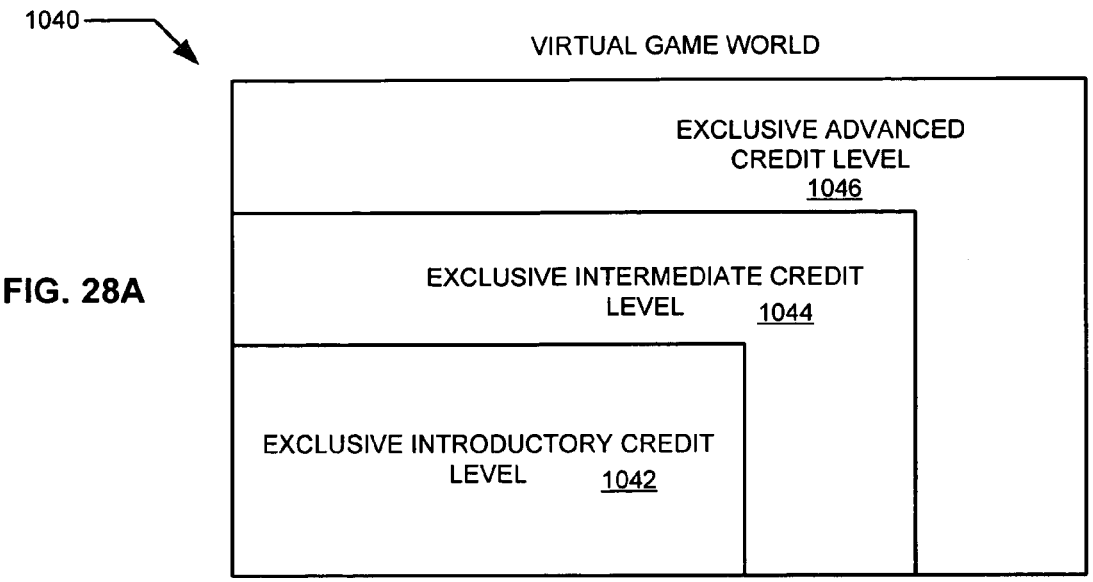
FIGS. 28A and 28B schematically illustrate different implementations of possible credit levels in an exemplary virtual game world.

In the schematic diagram of FIG. 28A, a virtual game world 1040 may include multiple participation levels based on selected admission criteria. In this exemplary implementation, an exclusive introductory credit level 1042 may be limited, for example, to less skilled virtual credit participants. An exclusive intermediate credit level 1044 may be limited, for example, to more experience virtual credit participants. An exclusive advance credit level 1046 may be limited, for example, to highly qualified virtual credit participants. Other different level admission criteria may be selected in order to achieve different goals and perhaps different game objectives.

Figure 28B:
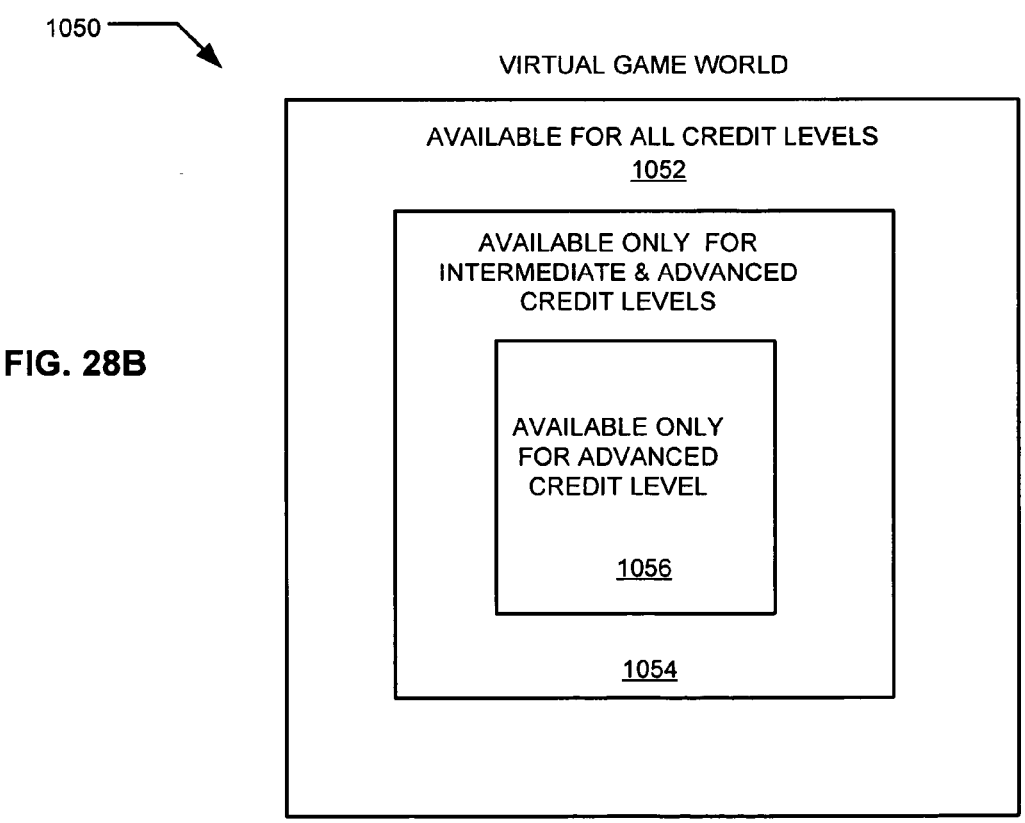

In the schematic diagram of FIG. 28B, a virtual game world 1050 may include multiple participation levels based on another scheme of selected admission criteria. In this exemplary implementation, one level 1052 may be available for all credit level participants. Another level 1054 may be available only for intermediate and advanced credit level participants. A further level 1056 may be available only for advanced credit level participants. This embodiment may, for example, allow more experienced or more qualified virtual credit participants to continue to have access to lower level virtual credit opportunities. Other different level admission criteria may be selected in order to achieve different goals and perhaps different game objectives.

Figure 29:
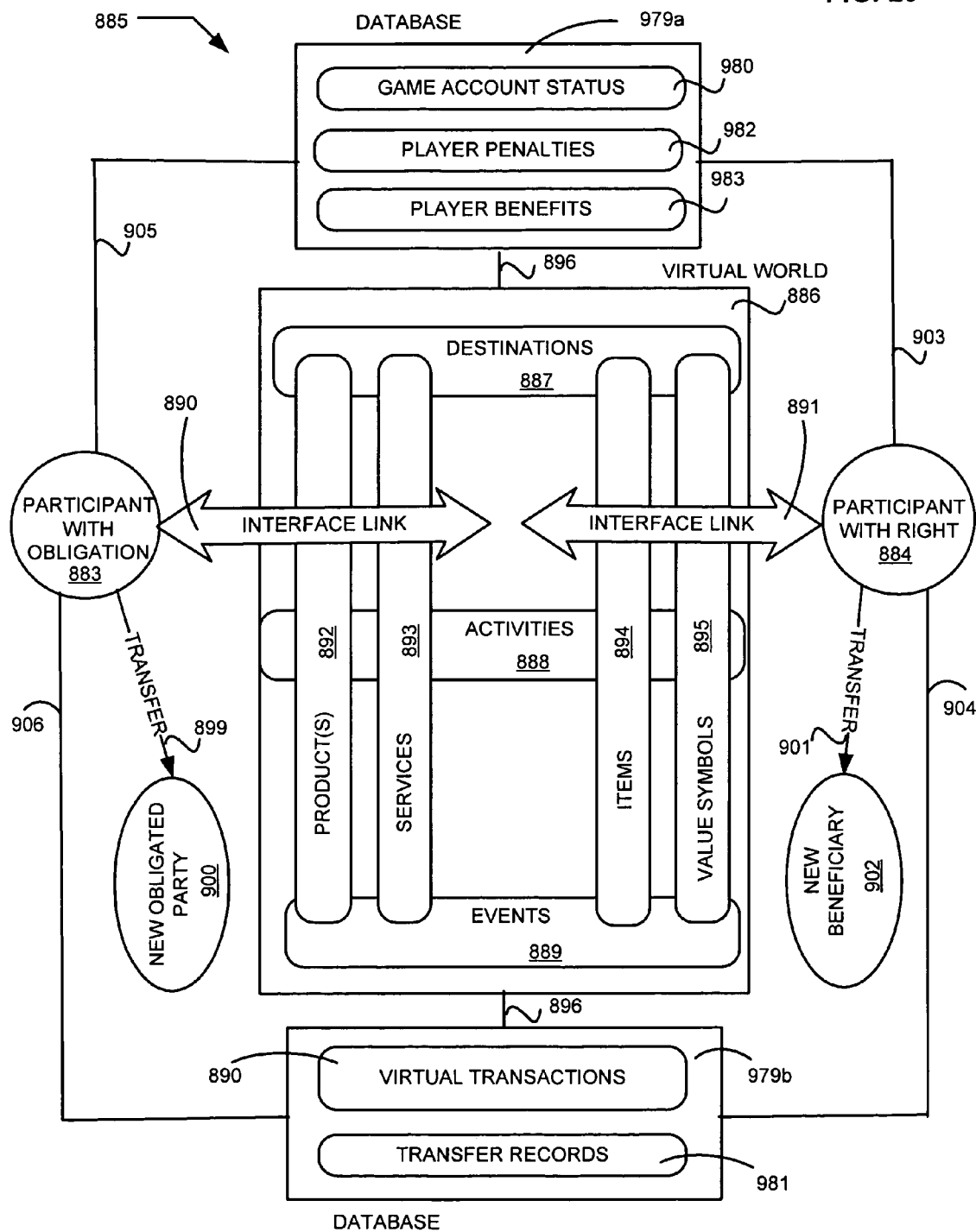
FIG. 29 is a schematic block diagram for an exemplary virtual world wherein a participant right and/or a participant obligation may be transferable to another party.

Another embodiment of an exemplary virtual credit implementation 885 is shown in the schematic drawing of FIG. 29, including a virtual world environment 886 that includes various destinations 887, activities 888 and events 889 that can be selected by one or more players and participants. Interface links 890, 891 provide access to the virtual world environment 885, including access to product(s) 892, services and/or items of value that may be acquired pursuant to a virtual transaction or arrangement. Such acquisition may be directly or indirectly involved with the destinations 887, activities 888 and events 889 or may be separately available to players and participants.

The embodiment of FIG. 29 schematically shows database records provided at two locations. A first database 979a includes game account status records 980, player penalty records 982 and player benefit records 983, and a second database 979b includes virtual transaction records 890 and virtual transfer records 981. Both database 979a and 979b are operatively coupled via connections 896 to the virtual world environment 886.

A transfer arrow 899 indicates that an player who incurred an obligation 883 in order to acquire something of value in connection with a virtual world transaction, has a capability to transfer the obligation to a new obligated party 900. Also a transfer arrow 901 indicates that a player who obtained a right 884 in connection with a virtual world transaction, has a capability to transfer the right to a new beneficiary 902. Such transfers may involve an updating of transfer records 981 in database 979b via connections 906 and 904, respectively. Also, such transfers may involve updating of game account status records 980 as well as player penalty and benefit records 982, 983 in database 979a via connections 905 and 903, respectively. In some embodiments, a new party 900 that assumes the obligation or a new beneficiary 902 of the right may also be a player in the virtual world environment 886. In some embodiments an obligation or right arising from a virtual world transaction may be transferable to a non-player party.

Figure 30:
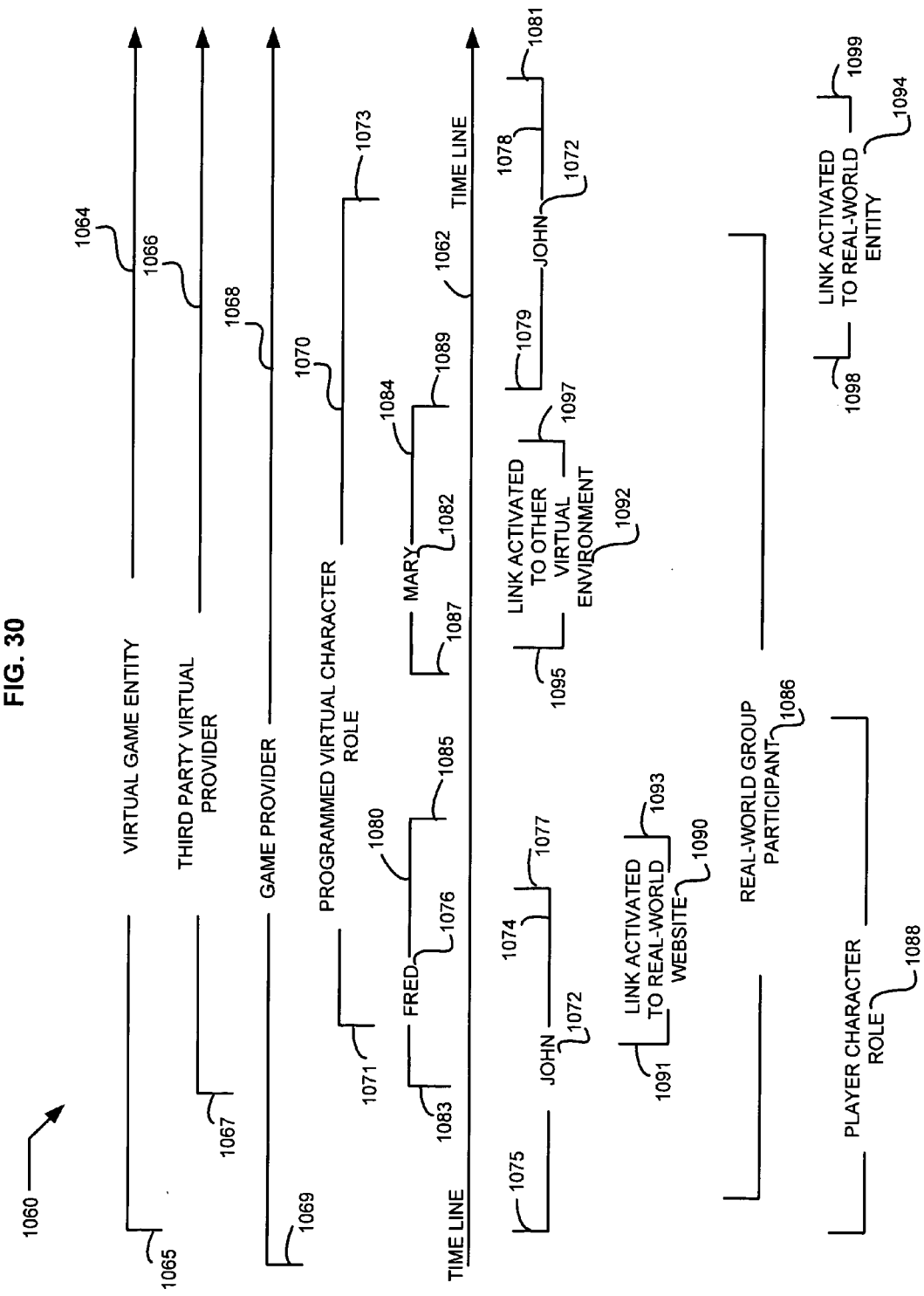
FIG. 30 is a schematic timing diagram illustrating possible virtual opportunities for player interaction in a virtual world environment with other players and/or entities and/or links.

The schematic timing diagram 1060 of FIG. 30 illustrates exemplary types of opportunities that are possible in a virtual world environment among players and parties. A time line 1062 provides a reference for real time and delayed time accessibility for different virtual world and real-world entities, including a virtual game entity with an active time period 1064 commencing at 1065, a third party virtual provider with an active time period 1066 commencing at 1067, a game provider with an active time period 1068 commencing at a starting game time 1069, and a programmed virtual character role with an active time period 1070 commencing at time 1071 and terminating at time 1073. Because of the benefits of computerized technology, real time and delayed time interaction between entities are possible for purposes of practicing the methods and implementing the systems for virtual credit opportunities as disclosed herein.

For example, as shown in FIG. 30, a player John 1072 having an actual logon time period 1074 commencing at time 1075 and terminating at time 1077 has the capability of having real time interaction during logon time period 1074 with player Fred 1076. It is noted that Fred's actual logon time period 1080 commencing at time 1083 and terminating at time 1085 partially overlaps with John's logon time period 1074, and similarly with active time 1066 of the third party virtual provider, as well as with an active time period of a real-world group participant 1086. It is further noted that John's logon time period 1074 completely overlaps with active period 1064 of the virtual game entity, and with the active period 1068 of the game provider, and further with an active period of a player character role 1088. This enables real time interaction between entities, including repeated dialogue communications if deemed appropriate, while virtual credit transactions as well as other virtual world proceedings and/or transactions are being negotiated, arranged, implemented, transferred, resolved, and/or canceled. Of course, it is understood that time delays between real time interactive messages may also occur intentionally, or because of system limitations.

Even though John 1072 is logged off between his termination time 1077 and his re-commencement time 1079, other entities that are active or logged on during the interim period may respond to any of John's requests, actions or questions that have been appropriately stored in memory, or may pursue their own dialogue with respect to new, pending or existing virtual credit arrangements. Such other entities may include Mary 1083 whose logon period 1084 commences at time 1087 and terminates at time 1089. Similarly, John can resume his virtual credit transaction participation during his new logon time period 1078 until termination at time 1081. This new period may include responses to requests, action or question previously made by Mary 1084 whose logon period does not overlap either of John's logon time periods 1074, 1078.

Further real time interaction may be initiated or received by players or other entities in the virtual world environment through links in the virtual world environment as shown by a real-world website link 1090 activated to commence at time 1091 and terminate at time 1093, a virtual environment link 1092 activated to commence at time 1095 and terminate at time 1097, and a real-world credit entity link 1094 activated to commence at time 1098 and terminate at time 1099. It is therefore to be understood that both unidirectional and bi-directional links across a boundary between a virtual world environment and a real-world location or real-world entity may be used to effectuate, implement, resolve or perpetuate a virtual transaction or activity.

As indicated in FIGS. 26 and 30, participation in a simulated or virtual world environment may include activities, events and transactions that are wholly within the simulated or virtual world environment as well as activities, events and transactions that are initiated or partly pursued in the simulated or virtual world environment. A virtual world player or participant taking a class, for example, could mean a virtual character taking a class in the virtual world to increase his virtual world skill level, as well as a player using his virtual character to interact with a real-world course (for example, to take an online class), or some combination of these.

This hybrid type of participation is illustrated in FIG. 26 where the accessible communication links 950 and the restricted communication links 952 might be links to either virtual world sites as well as real-world sites. Similarly in FIG. 30, the activated link to another virtual environment 1092 as well as activated link to a real-world web site 1090 and activated link to a real-world entity 1094 such as a real-world credit entity are available to players Fred 1076, Mary 1084 and John 1072.

Figure 31:
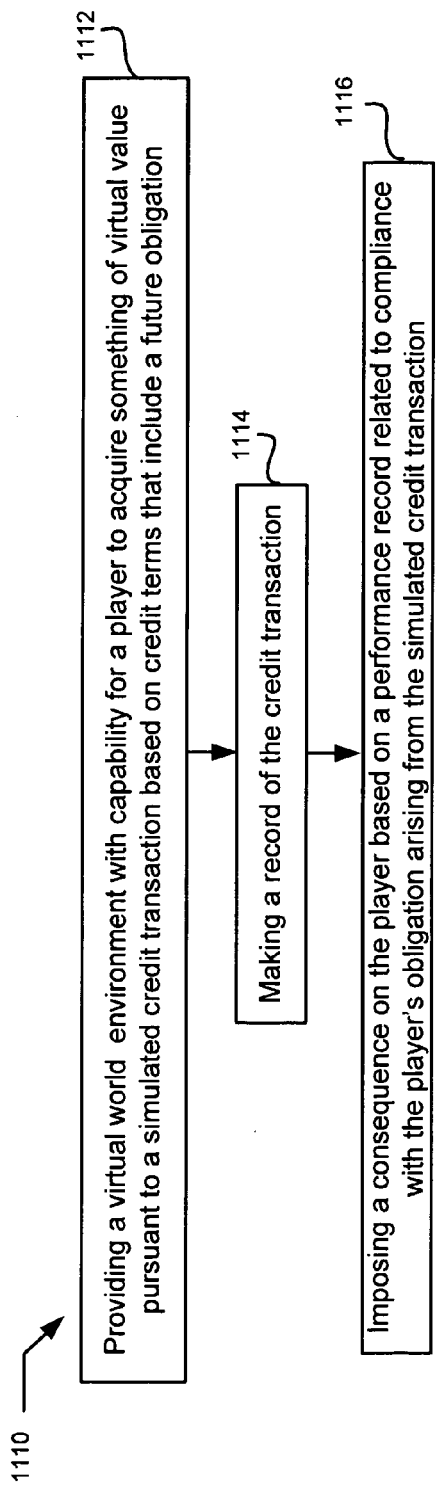
FIGS. 31-32 are high level flow charts showing exemplary processes for some embodiments.

The high level flow chart of FIG. 31 shows an additional exemplary process embodiment 1110 that provides a virtual world environment with a capability for a player to acquire something of virtual value pursuant to a simulated credit transaction based on credit terms that include a future obligation (block 1112). A record is made of the credit transaction (block 1114), and a consequence is imposed on the player based on a performance record related to compliance with the player's obligation arising from the simulated credit transaction (block 1116). This process may be implemented in computer program product embodiments as further disclosed herein.

Figure 32:
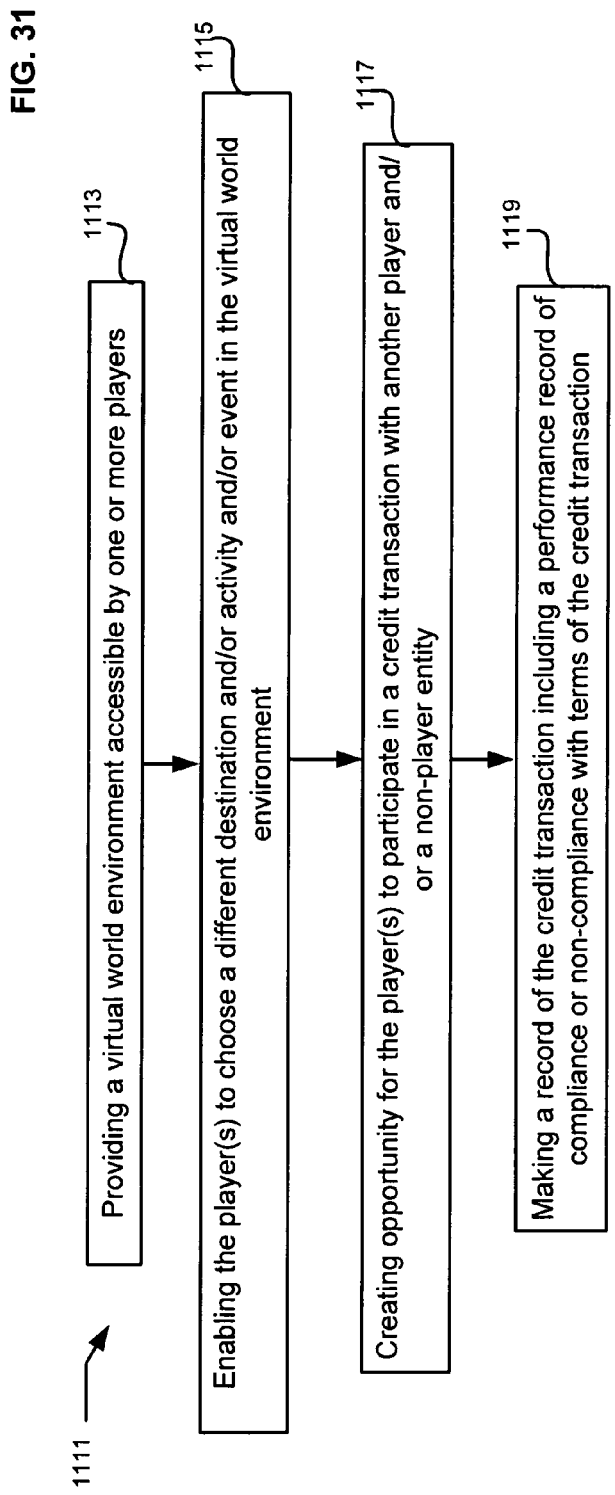

The high level flow chart of FIG. 32 shows another exemplary process embodiment 1111 that provides a virtual world environment accessible by one or more players (block 1113) that are enabled to choose a different destination and/or activity and/or event in the virtual world environment (block 1115). An opportunity is created for the player(s) to participate in a credit transaction with another player and/or a non player entity (block 1117). A record made of the credit transaction may include a performance record of compliance or non-compliance with terms of the credit transaction (block 1119). The process of FIG. 33 may be implemented in a computer program embodiment as further disclosed herein.

Figure 33:
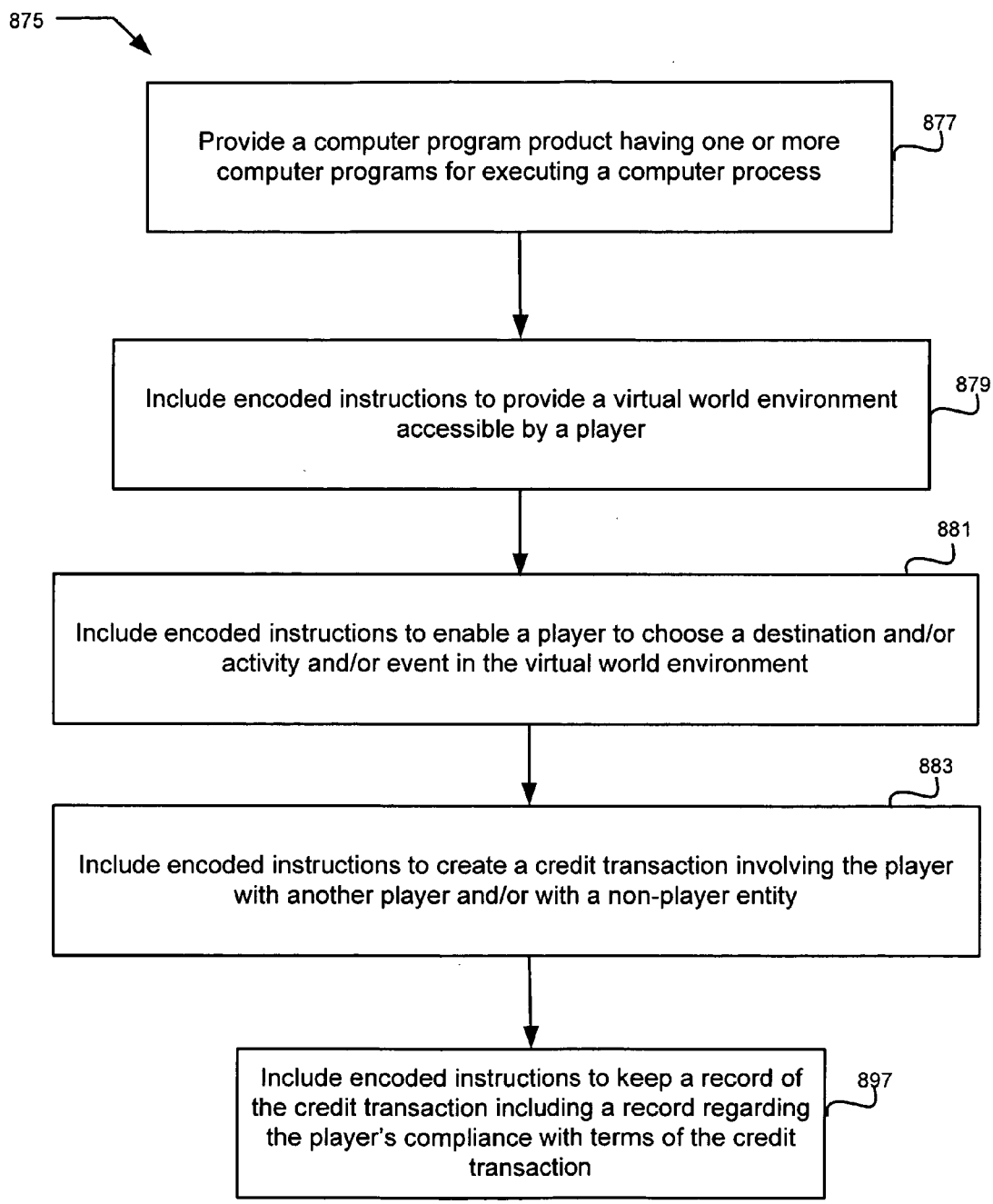
FIG. 33 is a high level flow chart showing an exemplary process incorporated in a computer program product.

Referring to the flow chart of FIG. 33, another embodiment 875 of a computer program product includes one or more computer programs for executing an exemplary computer process (block 877). Encoded instructions provide a virtual world environment accessible by a player (block 879). Encoded instructions also enable a player to choose a destination and/or activity and/or event in the virtual world environment (block 881). Encoded instructions create a credit transaction involving the player with another player and/or with anon-player entity (block 883). Encoded instructions further cause a record to be kept of the credit transaction including a record regarding the player's compliance with terms of the credit transaction.

It will be understood by those skilled in the art that computer program embodiments disclosed herein may be encoded in various carrier media including but not limited to wave signals (e.g., optical, electrical, electro magnetic), memory systems (e.g., cartridge, tape, disk), as well as other communication and storage media.

It will be understood that that designations "real-world entity", "real-world third party", "real-world person" as used herein are intended to include individuals, families, groups of people, clubs, organizations, partnerships, corporations, companies, etc. that are typically recognized as being identifiable in the real-world.

Figure 34:
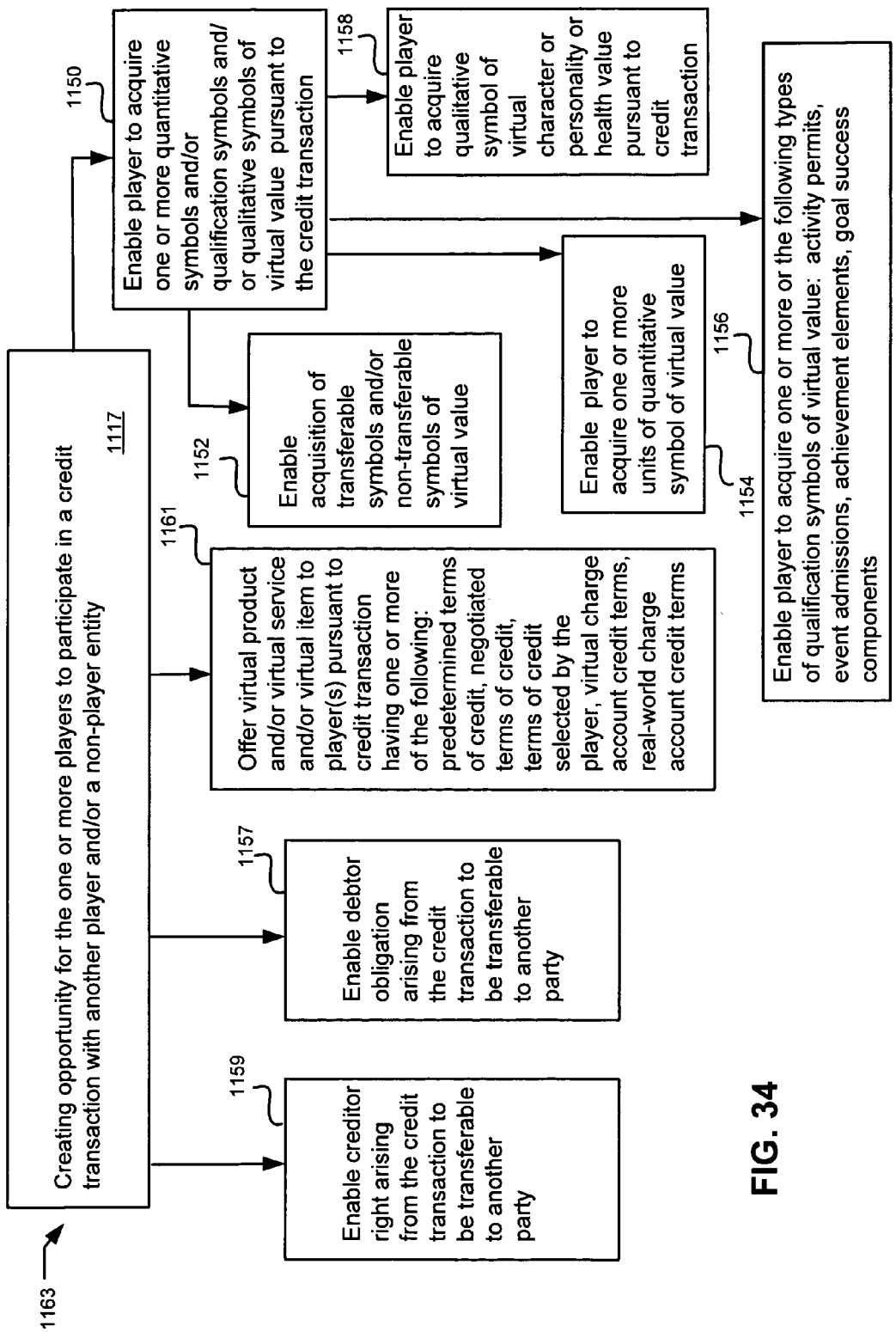
FIGS. 34-36 are more detailed flow charts showing additional exemplary processes for some embodiments.

The detailed flow chart of FIG. 34 shows a further exemplary method 1163 that includes the opportunity in a virtual world environment (see process block 1117 in both FIG. 31 and FIG. 34) for one or more players to participate in a credit transaction with another player and/or non player entity, and wherein a performance record may be made (see process block 1119 in FIG. 32). The credit transaction may enable a player to acquire one or more quantitative symbols and/or qualification symbols, and/or qualitative symbols of virtual value (block 1150). Such quantitative symbols may include one or more units of something of virtual value (block 1154). Such qualification symbols may include one or more of the following types: activity permits, event admissions, achievement elements, and goal success components (block 1156). Such qualitative symbols may include a symbol of virtual character or personality or health value (block 1158). Any symbols of virtual value that can be acquired may include transferable symbols and/or non-transferable symbols (block 1152).

In some instances, the process blocks 1113, 1115, 1117, 1119 of FIG. 32 may also include implementations involving transferability such as enabling a debtor obligation to be transferable to another party (block 1157), as well as in some instances enabling a creditor right to be transferable to another party (block 1159). Another possible feature to be included is offering a virtual product and/or virtual service and/or virtual item to player(s) pursuant to a credit transaction having one or more of the following: predetermined terms of credit, negotiated terms of credit, terms of credit selected by the player, virtual charge account credit terms, and real-world charge account credit terms (block 1161).

Figure 35:
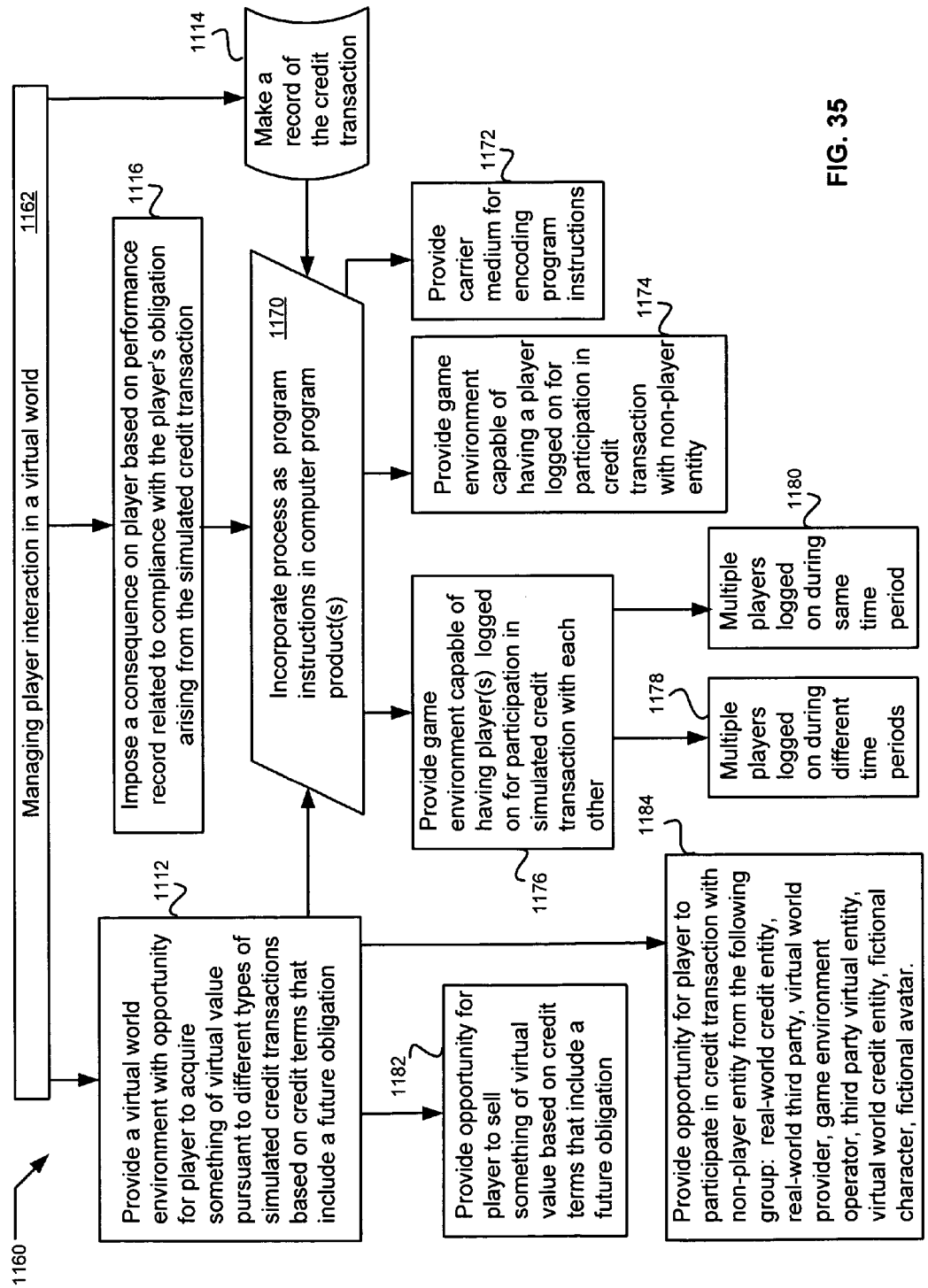

FIG. 35 shows a further exemplary method 1190 for managing player interaction in a virtual world (block 1162). This embodiment includes the previously described process blocks 1112, 1114, 1116 (see FIG. 31) as program instructions in one or more computer program products. Such a computer program product may provide a carrier medium for encoding program instructions (block 1172), and may also provide a game environment capable of having one or more players logged on for participation in a virtual world credit transaction with a non-player entity (block 1174), and may further provide a game environment capable of having one or more players logged on for participation in a virtual world credit transaction with each other (block 1176). Multiple players may be individually logged on during different time periods (block 1178), as well as individually logged on during a same time period (block 1180).

Additional process components included in the exemplary embodiment illustrated in FIG. 35 include providing an opportunity for a player to sell something of virtual value based on credit terms (block 1182), and also providing an opportunity for a player to participate in a credit transaction with a non-player entity from the following group: real-world credit entity, real-world third party, virtual world provider, game environment operator, third party virtual entity, virtual world credit entity, fictional character, and fictional avatar (block 1184).

Figure 36:
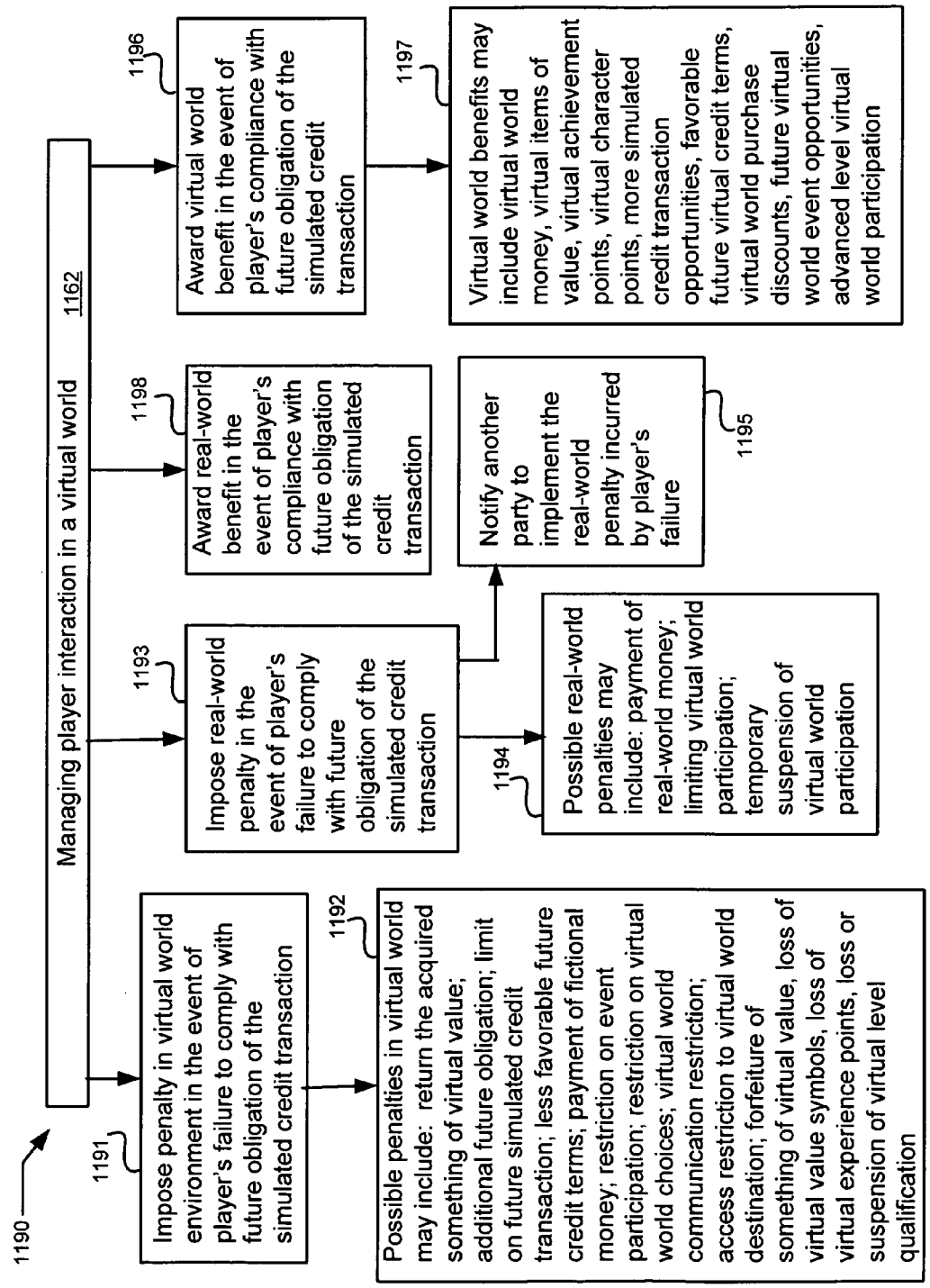

The detailed flow chart of FIG. 36 shows an exemplary method 1190 for managing player interaction in a virtual world (block 1162). Exemplary process components may include imposing a penalty in the virtual world environment in the event of a player's failure to comply with a future obligation of a simulated credit transaction (block 1191). Possible penalties in the virtual world environment may include one or more of the following: return the acquired something of virtual value; additional future obligation; limit on future simulated credit transaction; less favorable future credit terms for simulated credit transaction; payment of fictional money; restriction on virtual world event participation; restriction on virtual world choices; virtual world communication restriction; restriction on access to virtual world destination; forfeiture of something of virtual value; loss of virtual value symbols; loss of virtual world experience points; loss or suspension of virtual level qualification (block 1192).

Other exemplary process components include imposing a real-world penalty in the event of a player's failure to comply with a future obligation of the simulated credit transaction (block 1193). Possible real-world penalties may include one or more of the following: payment of real-world money, limiting virtual world participation, and temporary suspension of virtual world participation (block 1194). In some instances, notification is made to another party to implement the real-world penalty incurred by a player's failure to comply the future obligation (block 1195).

Additional exemplary process components relate to awarding benefits in the event of a player compliance with a future obligation of the simulated credit transaction. Such benefits may include an award of a real-world benefit (block 1198), as well as an award of a virtual world benefit (block 1196). Possible virtual world benefits may include one or more of the following: virtual world money, virtual items of value, virtual achievement points, virtual character points, more simulated credit transaction opportunities, favorable future virtual credit terms, virtual world purchase discounts, future virtual world event opportunities, and advanced level virtual world participation (block 1197).

Figure 37:
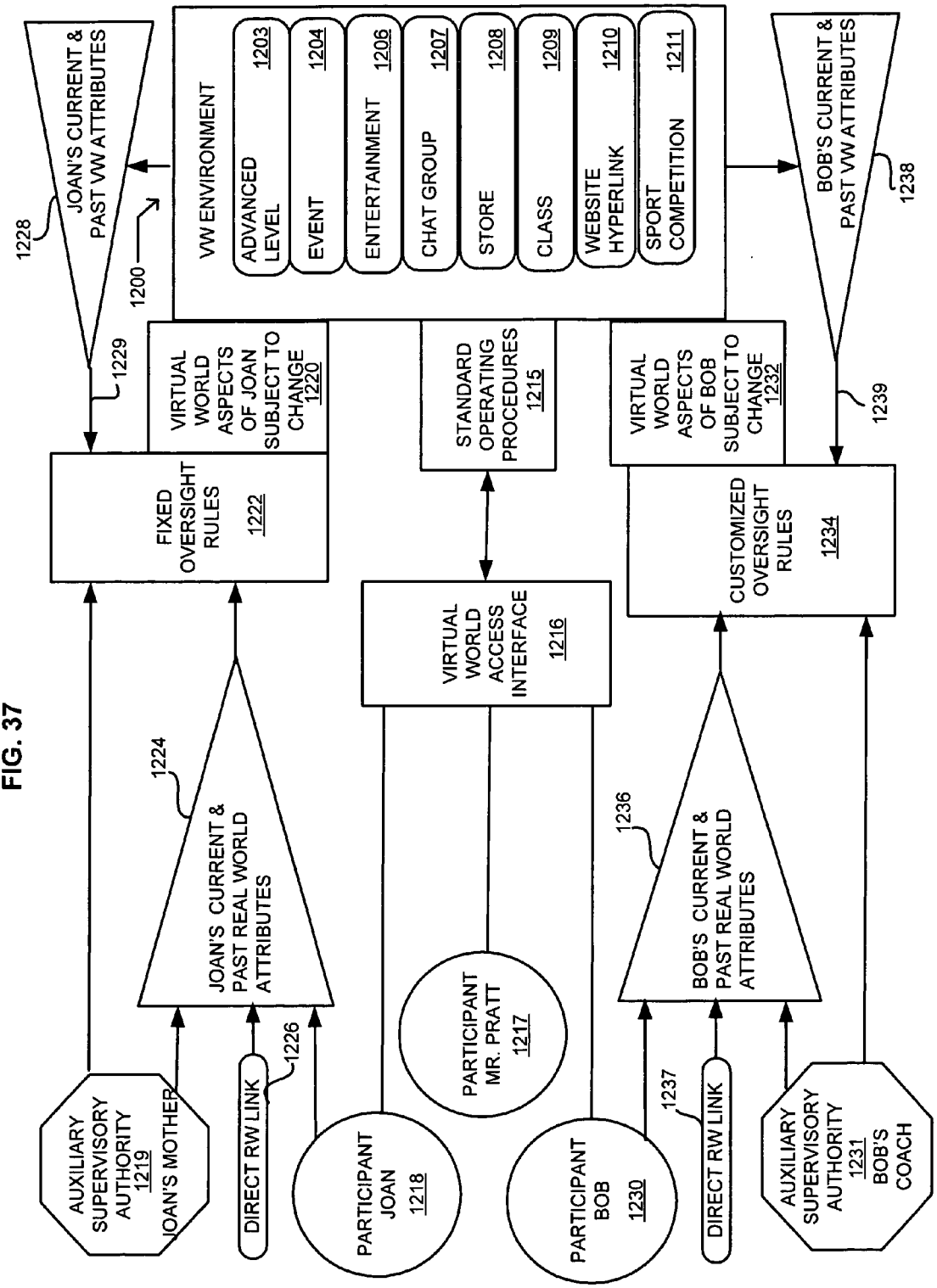
FIG. 37 is a schematic block diagram showing exemplary interactions between an auxiliary supervisory authority and a virtual world environment.

Referring to the exemplary embodiments shown schematically in FIG. 37, various interactions are shown between a real-world (RW) environment and a virtual world (VW) environment 1200. The virtual world environment 1200 may include various settings and activities such as a warfare game 1202, an advanced level 1203, an event 1204, a location 1205, entertainment 1206, a chat group 1207, a store 1208, class 1209, website hyperlink 1210, and sport competition 1211. A player or participant such as Mr. Pratt 1217, Joan 1218 and Bob 1230 is enabled to participate in the virtual world environment 1220 in accordance with standard operating procedures 1215 via virtual world access interface 1216.

In addition to being subject to various standard operating procedures 1215, participant Bob 1230 in this illustrated virtual world implementation is also subject to customized oversight rules 1234. Such customized oversight rules 1234 facilitate an auxiliary supervisory authority 1231 such as Bob's coach to have some control over virtual world aspects of Bob that are subject to change (see 1232). It will be understood that in some instances Bob may be allowed to partially or fully participate in some virtual world settings and activities without any monitoring or restraint.

Additional parameters that may by used in connection the customized oversight rules 1234 include Bob's current and past virtual world attributes 1239 provided via schematic input arrow 1239, as well as Bob's current and past real-world attributes 1236. Initial one-time data inputs and/or ongoing dynamic inputs may be incorporated as part of the real-world attributes 1236, and may come from various sources including but not limited to the auxiliary supervisory authority 1231, a direct real-world link 1237, and/or from the participant Bob 1230.

Another embodiment disclosed in FIG. 37 with respect to participant Joan 1218 includes fixed oversight rules 1220. It will be understood that some embodiments may incorporate a combination of both fixed oversight rules 1222 and customized oversight rules 1234.

Such fixed oversight rules 1234 facilitate an auxiliary supervisory authority 1219 such as Joan's mother to have some control over virtual world aspects of Joan that are subject to change (see 1220). It will be understood that in some instances Joan may be allowed to partially or fully participate in some virtual world settings and activities without any monitoring or restraint.

Additional parameters that may by used in connection the fixed oversight rules 1222 include Joan's current and past virtual world attributes 1228 provided via schematic input arrow 1229, as well as Joan's current and past real-world attributes 1224. Initial one-time data inputs and/or ongoing dynamic inputs may be incorporated as part of the real-world attributes 1224, and may come from various sources including but not limited to the auxiliary supervisory authority 1219, a direct real-world link 1226, and/or from the participant Joan 1218.

Figure 38:
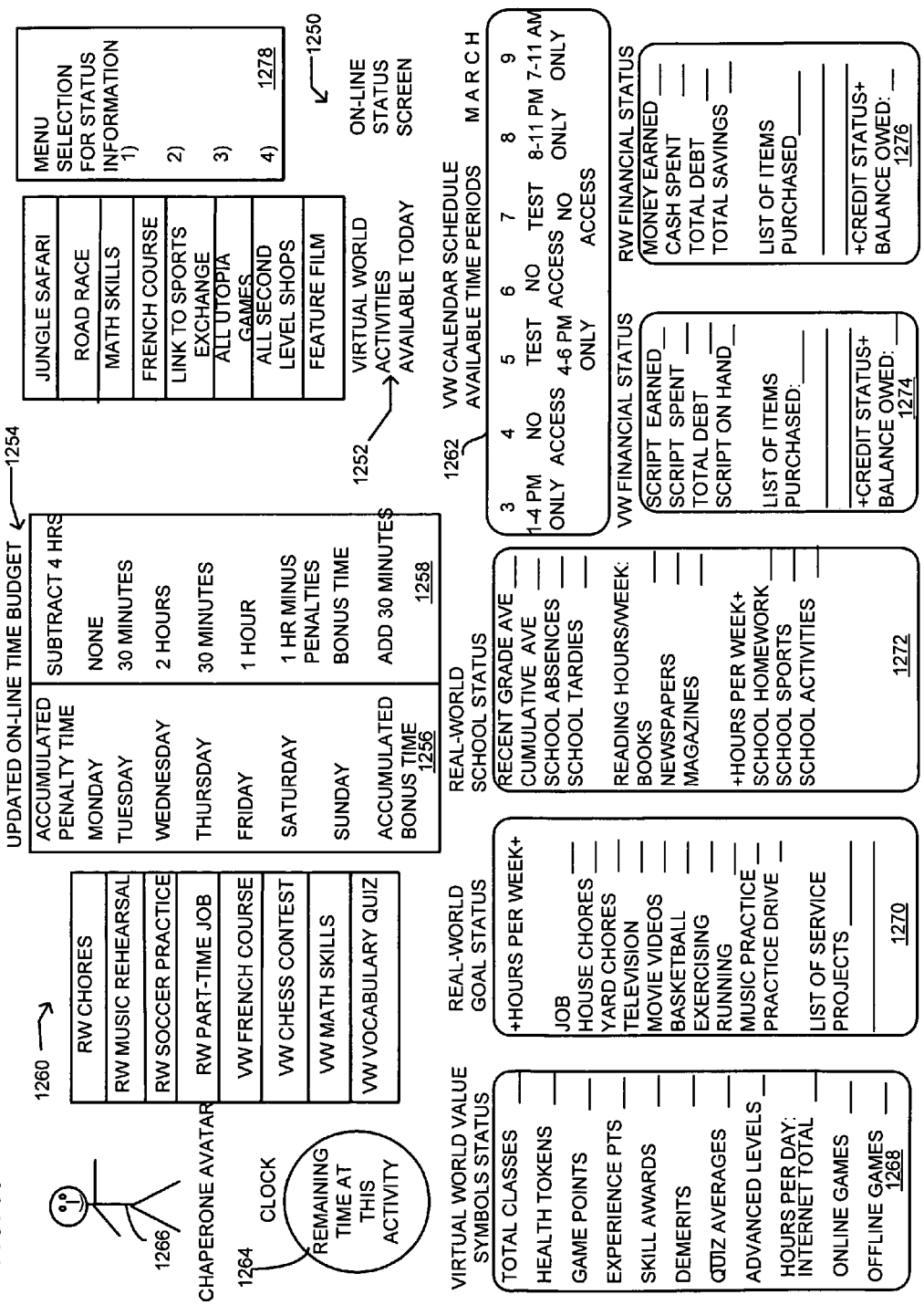
FIG. 38 shows various exemplary status screen displays that may be used in some embodiments.

The exemplary embodiments of FIG. 38 show various types of status screen displays 1250 that may be used to provide status feedback information to a virtual world player or participant, as well as to a supervisory auxiliary authority in accordance with the oversight rules. Such individual displays and the data fields included therein in some instances may not be deemed necessary or desirable, and other displays and data fields may be substituted or added in order to provide information that may be helpful. Also, status feedback may be communicated by means other than screen displays, including but not limited to audio signals, text messages, audio messages, printouts, voicemail, email, virtual world communications, etc.

Of course, in some instances it may be desirable to make one type of status screen display available to a virtual world player or participant, and another type of status screen display available to a supervisory auxiliary authority. It is to be understood that some status information may not be available for display, and other status information may be restricted and subject to retrieval only by an authorized party or entity.

In accordance with a particular set of oversight rules, a screen display of virtual world activities 1262 available on a particular day may include various items, for example, such as jungle safari, road race, math skills, French course, hyperlink to a sports exchange, all utopia games, all second level shops, and a feature film.

Another screen display that shows an updated on-line time budget 1254 for a particular participant or group of participants may include a parameter category 1256 and its associated virtual world (VW) time allotment 1258. As shown in the drawing, two possible parameter categories are accumulated VW penalty time (e.g., subtract four hours) and accumulated VW bonus time (e.g., add thirty minutes). Other displayed parameters may be an exemplary budgeted VW time for each day of the week, such as Monday (none), Tuesday (thirty minutes), Wednesday (two hours), Thursday (thirty minutes), Friday (one hour), Saturday (one hour minus penalty time), and Sunday (bonus time).

Some implementations may include a display showing required VW and RW activities 1260 for a particular week. Such activities may include various real-world (RW) and VW items, for example, such as RW chores, RW music rehearsal, RW soccer practice, VW French course, VW chess contest, VW mathematics skills, and VW vocabulary quiz.

Other implementations may include a display of a VW calendar schedule 1262 of available VW time periods in accordance with the applicable oversight rules. An exemplary display shown for March 3-9 may include March 3 (1:00 to 4:00 PM only), March 4 (no VW access), March 5 (school test, 4:00 to 6:00 PM only), March 6 (no VW access), March 7 (school test, no VW access), March 8 (8:00 to 11:00 PM only), and March 9 (7:00 to 11:00 AM only).

It will be understood that the various limitations and opportunities for variable and/or specified online VW participation (e.g., see 1252, 1254, 1560, 1562) in accordance with selected oversight rules may be determined solely by the auxiliary supervisory authority. In some implementations such determination may be delegated directly or indirectly by the auxiliary supervisory authority to a designated RW or VW agent, or to a specified application program. In other embodiments, the auxiliary supervisory authority may be a group entity, or may include multiple parties working together by mutual agreement.

A possible display aspect may include a count-down clock 1264 indicating the allotted time remaining for the current VW activity. A further display aspect may include a VW chaperone avatar 1266 that accompanies the player/participant or appears periodically for purposes of monitoring the VW activities. Such a chaperone avatar 1266 may be recognizable by the player/participant or may be anonymous or in disguise. A further purpose for the chaperone avatar 1266 may be providing status messages of encouragement or warning in the virtual world environment to the player/participant.

Other possible status display aspects may include updated status data related to VW value symbol activity 1268. Such value symbols may, for example, include cumulative totals for classes attended, health tokens, game points, experience points, skill awards, demerits, quiz averages, and advanced levels. Further updated status data may include cumulative hours per day spent online on the Internet, playing on-line games, and playing off-line games.

Another possible status display aspect may include a status listing of RW goals 1270 in accordance with the oversight rules. Such RW goals may include cumulative time totals per week spent by a player/participant at a job, doing house chores, yard chores, watching television, watching movie videos, playing basketball, exercising, running, doing service projects, music practice, and driving practice.

A further possible status display may include a status listing of RW school topics 1272. For example, parameter categories may include recent grade average, cumulative grade average, number of school absences, and number of school class tardiness. Additional parameter categories may include reading hours per week doing optional reading (e.g., books, newspapers, magazines), hours per week doing school homework, school sports, and attending school activities.

Financial status displays may also be deemed appropriate by the auxiliary supervisory authority and/or the player participant. A possible VW financial status display 1274 may include, for example, VW script earned, VW script spent, total VW debt, and VW script on hand. Additional VW financial data may include a list of items purchased. If a credit account is available in the virtual world environment, another credit status output displayed may be current balance owed.

A possible RW financial status display 1276 may include, for example, money earned, cash spent, total debt, and total savings. Additional RW financial data may include a list of items purchased. If a credit account is available in the real-world environment, another credit status output displayed may be current balance owed.

It will be understood by those skilled in the art that various types of status displays (e.g., textual, audio, visual, audiovisual, encoded, symbols, etc.) can be used to provide feedback informational data to the auxiliary supervisory authority and/or to the player/participant via various communication links to one or more output devices that can store or deliver such informational data.

Figure 39:
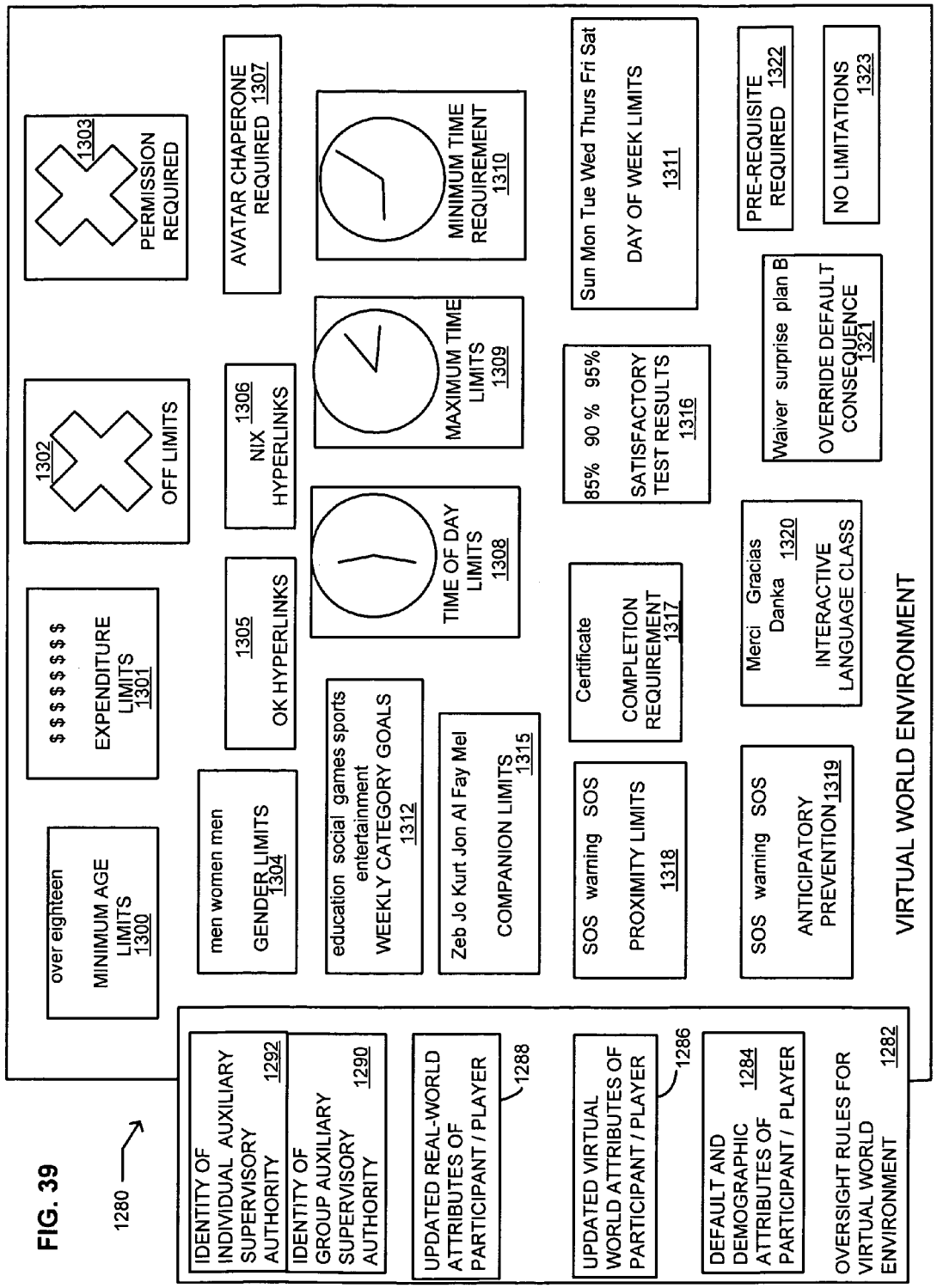
FIG. 39 is another schematic block diagram illustrating various exemplary types of virtual world parameters and participation topics that may be related to oversight rules for a virtual world environment.

Referring to the schematic block diagram of FIG. 39, an exemplary set of oversight rules 1282 for a virtual world environment 1280 may incorporate various types of input data, including but not limited to default and demographic attributes 1284 of a participant/player, updated virtual world attributes 1286 of the participant/player, and updated real-world attributes 1288 of the participant/player. Additional input data may include identity of a group auxiliary supervisory authority 1290, and identity of an individual auxiliary supervisory authority 1292.

Such oversight rules 1282 may include various programmed subroutines that are activated for a particular player/participant or group of players/participants to facilitate auxiliary control over some or all of their virtual world participation. Such control may include monitoring, recording, and/or transmitting output data regarding VW attributes associated with the particular player/participant (e.g., see 1228 and 1238 in FIG. 37).

Figure 41:
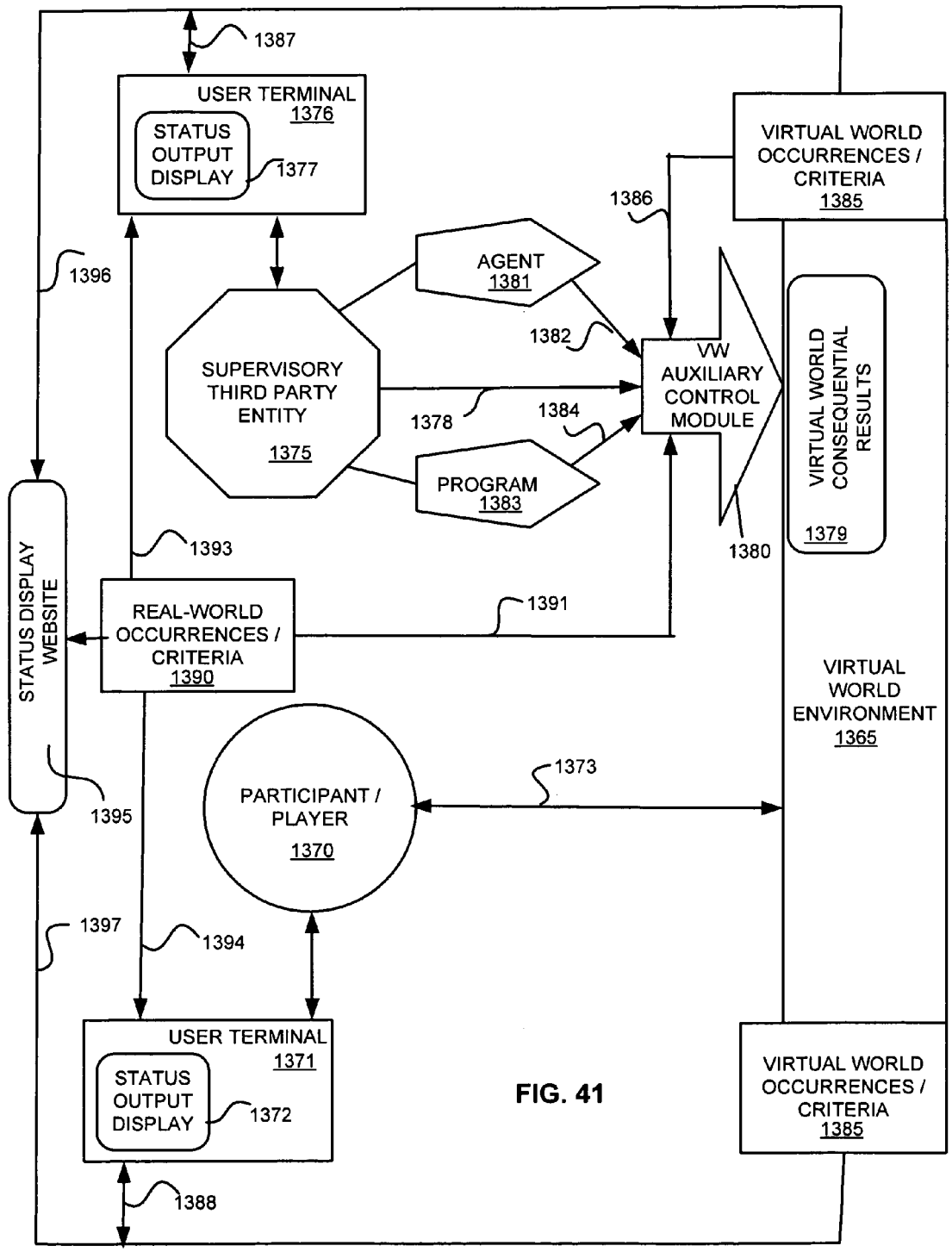
FIG. 41 is a schematic block diagram showing exemplary embodiments that provide status feedback information to a participant/player and also to a supervisory third party entity.
Figure 43:
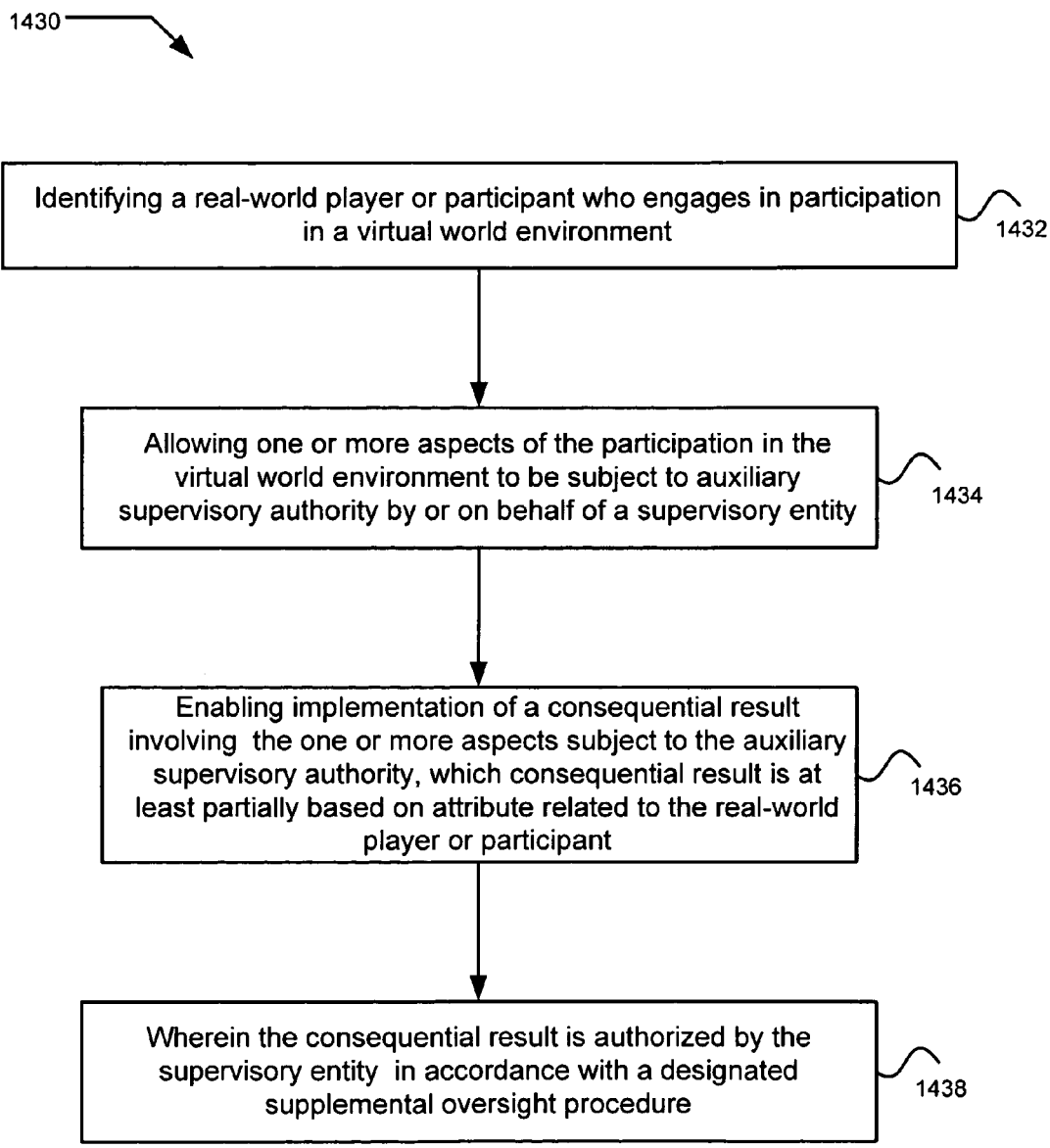
FIG. 43 is a high level flow chart showing an exemplary process for some embodiments.

Such control may further take the form of imposing oversight limitations or restraints (e.g., penalty, maximum, minimum, forfeiture, etc.) on certain VW aspects of the particular player/participant or group of players/participants, as well as granting oversight opportunities or awards (e.g., benefit, maximum, minimum, enhancement, etc.) involving specified VW aspects of the particular player/participant or group of players/participants (e.g., see auxiliary control module 1380 in FIG. 41, and oversight control module 1412 in FIG. 43).

It will be understood from the disclosure of embodiments herein that some of the same aspects of virtual world participation may be the subject of possible auxiliary monitoring to obtain oversight input data, as well as the subject of possible auxiliary modification resulting from oversight output data.

FIG. 39 illustrates exemplary types of virtual world parameters in the virtual world environment 1280 that may be subject to auxiliary monitoring and/or auxiliary modification. The exemplary examples are for purposes of illustration only. Such exemplary virtual world parameters may include minimum age limits 1300, expenditure limits 1301, prohibited off limits 1302, permission required 1303, gender limits 1304, approved "ok" hyperlinks 1305, and disapproved "nix" hyperlinks 1306.

Another type of such exemplary virtual world parameters may include a requirement for an avatar chaperone 1307. Other types may include companion limits 1315, wherein a designated list of Zeb, Jo, Kurt, Jon, Al, Fay and Mel may identify one or more approved virtual world companions, and/or one or more non-approved virtual world companions.

Time-related virtual world parameters may include a time of day limit 1308, a maximum time limit 1309, a minimum time requirement 1310, and day of the week limits 1311. Further types may include proximity limits 1318 and anticipatory prevention 1319, both with a possibility of associated SOS/warning signals.

Still other types of such exemplary virtual world parameters may include satisfactory test results 1316 (e.g., 85%, 90%, 95%, etc.), and a completion requirement 1317 that may be associated with a confirmation certificate. A further type may provide an override default consequence 1321 (e.g., waiver, surprise, plan B, etc.) that may maintain a status quo result or result in a benefit or penalty result. Additional types of such exemplary virtual world parameters may include a pre-requisite requirement 1322, or in some instances a no limitation feature 1323.

Figure 40:
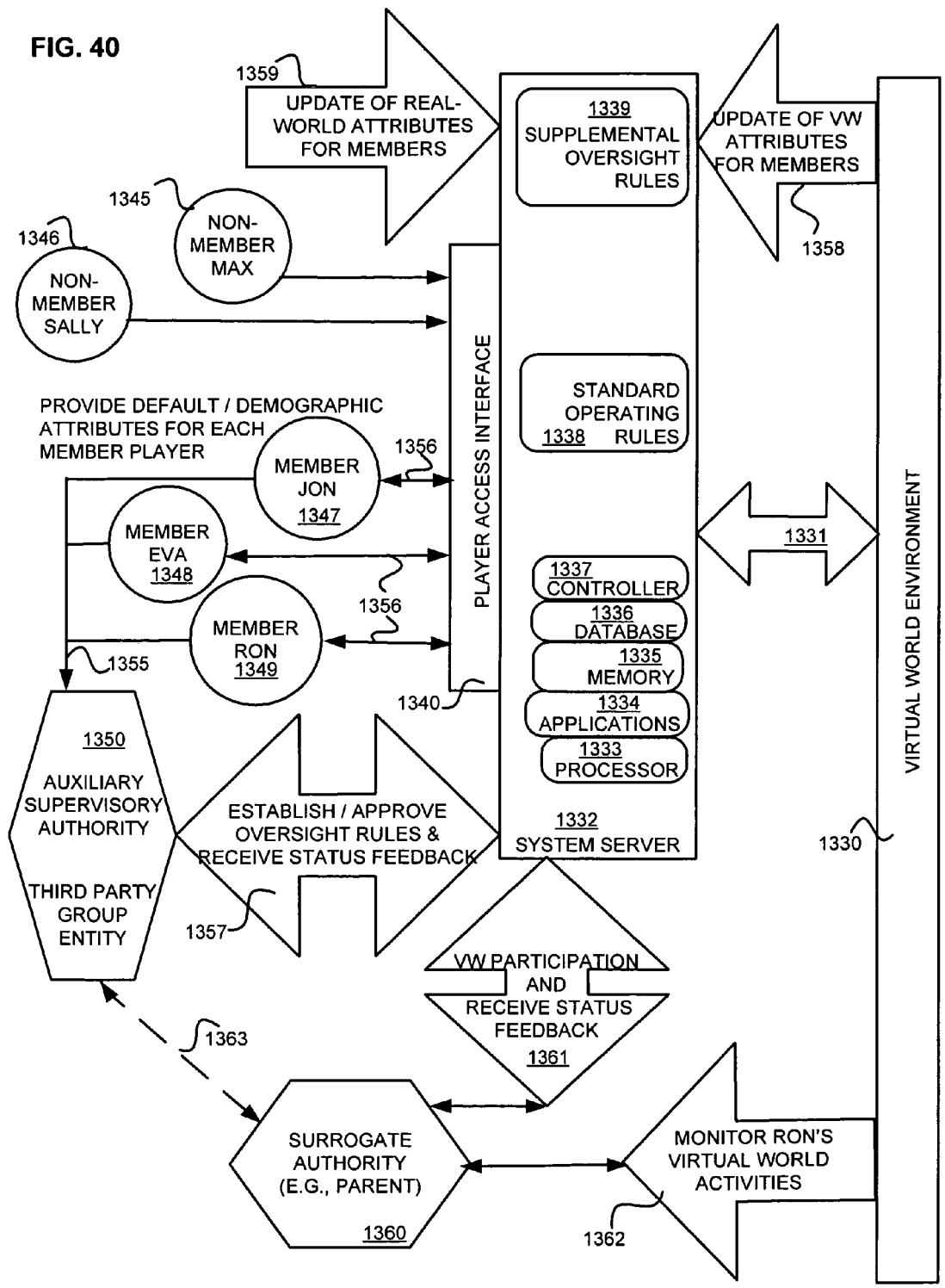
FIG. 40 is schematic block diagram showing an embodiment that provides virtual world oversight rules for group members of a third party entity.

Referring to the schematic block diagram of FIG. 40, an exemplary embodiment includes a virtual world environment 1330 having a bi-directional communication link 1331 with a system server 1332. The system server 1332 includes processor 1333, applications 1334, memory 1335, database 1336, and controller 1337. Activities and settings in the virtual world environment 1330 are implemented by the system server 1332 pursuant to standard operating rules 1338 as well as supplemental oversight rules 1339 authorized by an auxiliary supervisory authority such as a third party group entity 1350. Members of the group entity include Jon 1347, Eva 1348 and Ron 1349 who each have a communication link 1356 for participation and feedback interaction with the virtual world environment 1330 via player access interface 1340.

The player access interface 1340 also provides a link for virtual world participation by non-member player Max 1345 and non-member player Sally 1346. It will be understood that such non-member virtual world players are not directly affected by the supplemental oversight rules 1339. However member players Jon 1347, Eva 1348 and Ron 1349 are entitled to the potential benefits as well as subject to the potential penalties resulting from the monitoring and control guidelines incorporated in supplemental oversight rules 1339.

The third party group entity 1350 in this embodiment is primarily responsible for establishing and/or approving the supplemental oversight rules 1339 and may also receive status feedback from the system server 1334 (see link 1357). It will be understood that default attributes and/or demographic attributes associated with each member player may be directly input by members to the system server 1334 via communications links 1356, as well as being provided via communication channel 1355 to the third party group entity 1350 for consideration and possible input via link 1357 to the system server 1334.

As further shown in FIG. 40, the system server 1332 may receive additional updates of real-world attributes for members 1359, and may also receive additional updates of virtual world attributes for members 1358. Such ongoing updates may have immediate real-time consequential effects upon the virtual world participation of member players, or may have cumulative consequential effects upon such virtual world member participation, or may be disregarded as having no consequential effect, all in accordance with the applicable provisions of the supplemental oversight rules 1339.

A further aspect may provide a separate oversight capability for a surrogate authority 1360 such as, for example, a member's parent (e.g., parent of member Ron 1349) wherein the parent is enabled to have virtual world participation as well as to receive status feedback (see additional link 1361) from the system server 1332. Depending on the applicable provisions of the supplemental oversight rules 1339, the surrogate authority 1360 may receive group status feedback information as well as pertinent individual status feedback information. Further feedback data may in some instances be available directly from the virtual world environment 1365 to the surrogate authority 1360, as shown by operational link 1362 that is configured to monitor certain virtual world activities of member Ron 1349.

An optional interactive communication link 1363 may be provided between the surrogate authority 1360 and the third party group entity 1350 if it is deemed desirable to establish coordination and possible joint decisions regarding the consequential results of the supplemental oversight rules 1339.

Referring to the schematic block diagram of FIG. 41, exemplary embodiments provide various implementations for exercising auxiliary control over virtual world participation by a designated participant/player. The exemplary embodiments also provide implementations for transmitting feedback information to the designated participant/player and also to a supervisory authority. A virtual world environment 1365 is accessible via communication channel 1373 to a participant/player 1370 having a user terminal 1371 that may include a status output display 1372.

A supervisory third party entity 1375 has another user terminal 1376 that may include another status output display 1377. A virtual world auxiliary control module 1380 is configured to cause certain virtual world consequential results 1379 in the virtual world environment in accordance with supplemental oversight rules approved by the supervisory third party entity 1375.

In some implementations the supplemental oversight rules are directly provided by the supervisory third party entity as indicated by arrow 1378. In another possible implementation the supervisory third party entity 1375 delegates a real-world or virtual world agent 1381 to provide an appropriate instructional input 1382 to the virtual world auxiliary control module 1380. In a further possible implementation the supervisory third party entity 1375 authorizes a program 1383 to provide suitable instructional inputs 1384 to the virtual world auxiliary control module 1380.

Figure 42:
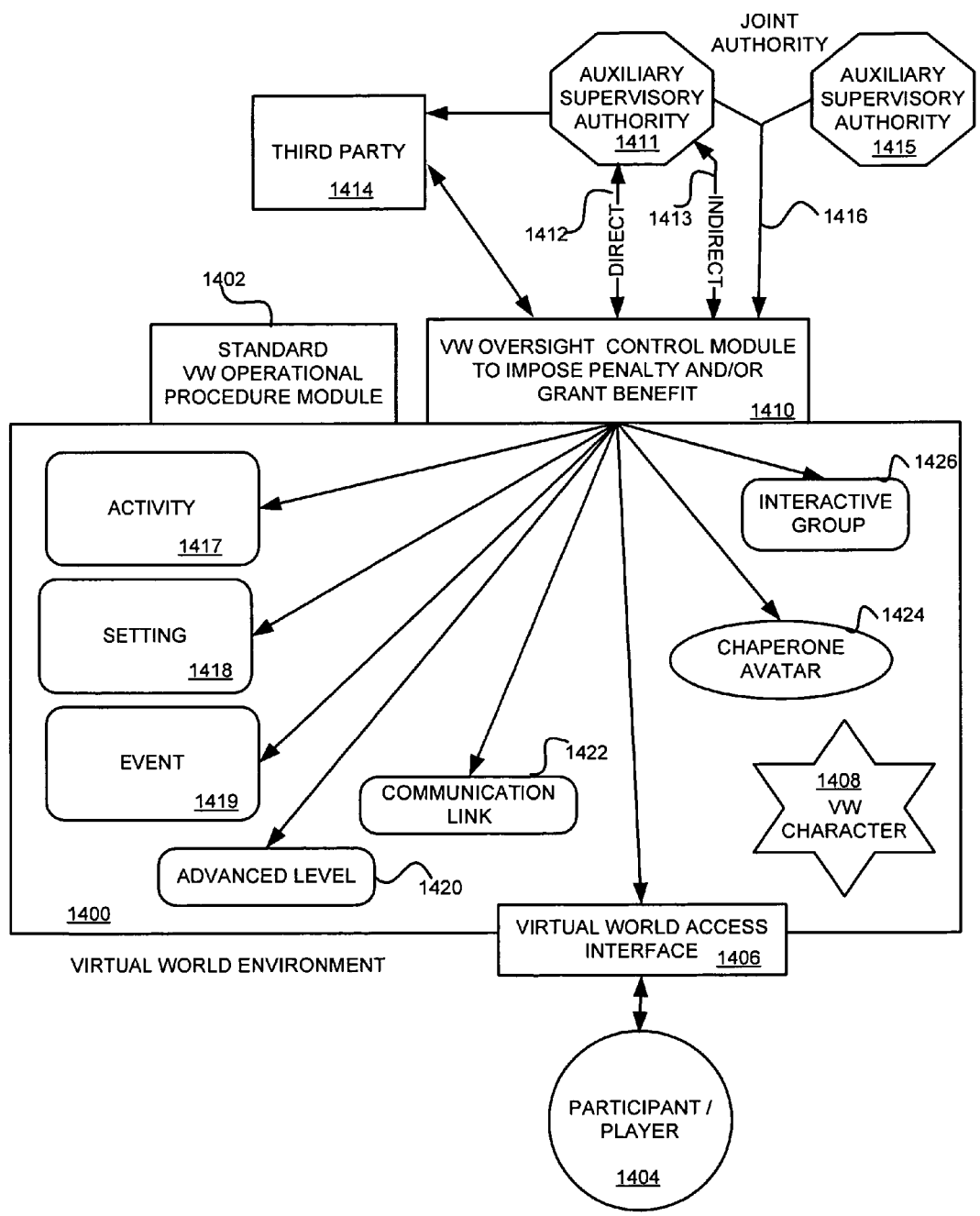
FIG. 42 is a schematic block diagram showing an exemplary system for providing oversight control with respect to time constraints and/or participation requirements involving a virtual world environment.

Referring to the schematic block diagram of FIG. 42, an exemplary virtual world environment 1400 includes a standard VW operational procedure module 1402 that provides various educational, entertainment, and game opportunities for a participant/player 1404 logged on through a virtual world access interface 1406. The participant/player 1404 may take on a virtual world persona such as VW character 1408 as well as participate in other roles in the virtual world environment 1400 as an avatar, virtual shop operator, game facilitator, observer, performer, bogeyman, ombudsman, guide, etc.

A virtual world oversight control module 1410 includes a capability for monitoring and/or control of virtual world experiences of a designated participant/player 1404 in accordance with an oversight procedure authorized by an auxiliary supervisory authority 1411. The auxiliary supervisory authority 1411 may have direct involvement 1412 as well as indirect involvement 1413 with the creation, implementation and ongoing management of the oversight procedure which acts as a supplement to the standard VW operational procedure module 1402. Such involvement may be carried out by a third party 1414 acting as an agent or intermediary on behalf of the auxiliary supervisory authority 1411.

It will be understood that the auxiliary supervisory authority 1411 may have shared oversight responsibility 1416 with other persons or entities such as auxiliary supervisory authority 1415, and such responsibility may be exercised jointly, alternately, or in an advisory capacity, or as a backup, etc. in whatever manner may be deemed appropriate.

The monitoring and/or control may in some embodiments involve all aspects of a virtual world experience, or in other embodiments involve merely selected virtual world experiences, as evaluated and determined by the entities and persons involved. An oversight procedure may in some instances be concerned with broad oversight of VW participation (e.g., schedule of on-line VW time monitored and controlled at virtual world access interface 1406), as well as medium level oversight (e.g., identification of VW itinerary such as an activity 1417, a setting 1418, an event 1419, an advanced level 1420, a communication link 1422, and an interactive group 1426).

A more detailed oversight procedure may include qualitative and/or quantitative data regarding what actually occurred during a specific VW experience (e.g., identity of other participants in virtual world chat group; was participant/player an observer, attacker or victim during VW war games; how many VW victims did the participant/player destroy; what test score was received at conclusion of VW class; comparison of total time spent at different types of VW experiences; etc.).

It will be understood that so-called "control" over virtual world aspects of a player or participant may involve passive observation (e.g., monitoring) of virtual world experiences of a virtual character that may immediately or cumulatively result in the imposition of a virtual world consequence involving the player or participant. Furthermore the exercise of control by a supervisory entity does not necessarily result in the imposition of a limitation, but often may result in providing enhanced virtual world opportunities. Also, some monitoring and/or control techniques may be implemented directly (e.g., real-time observation, immediate predictable consequence), and others may be implemented indirectly (e.g., evaluate periodic status report; provide participant/player with a choice of consequences).

Other types of control may include the use of negatively orientated persuasion directed to the virtual character, including an advance warning of a possible penalty if certain unapproved imminent VW behavior occurs. Of course a more positive type control may include the use of more positive persuasion directed to the virtual character, such as an advance notification of a possible benefit if certain approved imminent VW behavior occurs.

Imposing a time-related consequential VW result may not be based solely on an amount of time, but instead be based on what is actually occurring during a particular activity (e.g., may be about number of actions, etc.). Although some consequential results may be based on monitoring actual "on line" time totals, other consequential results may be more sophisticated (bystander vs. actual engagement, spectator vs. combatant, victim vs. aggressor, intensity of an activity, time spent actually engaged in an activity, cumulative counts or statistics related to an activity, etc.).

It will be understood that similar types of the data analysis techniques disclosed herein may also be applied to the real-world and virtual world attributes that in some embodiments provide at least a partial basis for the consequential result provided by the oversight procedure.

A further type of detailed oversight procedure may include a chaperone avatar 1424 who accompanies the participant/player during some or all of the virtual world experiences. Such a chaperone avatar may be a passive observer, a real-time communicator, or an assertive participant with respect to the participant/player, depending on the provisions included in the oversight procedure.

A high level exemplary process 1430 shown in FIG. 43 identifies a real-world player or participant who engages in participation in a virtual world environment (block 1432), and allows one or more aspects of the participation in the virtual world environment to be subject to auxiliary supervisory authority by or on behalf of a supervisory entity (block 1434). The exemplary process further enables implementation of a consequential result involving the one or more aspects subject to the auxiliary supervisory authority, which consequential result is at least partially based on an attribute related to the real-world player or participant (block 1436). The consequential result is authorized by the supervisory entity in accordance with a supplemental oversight procedure (block 1438).

Figure 44:
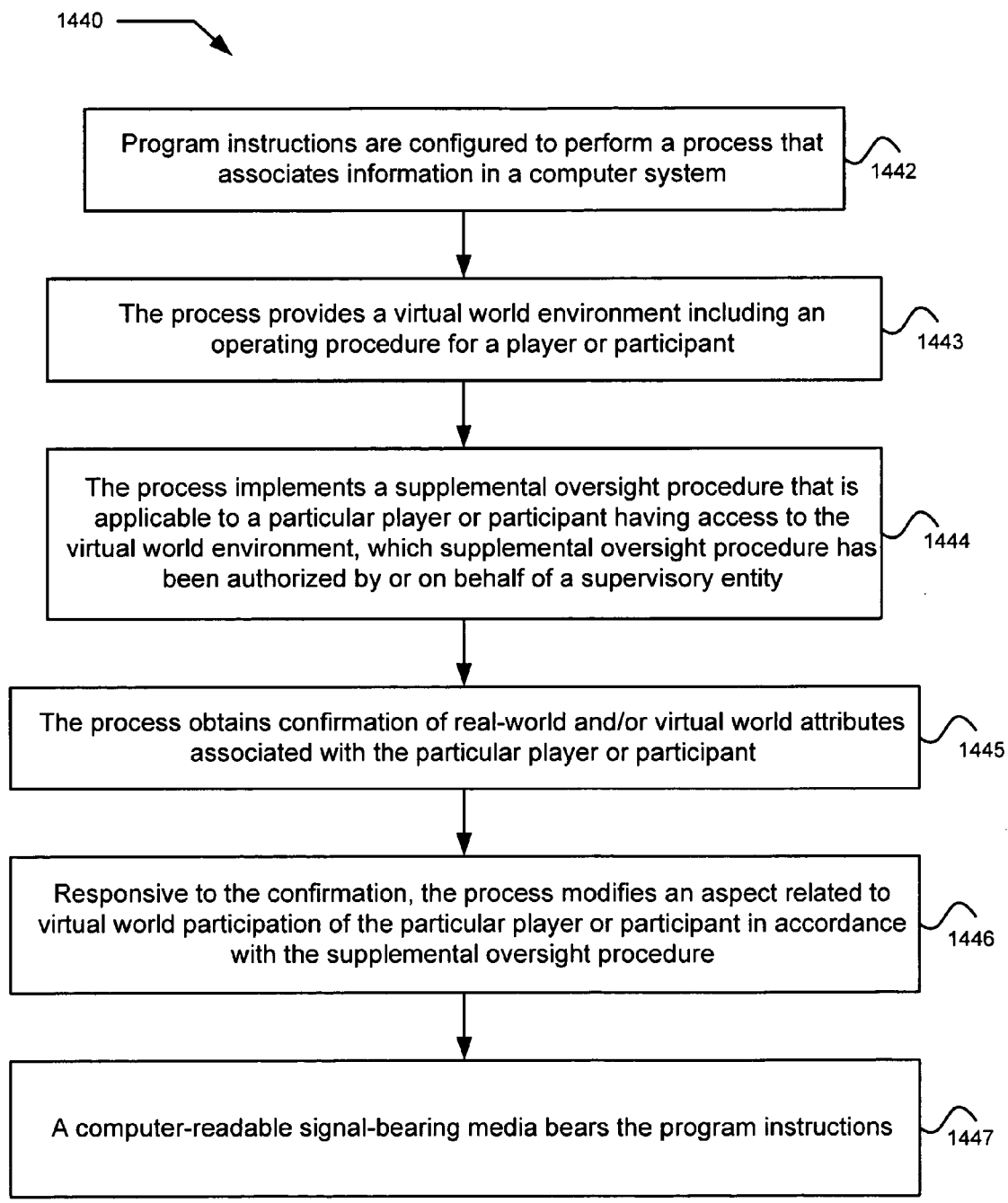
FIG. 44 is a high level flow chart showing an exemplary process incorporated in a computer program product.

Another high level flow chart of FIG. 44 sets forth an exemplary embodiment 1440 wherein program instructions are configured to perform a process that associates information in a computer system (block 1442). The illustrated process provides a virtual world environment including an operating procedure for a player or participant (block 1443), and implements a supplemental oversight procedure that is applicable to a particular player or participant having access to the virtual world environment, which supplemental oversight procedure has been authorized by or on behalf of a supervisory entity (block 1444). The process implementation obtains confirmation of a real-world and/or virtual world attribute associated with the particular player or participant (block 1445), and responsive to the confirmation, the process modifies an aspect related to virtual world participation of the particular player or participant in accordance with the supplemental oversight procedure (block 1446). A computer-readable signal-bearing media bears the program instructions (block 1447).

Figure 45:
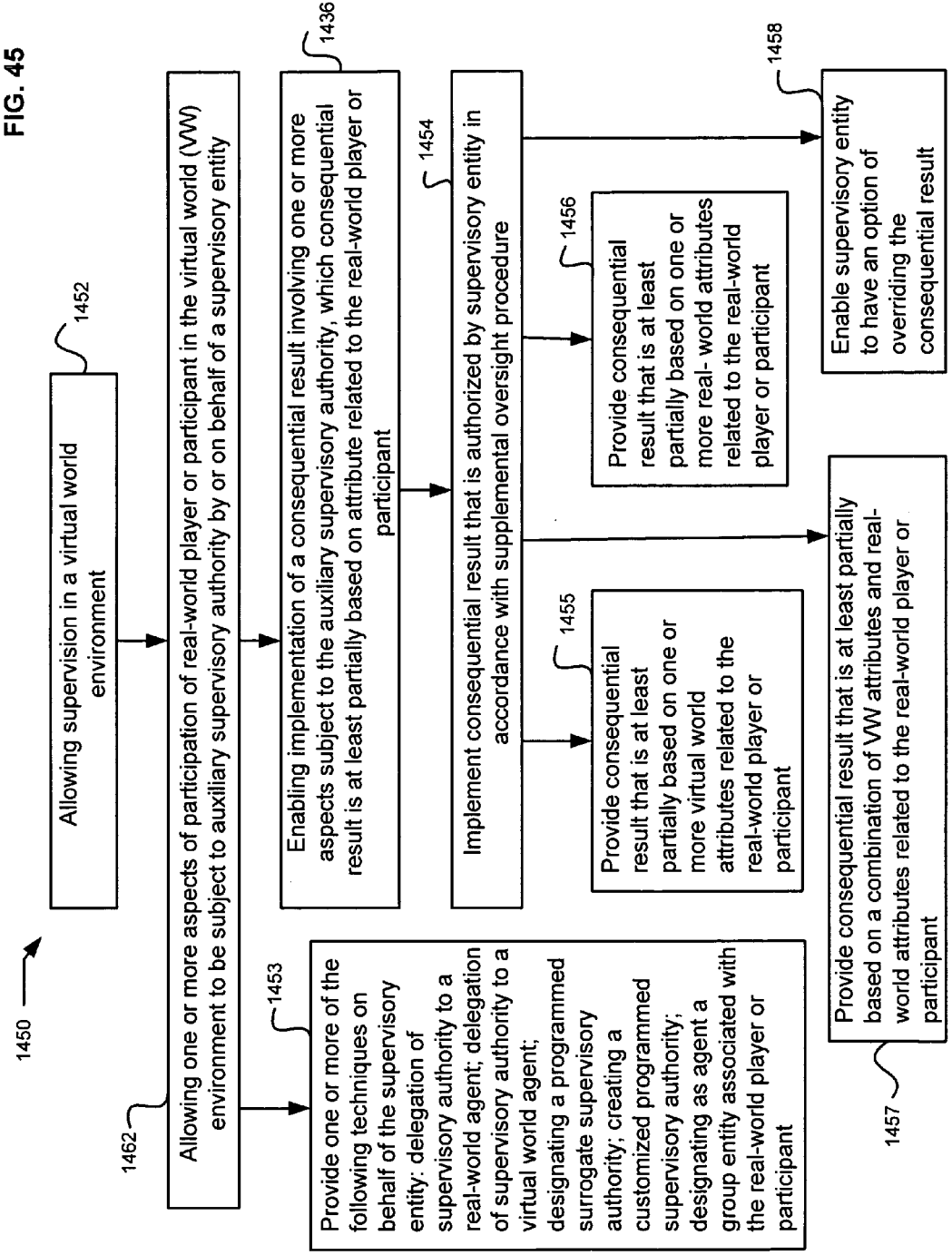
FIGS. 45-52 are more detailed flow charts showing additional exemplary embodiments.

FIG. 45 shows a more detailed exemplary process 1450 for allowing supervision in a virtual world environment (block 1452), which allows one or more aspects of the participation of a real-world player or participant in the virtual world environment to be subject to auxiliary supervisory authority by or on behalf of a supervisory entity (block 1462). A further feature provides one or more of the following techniques on behalf of the supervisory entity: delegation of supervisory authority to a real-world agent; delegation of supervisory authority to a virtual world agent; designating a programmed surrogate supervisory authority; creating a customized programmed supervisory authority; and designating as agent a group entity associated with the real-world player or participant (block 1453).

The exemplary process may include the previously described feature that enables implementation of a consequential result (see block 1436), and include a related feature that implements the consequential result that is authorized by the supervisory entity in accordance with the supplemental oversight procedure (block 1454). A consequential result may be provided that is at least partially based on one or more virtual world attributes related to the real-world player or participant (block 1455). Also a consequential result may be provided that is at least partially based on one or more real-world attributes related to the real-world player or participant (block 1456).

Another possible consequential result is at least partially based on a combination of virtual world attributes and real-world attributes related to the real-world player or participant (block 1457). A further feature may enable the supervisory entity to have an option of overriding the consequential result (block 1458).

Figure 46:
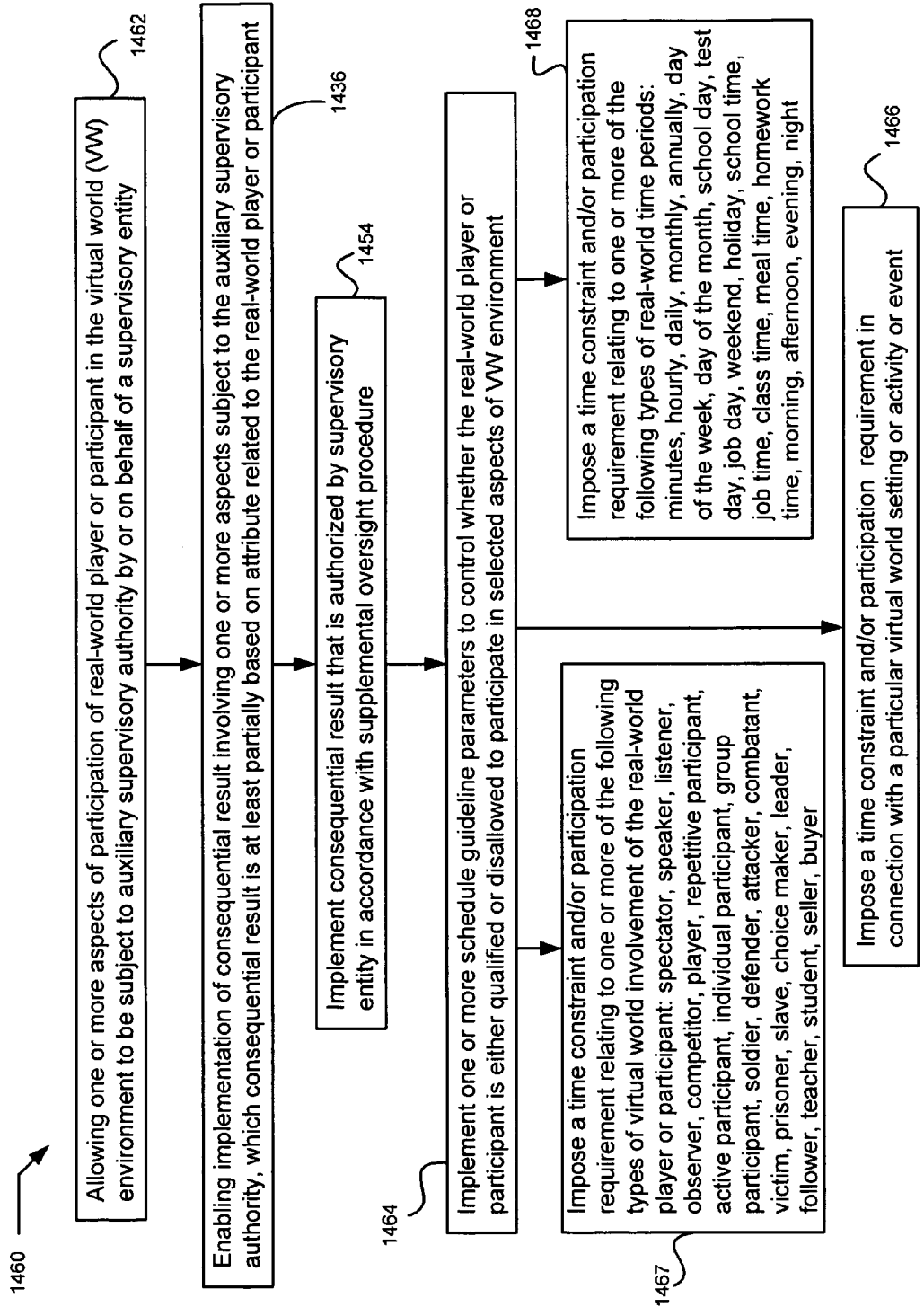

Referring to another exemplary embodiment 1460 shown in FIG. 46, a process allows one or more aspects of participation of a real-world player or participant in the virtual world environment to be subject to auxiliary supervisory authority by or on behalf of a supervisory entity (block 1462). In addition to the previously described features enabling implementation of a consequential result (block 1436) that is authorized by the supervisory entity (block 1454), the exemplary process implements one or more schedule guideline parameters to control whether the real-world player or participant is either qualified or disallowed to participate in selected aspects of the virtual world environment (block 1464).

Another feature may include imposing a time constraint and/or participation requirement in connection with a particular virtual world setting or activity or event (block 1466). A related possible feature imposes a time constraint and/or participation requirement relating to one or more of the following types of virtual world involvement of the real-world player or participant: spectator, speaker, listener, observer, competitor, player, repetitive participant, active participant, individual participant, group participant, soldier, defender, attacker, combatant, victim, prisoner, slave, choice maker, leader, follower, teacher, student, seller, and buyer (block 1467).

A further possible feature imposes a time constraint and/or participation requirement relating to one or more of the following types of real-world time periods: minutes, hourly, daily, monthly, annually, day of the week, day of the month, school day, test day, job day, weekend, holiday, school time, job time, class time, meal time, homework time, morning, afternoon, evening, and night (block 1468).

It will be understood that a time constraint may include a minimum time constraint (e.g., at least thirty minutes continuously, at least two hours per week, etc.) as well as a maximum time constraint (e.g., nor more than fifteen minutes continuously, no more that one hour per day, etc.). However this minimum/maximum dichotomy may in some instances be determined based on a somewhat subjective standard. So the use of "benefit" and "penalty" as used herein are preferably established by the auxiliary supervisory entity in accordance with the authorized oversight procedure. In other words, a flexible approach may in some circumstances preclude excessive time spent reading a "foreign language" book and also require a significant minimum time for "chat room" (i.e., we may want a particular child to socialize a bit more and study a bit less, perhaps especially if he's chatting in the French language).

Figure 47:
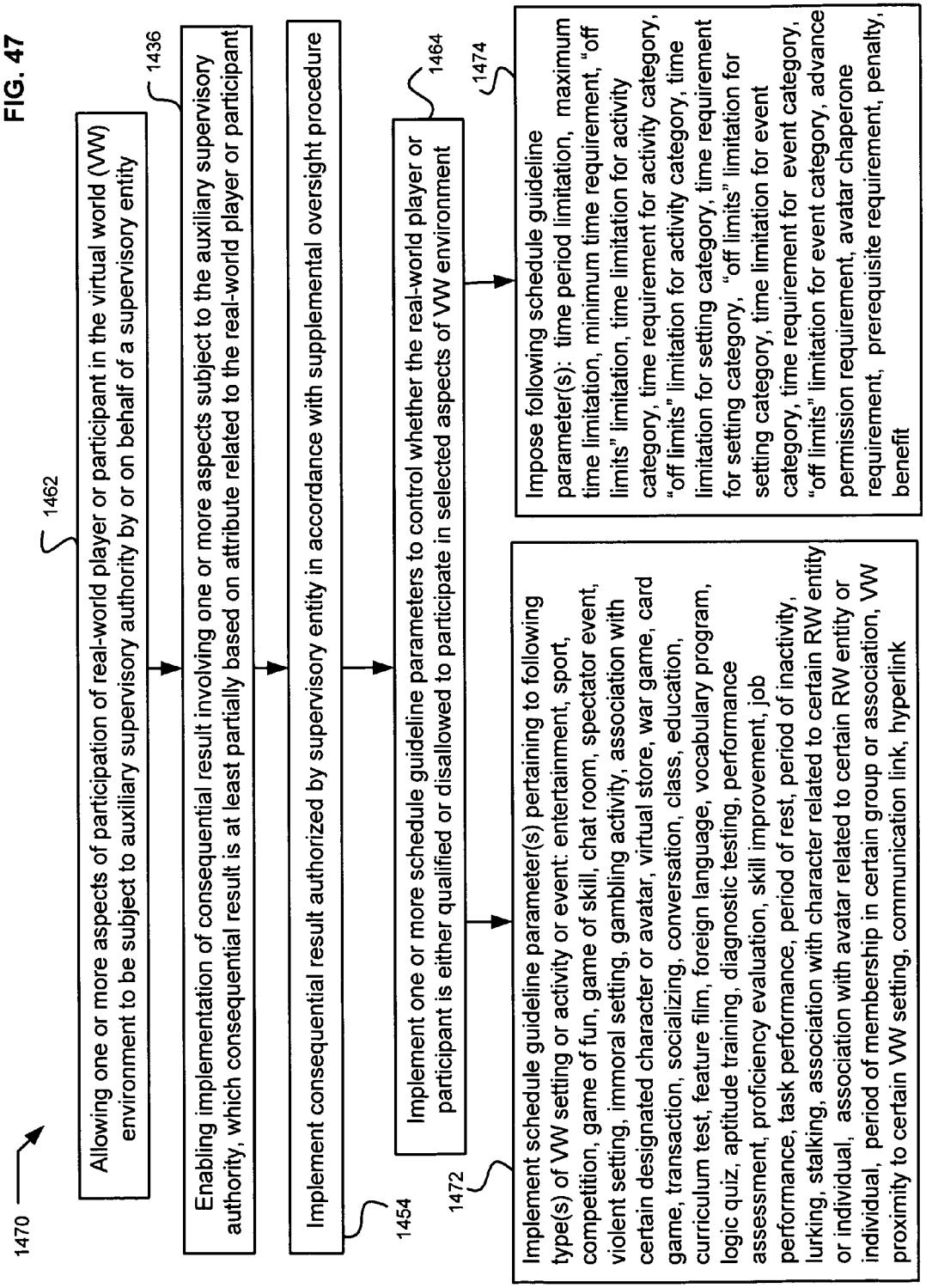

The exemplary process 1470 shown in FIG. 47 includes the previously identified features 1462, 1436, 1454 of FIG. 47 regarding consequential results authorized by the supervisory entity, as well as the previously described schedule guideline parameters regarding participation in selected aspects of a virtual world environment (see 1464). An additional implementation feature may include implementing one or more schedule guideline parameters that pertain to one or more of the following types of virtual world settings or activities or events: entertainment, sports, competition, game of fin, game of skill, chat room, spectator event, violent setting, immoral setting, gambling activity, association with designated character or avatar, virtual store, war game, card game, transaction, socializing, conversation, class, education, curriculum test, feature film, foreign language, vocabulary program, logic quiz, aptitude training, diagnostic testing, performance assessment, proficiency evaluation, skill improvement, job performance, task performance, periods of rest, periods of inactivity, lurking, stalking, association with character related to certain RW entity or individual, association with avatar related to certain RW entity or individual, period of membership in certain group or association, VW proximity to certain VW setting, communication link, and hyperlink (block 1472).

It will be understood that both RW and VW schedule parameters may include sub-categories of a specific setting, activity or event. For example, it may be deemed appropriate under some oversight procedures to provide informational data regarding very explicit aspects or attributes of the setting, activity or event that is deemed pertinent (e.g., not just time spent reading; but titles & authors; not just a conversational chat activity per se, but whether chat is in French vs. English; also an identification of chat participants; etc.).

A further possible feature may impose one or more of the following schedule guideline parameters regarding selected aspects of the virtual world environment: time period limitation, maximum time limitation, a minimum time requirement, "off limits" limitation, time limitation for an activity category, time requirement for an activity category, "off limits" limitation for an activity category, time limitation for a setting category, time requirement for a setting category, "off limits" limitation for a setting category, time limitation for an event category, time requirement for an event category, "off limits" limitation for an event category, advance permission requirement, avatar chaperone requirement, prerequisite requirement, penalty, and benefit (block 1474).

Figure 48:
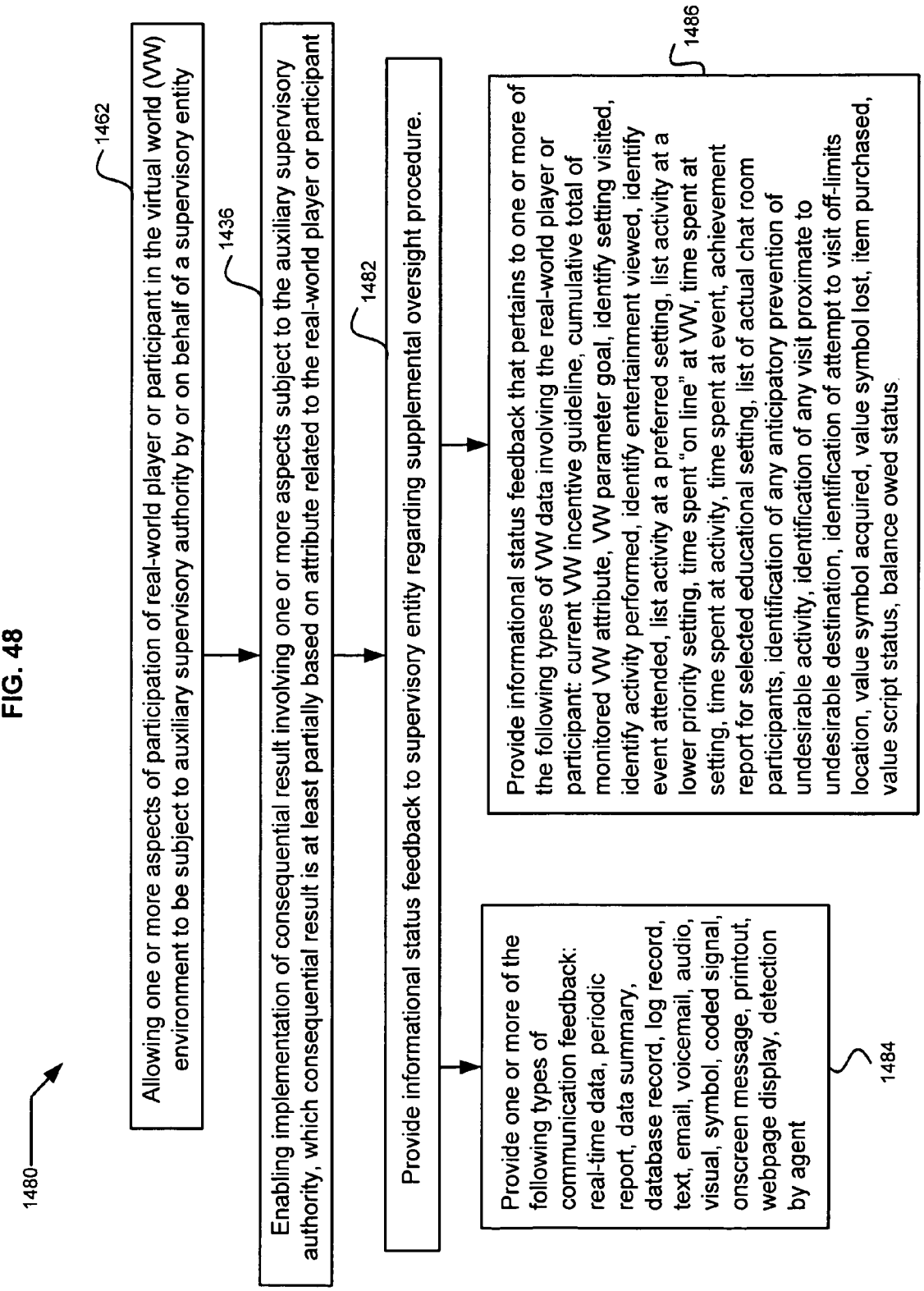

Referring to FIG. 48, an exemplary process embodiment 1480 provides the previously described features 1462, 1636 and also provides informational status feedback to the supervisory entity regarding the supplemental oversight procedure (block 1482). Another possible related feature provides one or more of the following types of communication feedback: real-time data, periodic report, data summary, database record, log record, text, email, voicemail, audio, visual, symbol, coded signal, onscreen message, printout, webpage display, and detection by agent (block 1484).

A further feature may provide informational status feedback that pertains to one or more of the following types of virtual world data involving the real-world player or participant: current virtual world incentive guideline, cumulative total of monitored virtual world attribute, virtual world parameter goal, identify setting visited, identify activity performed, identify entertainment viewed, identify event attended, list activity at a preferred setting, list activity at a lower priority setting, time spent "on line" at virtual world, time spent at setting, time spent at activity, time spent at event, achievement report for selected educational setting, list of actual chat room participants, identification of any anticipatory prevention of undesirable activity, identification of a visit proximate to undesirable destination, identification of attempt to visit off-limits location, value symbol acquired, value symbol lost, item purchased, value script status, and balance owed status (block 1486).

Figure 49:
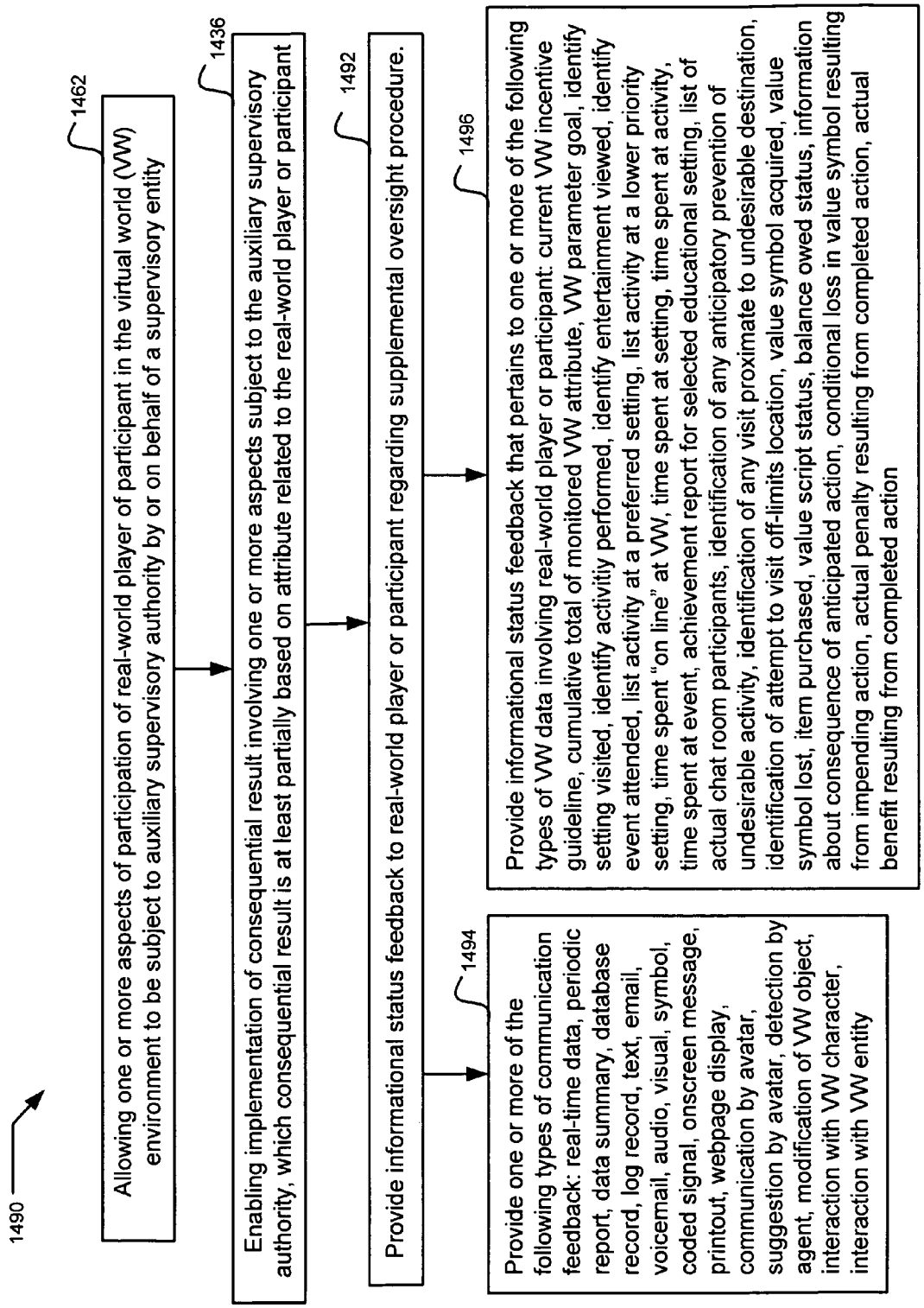

Referring to FIG. 49, an exemplary process embodiment 1490 provides the previously described features 1462, 1636 and also provides informational status feedback to the real-world player or participant regarding the supplemental oversight procedure (block 1492). Another possible related feature provides one or more of the following types of communication feedback: real-time data, periodic report, data summary, database record, log record, text, email, voicemail, audio, visual, symbol, coded signal, onscreen message, printout, webpage display, communication by avatar, suggestion by avatar, detection by agent, modification of a virtual world object, interaction with a virtual world character, and interaction with a virtual world entity (block 1494).

A further process feature may provide informational status feedback that pertains to one or more of the following types of virtual world data involving the real-world player or participant: current virtual world incentive guidelines, cumulative totals of monitored virtual world attributes, virtual world parameter goals, virtual world settings visited, virtual world activities performed, virtual world entertainment viewed, virtual world events attended, time spent at a virtual world setting, time spent at a virtual world activity, time spent at a virtual world event, achievement report for a selected educational setting, list of actual chat room participants, identification of any anticipatory prevention of undesirable activity, identification of a visit proximate to undesirable destination, identification of attempt to visit off-limits location, value symbols acquired, value symbols lost, items purchased, value script status, balance owed status, information about consequence of anticipated action, conditional loss in value symbols resulting from impending action, actual penalty resulting from completed action, and actual benefit resulting from completed action (block 1496).

Figure 50:
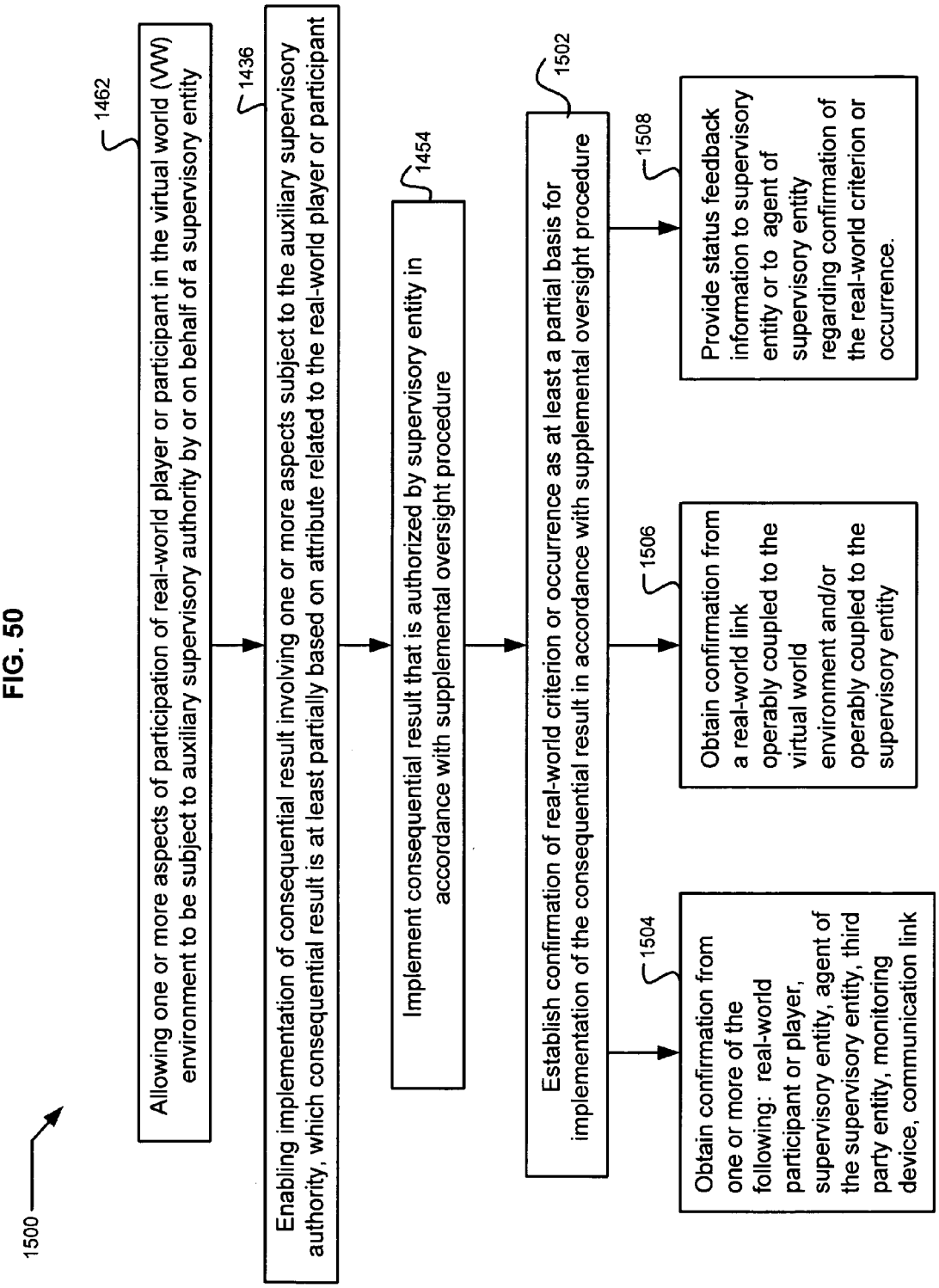

Referring to an exemplary embodiment 1500 shown in FIG. 50, a process implementation includes previously described features 1462, 1426, 1454 as well as establishing confirmation of a real-world criterion or occurrence as at least a partial basis for implementation of the consequential result in accordance with the supplemental oversight procedure (block 1502). An additional related feature may include obtaining confirmation from one or more of the following: the real-world participant or player, the supervisory entity, an agent of the supervisory entity, a third party entity, a monitoring device, and a communication link (block 1504). Another possible related feature includes obtaining confirmation from a real-world link operably coupled to the virtual world environment and/or operably coupled to the supervisory entity (block 1506).

Some embodiments may provide status feedback information to the supervisory entity or to an agent of the supervisory entity regarding confirmation of the real-world criterion or occurrence (block 1508).

Figure 51:
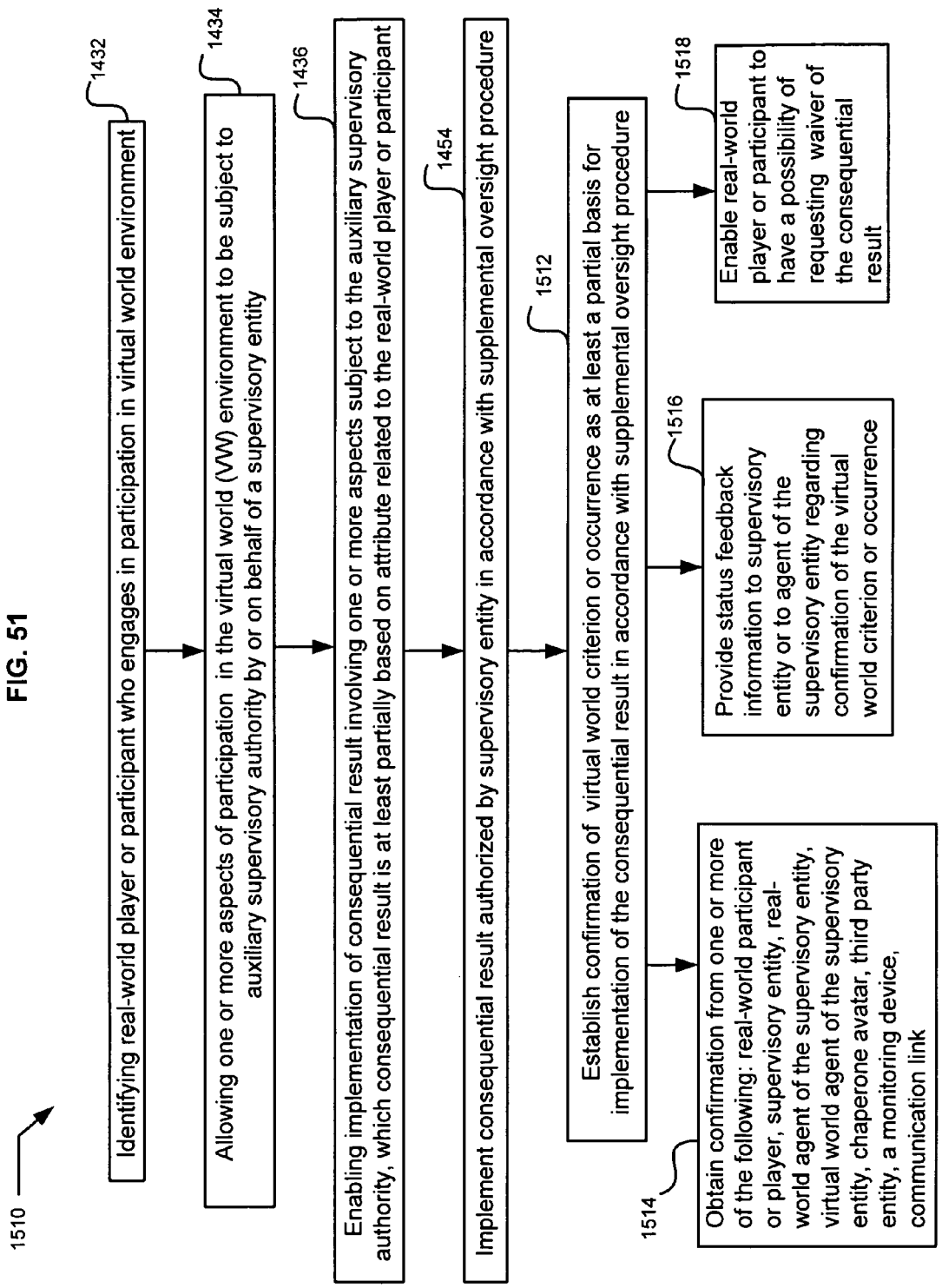

Referring to an exemplary embodiment 1510 shown in FIG. 51, a process implementation includes previously described features 1432, 1434, 1436, 1454 as well as establishing confirmation of a virtual world criterion or occurrence as at least a partial basis for implementation of the consequential result in accordance with the supplemental oversight procedure (block 1512). An additional related feature may include obtaining confirmation from one or more of the following: the real-world participant or player, the supervisory entity, an agent of the supervisory entity, a third party entity, a monitoring device, and a communication link (block 1514).

Some embodiments may provide status feedback information to the supervisory entity or to an agent of the supervisory entity regarding confirmation of the virtual world criterion or occurrence (block 1516). A further possible feature enables the real-world player or participant to have a possibility of requesting a waiver of the consequential result (block 1518).

Figure 52:
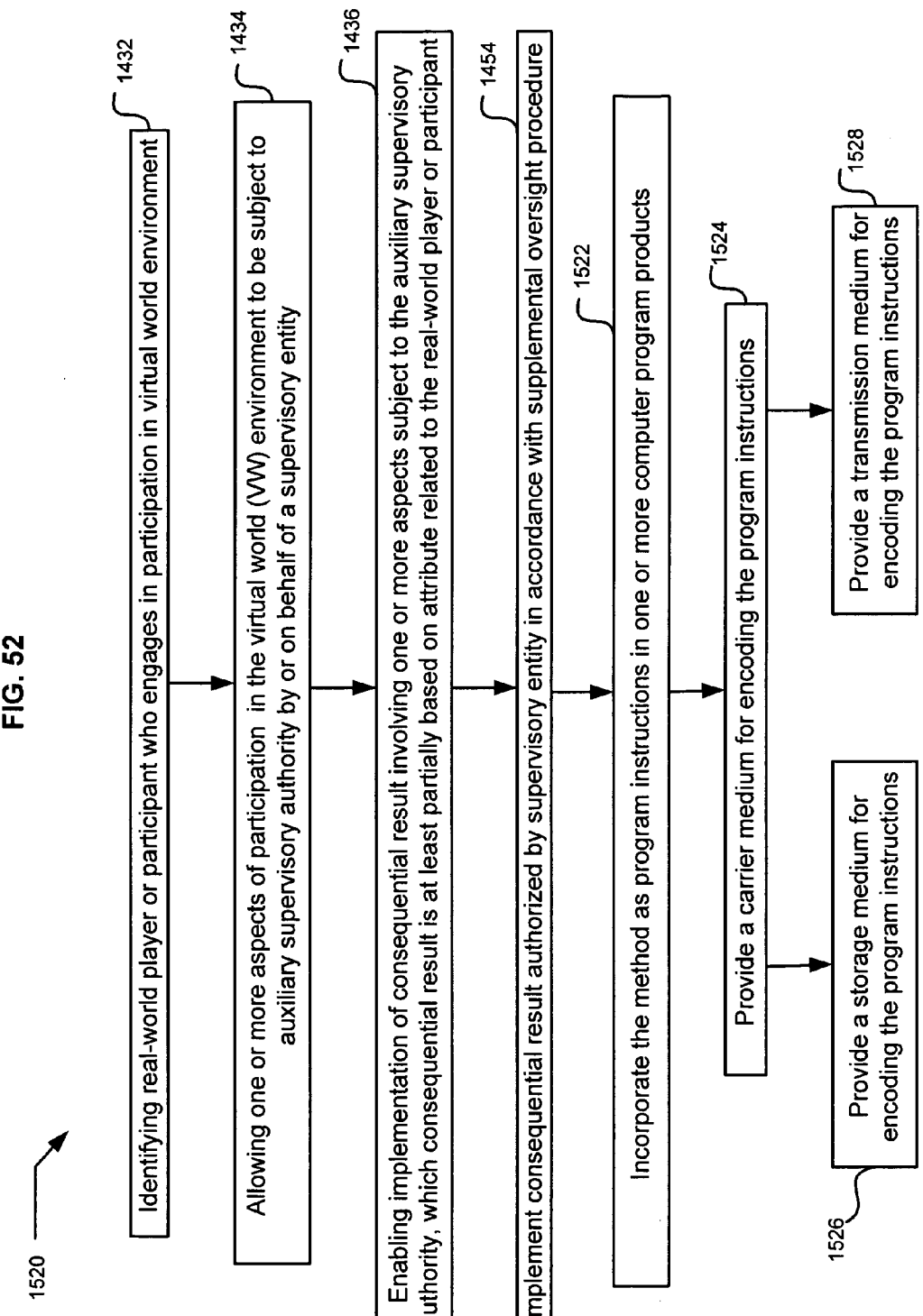

Referring to an exemplary embodiment 1520 shown in FIG. 52, a process implementation that includes previously described method features 1432, 1434, 1436, 1454 may be incorporated as program instructions in one or more computer program products (block 1522). A further feature may provide a carrier medium for encoding the program instructions (block 1524).

Some computer product embodiments may provide a storage medium for encoding the program instructions (block 1526). Some computer product embodiments may also provide a transmission (e.g., communication) medium for encoding the program instructions (block 1538).

Figure 53:
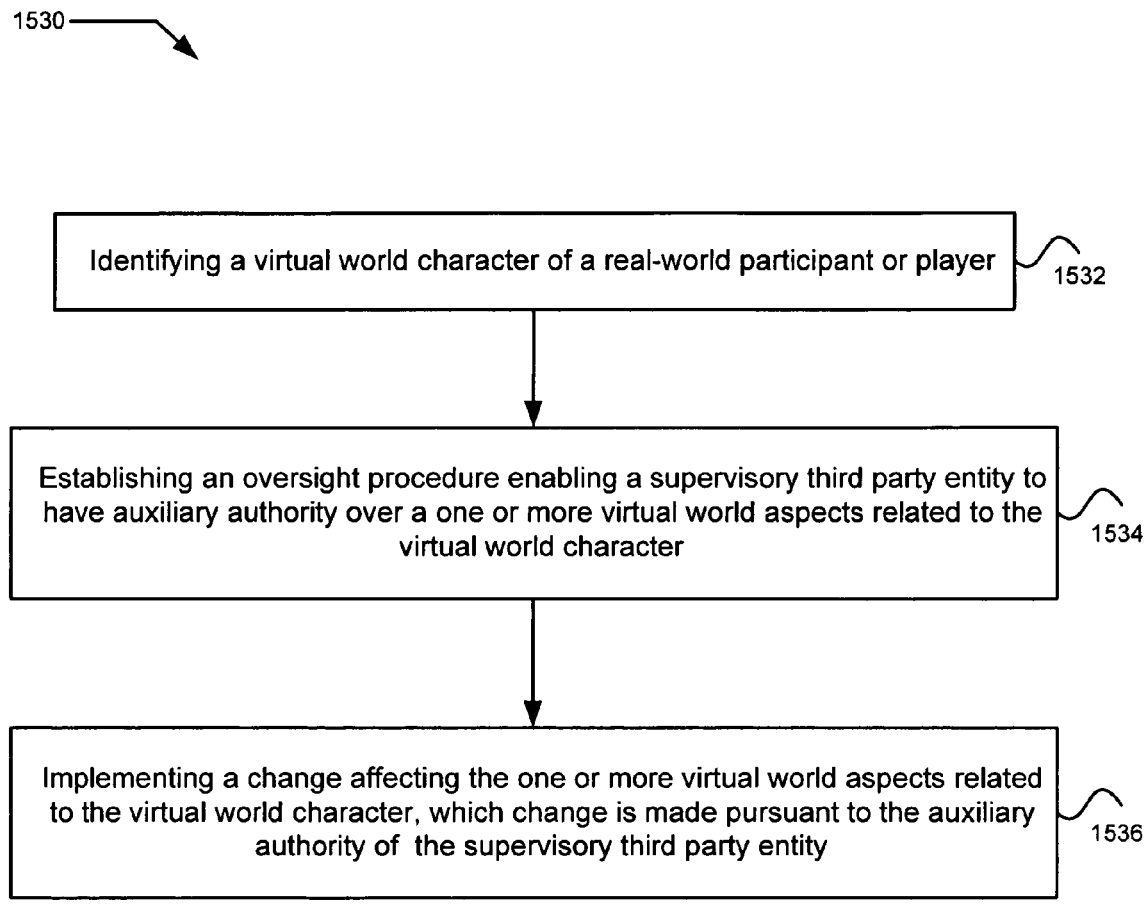
FIG. 53 is another high level flow chart showing a further exemplary process for some embodiments.

An exemplary high level flow chart in FIG. 53 shows a process embodiment 1530 the includes identifying a virtual world character of a real-world participant or player (block 1532), and establishing an oversight procedure enabling a supervisory third party entity to have auxiliary authority over one or more virtual world aspects related to the virtual world character (block 1534). A further feature may implement a change affecting the one or more virtual world aspects related to the virtual world character, which change is made pursuant to the auxiliary authority of the supervisory third party entity (block 1536).

Figure 54:
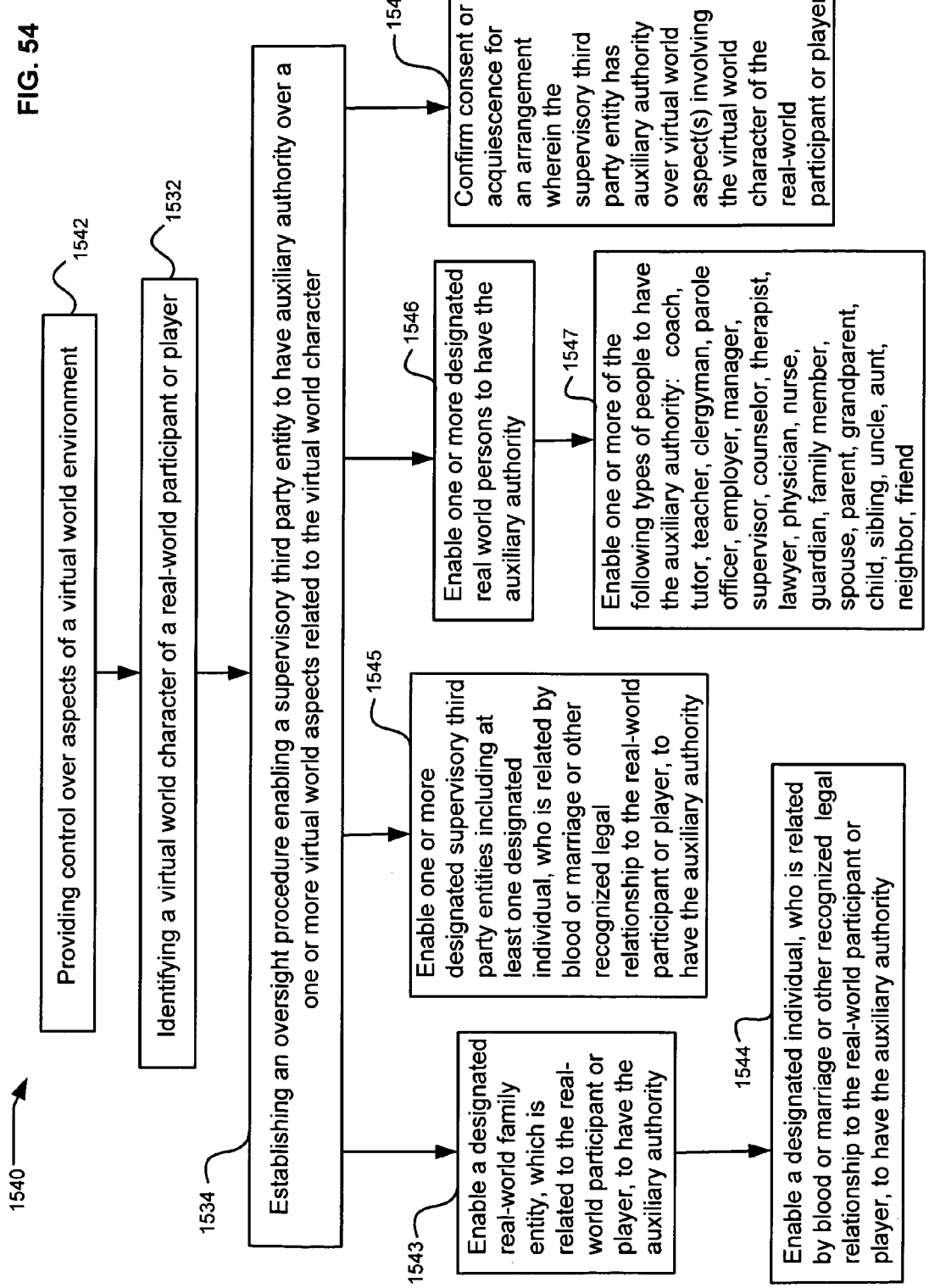

A more detailed flow chart of FIG. 54 shows an exemplary process 1540 that provides control over aspects of a virtual world environment (block 1542). In addition to the previously described features 1532, 1534 relating to a supervisory third party entity, another possible feature enables a designated real-world family entity, which is related to the real-world participant or player, to have the auxiliary authority (block 1543). A related feature may enable a designated individual, who is related by blood or marriage or other recognized legal relationship to the real-world participant or player, to have the auxiliary authority (block 1544).

Another possible related process feature enables one or more designated supervisory third party entities including at least one designated individual, who is related by blood or marriage or other recognized legal relationship to the real-world participant or player, to have the auxiliary authority (block 1545).

Additional exemplary process features enable one or more designated real world persons to have the auxiliary authority (block 1546), and also enable one or more of the following types of people to have the auxiliary authority: coach, tutor, teacher, clergyman, parole officer, employer, manager, supervisor, counselor, therapist, lawyer, physician, nurse, guardian, family member, spouse, parent, grandparent, child, sibling, uncle, aunt, neighbor, and friend (block 1547).

Another exemplary feature of various embodiments may include confirming consent or acquiescence for an arrangement wherein the supervisory third party entity has auxiliary authority over one or more virtual world aspects involving the virtual world character of the real-world participant or player (block 1548).

Figure 55:
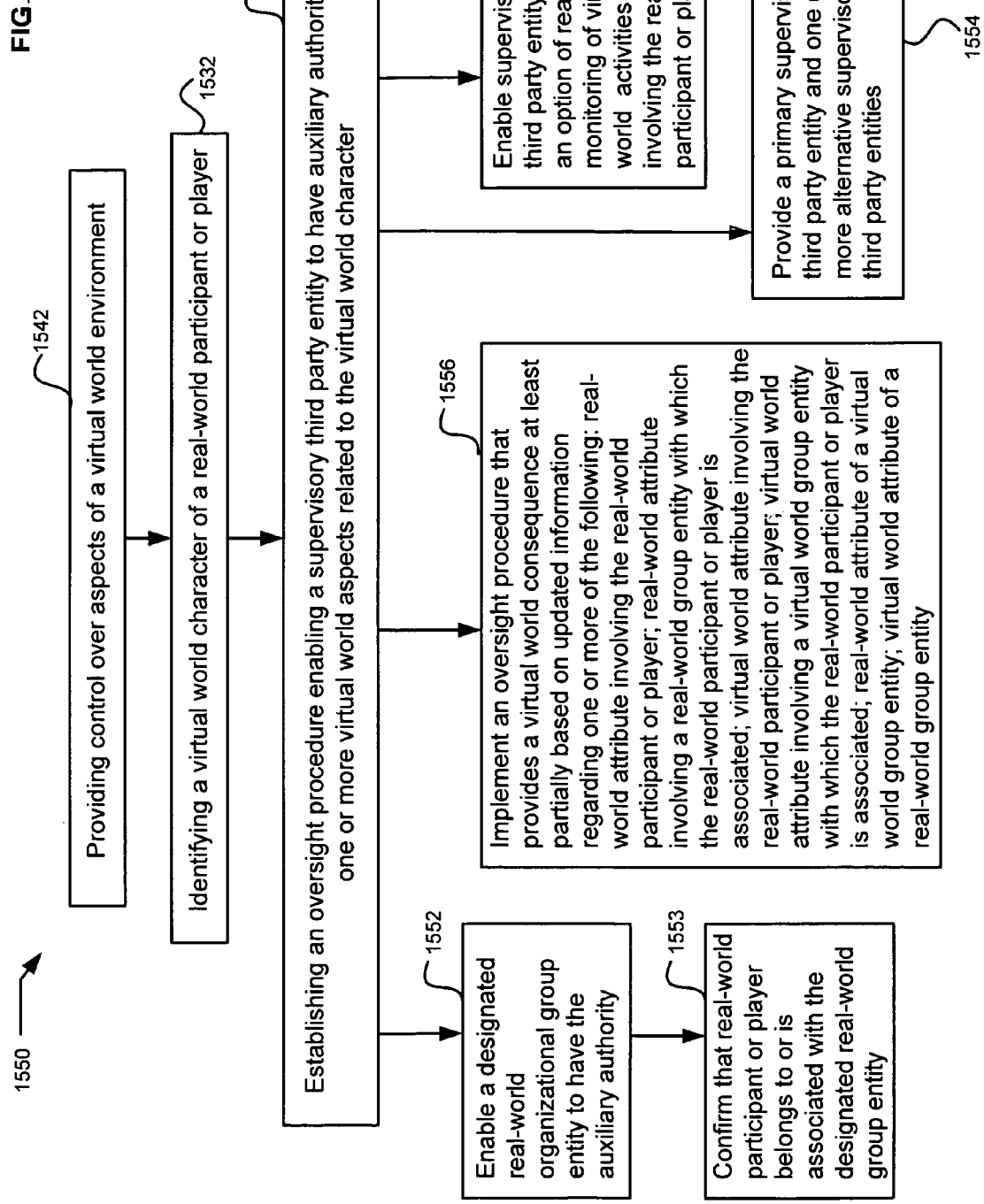

Referring to the flow chart of FIG. 55, another exemplary process embodiment 1550 includes the previously described features 1542, 1532, 1534 as well as an additional feature that enables a designated real-world group entity to have the auxiliary authority (block 1552). A related feature may confirm that the real-world participant or player belongs to or is associated with the designated real-world group entity (block 1553).

With respect to embodiments that include a real-world group entity to act as the auxiliary authority, it will be understood that various levels of membership and/or association are possible in order to provide some nexus between the participant or player on the one hand and the group entity on the other hand. Such membership or association could already be in existence or in some instances could be achieved as a preliminary step before proceeding with the oversight procedure. It is expected that the membership or association would preferably be voluntary rather than coerced, although some groups may have certain VW oversight procedures as part of the requirements for membership or association with the group entity.

Some embodiments may implement an oversight procedure that provides a virtual world consequence that is at least partially based on updated information regarding one or more of the following: a real-world attribute involving the real-world participant or player; a real-world attribute involving a real-world group entity with which the real-world participant or player is associated; a virtual world attribute involving the real-world participant or player; a virtual world attribute involving a virtual world group entity with which the real-world participant or player is associated; real-world attribute of a virtual world group entity; and a virtual world attribute of a real-world group entity (block 1556).

Additional possible features include providing a primary supervisory third party entity and one or more alternative supervisory third party entities (block 1554), and enabling the supervisory third party entity to have an option of real-time monitoring of virtual world activities involving the real-world participant or player (block 1555).

Figure 56:
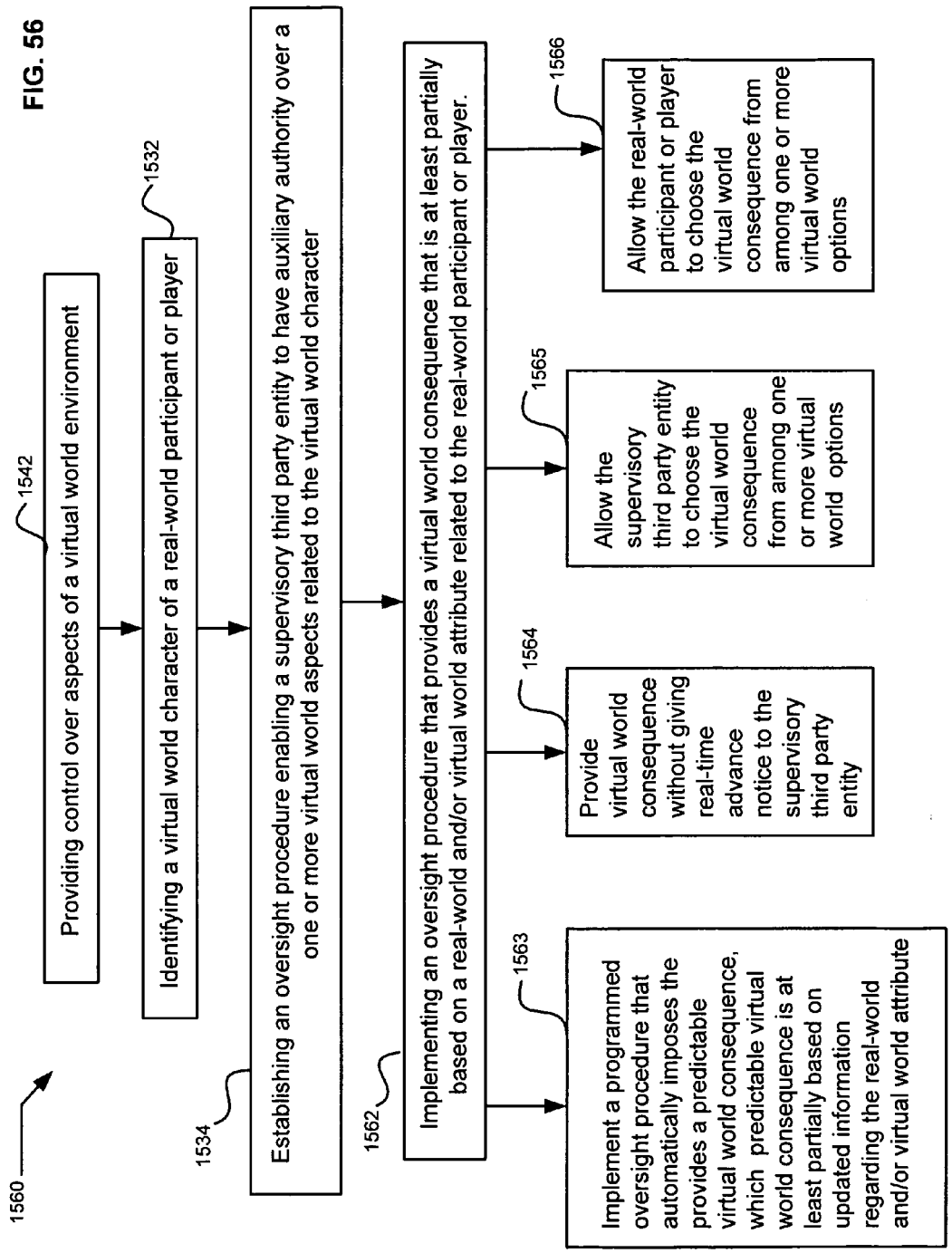

The exemplary embodiment 1560 shown in the flow chart of FIG. 56 includes the previously described features 1542, 1532, 1534 as well as implementing an oversight procedure that provides a virtual world consequence that is at least partially based on a real-world and/or virtual world attribute related to the real-world participant or player (block 1562). A further feature may implement a programmed oversight procedure that automatically provides a predictable virtual world consequence, which predictable virtual world consequence is at least partially based on updated information regarding the real-world and/or virtual world attribute (block 1563).

Implementations that provide a predictable virtual world consequence may incorporate different techniques for establishing the "predictable" consequence, including but not limited to an algorithm that may process (e.g., calculate) different variable RW and/or VW data parameters in order to determine the predictable consequence, as well as an oversight matrix or table that provides in advance a predetermined consequence linked to an antecedent RW and/or VW attribute (e.g., demographic attribute, default attribute, updatable attribute, etc.).

It will be understood that some supplemental oversight procedures may provide a closely linked relationship between the attribute of a participant or player confirmed as relevant, and a resulting consequence that is imposed on a virtual world aspect of the participant or player. For example, a certain "designated attribute" (e.g., a below-standard RW school class grade for French) might lead to the combined consequential result of a required minimum time at VW French language chat and a required maximum time at English language chat.

Another possible feature provides the virtual world consequence without giving real-time advance notice to the supervisory third party entity (block 1564). Additional exemplary implementations may allow the supervisory third party entity to choose the virtual world consequence from among one or more virtual world options (block 1565), and also may allow the real-world participant or player to choose the virtual world consequence from among one or more virtual world options (block 1566).

Referring to the embodiment 1570 of FIG. 57, the flow chart includes exemplary features 1532, 1534, 1536 along with an additional possibility of allowing the supervisory third party entity to customize a virtual world consequence related to a criterion or occurrence involving the real-world participant or player (block 1572). A related feature may enable the supervisory third party entity to have an option of selecting one or more of the following actions regarding the virtual world consequence: waiver of consequence, additional consequence, warning notification of possible consequence, proceed with a predetermined consequence, modified consequence, increased penalty, enhanced benefit, decreased penalty, decreased benefit, new penalty, and new benefit (block 1573).

The feature that provides for implementing a change affecting one or more virtual world aspects (see 1536) may also include changing one or more of the following virtual world aspects: real-world money expenditure limit in virtual world; time of day limit; day of week limit; maximum time limit; minimum time requirement; companion limit; available hyperlink access; required pre-requisite; completion requirement; "no limitation" activity; satisfactory test result; "off limits" activity; "permission required" activity; avatar chaperone requirement; available bonus; quest; goal; available level of achievement; attribute level; prize; available item ability; available item limitation; access token; access key; credential; player introduction; and third party introduction (block 1574).

Referring again to an exemplary embodiment 1570 shown in FIG. 57, a process implementation that includes previously described method features 1532, 1534, 1536 may be incorporated as program instructions in one or more computer program products (block 1575). A further feature may provide a carrier medium for encoding the program instructions (block 1576).

Some computer product embodiments may provide a storage medium and/or a transmission medium (e.g., communication medium) for encoding the program instructions (block 1577).

The flow chart of FIG. 58 shows an exemplary process embodiment 1580 that includes previously described process components 1532, 1534, 1546 and also some additional related process features. For example, some implementations may provide the third party supervisory entity a capability of approving an archetype parameter related to the one or more virtual world aspects (block 1582), and may also provide the third party supervisory entity a capability of approving a modified parameter relating to the one or more virtual world aspects (block 1583).

Some embodiments may include implementing a change based on a criterion or occurrence pertaining to the real-world participant or player (block 1584). A related feature may include implementing a change based on a criterion or occurrence pertaining to the virtual world character (block 1585).

A high level flow chart of FIG. 59 sets forth an exemplary embodiment 1590 wherein program instructions are configured to perform a process that associates information in a computer system (block 1592). The illustrated process provides a virtual world environment that is accessible to a player or participant (block 1593), and establishes a supplemental oversight procedure that is applicable to a particular player or participant, which supplemental oversight procedure has been authorized by or on behalf of a supervisory entity (block 1594). The process implements auxiliary control over one or more aspects of the particular virtual character's participation in the virtual world environment, which auxiliary control is authorized in accordance with the supplemental oversight procedure (block 1595. A computer-readable signal-bearing media bears the program instructions (block 1596).

It will be understood that the aforementioned illustrated process embodiments are by way of example only, and various changes, omissions, alterations, substitutions and enhancements could be incorporated in other different embodiments that would nevertheless be within the scope of the claims appearing below.

It will be further understood by those skilled in the art that system, method and computer program embodiments may incorporate additional combinations of components and process blocks which are different from the exemplary embodiments disclosed herein. Therefore the disclosed implementations are for purposes of illustration and example only.

The exemplary system, apparatus, and computer program product embodiments shown in FIGS. 6-15E, FIGS. 26-30, and FIGS. 37-42 along with other components, devices, know-how, skill and techniques that are known in the art have the capability of implementing and practicing the methods and processes shown in FIGS. 43-59. It is to be understood that the methods and processes can be incorporated in one or more different types of computer program products with a carrier medium having program instructions encoded thereon. However it is to be further understood by those skilled in the art that other systems, apparatus and technology may be used to implement and practice such methods and processes.

It will be understood from the disclosure herein that a virtual reality environment may include a simulated world having a monetary system based on putative value symbols that constitute a medium of exchange, wherein the simulated world allows a virtual world transaction such as a credit arrangement to have a commitment for present or future payment of one or more putative value symbols.

An aspect of the simulated world may allow a transaction such as, for example, a credit arrangement to provide for present or future payment of one or more of the following types of value symbols: virtual currency, monetary chips, discount coupons, award points, access rights, entrance keys, experience medals, level permits, bonus vouchers, skill merits, character traits, health benefits, success awards, entrance tickets, authorization passes, eligibility credentials, benefit tokens, vested rights, license permissions, decryption codes, bonus vouchers, test certificates, game time credits, additional characters, control over other player characters, control over non-player characters, aliases, privacy levels, visibility levels, and disguises.

Another aspect of the simulated world may allow an exemplary transaction such as a credit arrangement to include a commitment by a debtor participant for present or future payment of a value symbol that can be acquired in connection with one or more of the following types of events or activities occurring in the simulated world: sports, races, competitions, combat, battles, survival, achievements, opportunities, challenges, character choices, training, academics, education, careers, jobs, journeys, attendance, entertainment, amusement, parties, shopping reading, calculating, analysis, healthcare, sharing communication, music, philanthropy, religion, socializing, companionship, dating, lovemaking, gambling, lotteries, tests, awards, gifts, barter, negotiations, sales, purchases, services, loans, journaling, record keeping, posting information, networking, and building. It will be understood from the disclosure herein that such events or activities occurring in the simulated world includes events or activities that occur wholly in the simulated world as well as events or activities that are only initiated or partly pursued in the simulated world, or combinations of both of these.

The simulated world may provide a game environment for one or more players, wherein a virtual world arrangement or activity includes the acquisition of one or more of the following types of things of potential value: products, services, items, virtual value tokens, virtual currency, monetary chips, discount coupons, award points, access rights, entrance keys, experience medals, level permits, bonus vouchers, skill merits, character traits, health benefits, success awards, entrance tickets, authorization passes, eligibility credentials, benefit tokens, vested rights, license permissions, decryption codes, bonus vouchers, and test certificates.

A user interface communication link to the simulated world may in some implementations enable a player or participant to be the debtor participant in the credit arrangement that includes an obligation for future compensation to be tendered in said simulated world by or on behalf of the debtor participant. In some exemplary embodiments the simulated world allows such an obligation for future compensation to be transferable by the debtor participant to another party.

In additional implementations, a user interface communication link to the simulated world may enable a player or participant to be the creditor participant in the credit arrangement that includes a right for future compensation to be received in said simulated world by or on behalf of the creditor participant. In some exemplary embodiments the simulated world allows such a right for future compensation to be transferred by the creditor participant to another party.

A further aspect of the disclosed system enables interaction in the simulated world between the debtor participant and the creditor participant regarding one or more of the following activities: creating the credit arrangement, negotiating terms of the credit arrangement, revising the credit arrangement, resolving the credit arrangement, transferring the debtor's credit arrangement obligations, transferring the creditor's credit arrangement rights, and terminating the credit arrangement.

Various embodiments of the simulated world allow a virtual world transaction such as a credit arrangement to be based on a commitment with a real-world due date for resolution. In some embodiments, the virtual credit arrangement may be based on a commitment for future real-world compensation.

Another aspect of the disclosed system provides a simulated world that allows an exemplary transaction such as, for example, a virtual credit arrangement to include one or more of the following penalties based on a failure of a participant to keep one or more obligations of the credit arrangement: a penalty in the simulated world, and a real-world penalty. Also some exemplary embodiments further allow an exemplary transaction such as a virtual credit arrangement to include one or more of the following benefits based on compliance by a participant with one or more obligations of the credit arrangement: a benefit in the simulated world, and a real-world benefit.

It will also be understood by those skilled in the art in view of the present disclosure that a user interface communication link to a simulated world may include login and logoff capability for the player of participant, wherein a memory device maintains the record of an exemplary transaction such as a virtual credit arrangement or other virtual world obligation after the player or participant has logged off or become dormant in the simulated world. Such a user interface communication link may be accessible via wired and/or wireless links.

Some embodiments of the simulated world environment may include a communication link that provides disclosure of sufficient information necessary to decrypt, decode, or otherwise obtain the identification of a real-world person or real-world entity responsible for obligations arising from a virtual world arrangement, as well as the identification of a real-world person or entity having rights arising from the virtual world arrangement.

In some implementations, multiple players at different locations can use virtual world accounts and/or real world accounts for arranging or resolving a virtual credit transaction as well as resolving other virtual world transactions. Some embodiments enable a debtor obligation and/or a creditor right arising from a virtual credit transaction to be transferred to another party, in some instances without having to obtain any permission for such transfer.

Some embodiments include a computer means that provides a fictional game environment capable of having multiple players individually participate in virtual world transactions with each other. One aspect provides a fictional game environment capable of having the one or more players participate in virtual world transactions such as a credit arrangement with a non-player entity in the fictional game environment.

The fictional game environment may be capable of providing virtual world transactions as well as other virtual world activities involving one or more non-player entities taken from the following group: real-world credit entity, real-world third party, virtual world provider, game environment operator, third party virtual entity, virtual world credit entity, fictional character, and virtual world avatar.

The fictional game environment may also be capable of having multiple players collectively participate as a group entity in virtual world transactions as well as other activities in the fictional game environment. A further aspect provides a fictional game environment capable of having a player share with another player or entity a risk or benefit resulting from a virtual world transaction. For example, a participant creditor may receive some extra value based on a participant debtor's successful use of a virtual item, product, service or thing of value acquired in a virtual credit transaction.

A virtual world system embodiment may include a fictional game environment capable of having the multiple players share real-world and/or virtual world benefits arising from the virtual credit transaction.

Some virtual world environments are created to be capable of having one or more players participate as a participant in virtual world transactions with another player entity and/or with a non-player entity.

One aspect of a virtual world environment embodiment may include a feature wherein compliance by a participant with a virtual world transaction obligation results in one or more of the following: a benefit having real-world value, a benefit having value in the virtual world environment, and a benefit having both real-world value and virtual world value.

Another aspect of a virtual world environment may include a feature wherein non-compliance by the participant with a real world transaction obligation results in a loss of one or more of the following: something having real-world value, something having value in the virtual world environment, and something having both real-world value and virtual world value.

Some implementations provide a player interface link that includes multiple bi-directional communication links enabling players at different locations to participate in the virtual world environment. A further implementation of a virtual world environment includes one or more of the following communication links accessible to the one or more players while participating in the virtual world environment: a communication link to another different virtual world environment, and a communication link to a real-world environment.

A further feature in some embodiments provides a computer means that creates a virtual world environment capable of having an individual player periodically logged on the system for participation in one or more virtual world transactions with a non-player entity.

Some virtual world embodiments provide consequences based on a player's performance record of compliance or non-compliance with an obligation arising from a virtual world transaction or activity.

It will be understood from the disclosure herein that methods and processes may be incorporated in a computer program product having one or more computer programs for awarding a virtual world benefit based on a performance record showing compliance with terms of a transaction or activity in a virtual world environment. Another aspect of a computer program embodiment may impose a virtual world penalty based on a performance record showing non-compliance with terms of a virtual world transaction or activity.

An embodiment for awarding a virtual world benefit may include awarding one or more of the following: virtual world money; virtual items of value; virtual achievement points; virtual character points; more virtual world transaction opportunities; favorable future virtual credit terms; virtual world purchase discounts; future virtual world event opportunities; advanced level virtual world participation; additional future obligations; additional future virtual world transactions; better future terms for virtual world transactions; expanded virtual world event participation; additional virtual world choices; access to restricted virtual world communication links; better access to virtual world destinations; virtual value symbols; increased value of virtual world experience points; re-activation of virtual level qualifications.

Another embodiment for imposing a virtual world penalty may include imposing a penalty from one or more of the following categories: return something acquired by a virtual world transaction; create additional future obligation; limit future virtual world transaction; less favorable future terms for a virtual world transaction; restriction on virtual world event participation; restriction on virtual world choices; virtual world communication link restriction; restriction on access to virtual world destination; forfeiture of something of virtual value; loss of virtual value symbols; loss of virtual world experience points; loss or suspension of virtual level qualification; payment of virtual world money; loss of virtual achievement points; loss of virtual character points; fewer virtual world transaction opportunities; more onerous future virtual credit terms; loss of virtual world purchase discount; and less virtual world event opportunities.

One aspect of the system and method disclosed herein provides for awarding a real-world benefit based on a performance record showing compliance with terms of a virtual world arrangement such as a credit transaction. Another aspect of some embodiments provides for imposing a real-world penalty based on a performance record showing non-compliance with terms of a virtual world arrangement such as a credit transaction.

It will be understood by those skilled in the art that various embodiments of the method and system disclosed herein create a relationship between a real-world entity and a virtual world environment. A participant or player can participate in various virtual world experiences including activities, settings, events, purchases, sales and diverse transactions to acquire virtual products, virtual services, and/or virtual items of value. Feedback may be provided and records kept regarding the virtual world participation. In some circumstances, multiple persons can participate as a group or participate as individuals in the virtual world environment.

Some embodiments provide an oversight procedure that enables a supervisory entity to exercise direct or indirect control over certain virtual world aspects of a participant or player. In some implementations the oversight procedure is at least partially based on an attribute related to the participant or player.

Further features of the some embodiments provide a control module that includes the capability for implementing a programmed supplemental oversight procedure that has been authorized by or on behalf of the supervisory entity. The control module may further include the capability of implementing the supplemental oversight procedure to cause a consequential result that includes imposing a virtual world penalty and/or a virtual world benefit involving the particular player or participant. Various examples of possible virtual world benefits as well as virtual world penalties have been described herein.

The control module may further include the capability of implementing the supplemental oversight procedure that includes imposing the consequential result based at least partially on one or more of the following real-world attributes involving the particular player or participant: default attributes, demographic attributes, and updated attributes.

In some implementations the system provides an input communication link configured to receive input data regarding the one or more real-world attributes from the supervisory entity and/or from an agent of the supervisory entity and/or from the particular player or participant. An additional feature of the control module may includes the capability of implementing a supplemental oversight procedure that includes imposing the virtual world penalty based at least partially on one or more of the following virtual world attributes involving the particular player or participant: default attributes, demographic attributes, and updated attributes.

Additional exemplary system features may provide a first output signal that transmits status feedback data to the supervisory entity regarding virtual world and/or real-world status information related to the supplemental oversight procedure. Such a first output signal may include output data pertaining to one or more of the following: required virtual world activities this week; updated on-line virtual world time budget; virtual world activities available today; calendar schedule showing available virtual world logon time periods; timer showing time remaining for current virtual world activity; real-world goal status; real-world school status, real-world financial status, virtual world monetary script status, virtual world value symbol status, and status information via chaperone avatar.

Another exemplary system feature may provide a second output signal that transmits status feedback data to the particular player or participant regarding virtual world and/or real-world status information related to the supplemental oversight procedure. Such a second output signal may include output data pertaining to one or more of the following: required virtual world activities this week; updated on-line virtual world time budget; virtual world activities available today; calendar schedule showing available virtual world logon time periods; timer showing time remaining for current virtual world activity; virtual world goal status; virtual world category goals; real-world goal status; real-world school status; real-world financial status; virtual world monetary script status; virtual world value symbol status; status information via chaperone avatar; information about consequence of anticipated action; conditional loss in value symbols resulting from impending action; actual penalty resulting from completed action; and actual benefit resulting from completed action.

Some embodiments may include both the first output signal and the second output signal having the previously described characteristics. Some implementations may include first and second output signals that provide different status feedback data, respectively, to the supervisory entity and to the particular player or participant.

Some system embodiments have an input communication link configured to receive confirmation of a virtual world criterion or occurrence that provides at least a partial basis for the consequential result in accordance with the supplemental oversight procedure. A related implementation may provide a input communication link configured to receive confirmation of a real-world criterion or occurrence that provides at least a partial basis for the consequential result in accordance with the supplemental oversight procedure.

It will be understood by those skilled in the art that various embodiments of the method and system disclosed herein create a relationship between a participant or player in a virtual world environment and an auxiliary supervisory entity that establishes supplemental control of virtual world experiences of the participant or player. A participant or player can participate in various virtual world experiences as a virtual character. The auxiliary supervisory entity may in some instances also participate as a monitor or observer of such virtual world experiences.

Some embodiments may include a computer system for creating a virtual world environment including operating procedures for one or more virtual characters, and may further provide supplemental oversight procedures that are authorized by an auxiliary supervisory entity to control one or more virtual world aspects involving a designated virtual character of a participant or player. A related component may include a control module operably coupled with the virtual world environment, wherein the control module implements the supplemental oversight procedures that affect the one or more virtual world aspects involving the designated virtual character.

Another feature of the supplemental oversight procedures may include programmed rules that provide a predictable consequential result in the virtual world environment, which predictable consequential result is at least partially based on a real-world attribute of the participant or player. Such predictable consequential result may also be at least partially based on a virtual world attribute of the participant or player.

Additional features as disclosed herein may provide a communication link between the control module and the auxiliary supervisory authority. In some implementations the communication link enables the auxiliary supervisory authority to monitor the virtual world experiences involving the participant or player. A further embodiment may provide a communication link that enables the auxiliary supervisory authority to implement a change affecting one or more virtual world aspects involving the designated virtual character.

Other embodiments may provide a bi-directional communication link via a network that is accessible by the participant or player. In some instances the bi-directional communication link may enable the participant or player to receive feedback status information regarding the supplemental oversight procedures.

Some embodiments such as a computer program product may include a process that establishes confirmation of a real-world criterion or occurrence related to the participant or player. A related process feature may establish confirmation of a virtual world criterion or occurrence related to the participant or player. Responsive to the confirmation, the process may modify an aspect related to virtual world participation of the particular player or participant in accordance with the supplemental oversight procedure.

A further embodiment for a computerized system includes computer apparatus capable of interaction with a computer-simulated virtual world environment, and an interface that allows a real-world participant or player to access the computer apparatus and participate in the virtual world environment as a virtual character. The system may provide instructions that when executed by the computer apparatus enable the participant or player to activate the virtual character in the virtual world environment. Such instructions may also enable the participant or player to engage in one or more virtual world experiences which are subject to an oversight procedure authorized by a supervisory third party entity, which oversight procedure includes control over an aspect related to the one or more virtual world experiences. In some implementations an oversight procedure may include a virtual world consequence that is relevant to the real-world and/or virtual world attribute upon which the VW consequence is at least partially based.

It will be understood that the various aforementioned features and aspects can be implemented in different technology systems, apparatus and products including computer program products that include a carrier medium that carries encoded program instructions for executing the computer process. Of course, a carrier medium carrying the encoded program instructions may be a communication medium such as modulated signals and/or a recording medium such as a memory storage device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

As a further definition of "open" terms in the present specification and claims, it will be understood that usage of a language construction "A or B" is generally interpreted as a non-exclusive "open term" meaning: A alone, B alone, A and B together.

Although various features have been described in considerable detail with reference to certain preferred embodiments, other embodiments are possible. Therefore, the spirit or scope of the appended claims should not be limited to the description of the embodiments contained herein.

The invention claimed is:

1. A system comprising:
   at least one computer for creating at least one virtual world environment including one or more operating procedures for one or more virtual characters;
   an oversight module configured to establish at least one supplemental oversight procedure authorized by at least one real world auxiliary supervisory entity to control one or more virtual world aspects involving at least one designated virtual character based at least in part on real world status information associated with at least one real world user corresponding to the at least one designated virtual character; and
   at least one control module operably coupled with the at least one virtual world environment, wherein the at least one control module implements the at least one supplemental oversight procedure to control the one or more virtual world aspects involving the at least one designated virtual character based at least in part on the real world status information associated with the at least one real world user corresponding to the at least one designated virtual character.

2. The system of claim 1, wherein the oversight module configured to establish at least one supplemental oversight procedure authorized by at least one real world auxiliary supervisory entity to control one or more virtual world aspects involving at least one designated virtual character based at least in part on real world status information associated with at least one real world user corresponding to the at least one designated virtual character comprises:
   an oversight module configured to establish at least one supplemental oversight procedure authorized by at least one real world auxiliary supervisory entity to provide at least one consequential result in the at least one virtual world environment based at least in part on real world status information associated with at least one real world user corresponding to the at least one designated virtual character.

3. The system of claim 1, wherein the oversight module configured to establish at least one supplemental oversight procedure authorized by at least one real world auxiliary supervisory entity to control one or more virtual world aspects involving at least one designated virtual character based at least in part on real world status information associated with at least one real world user corresponding to the at least one designated virtual character comprises:

an oversight module configured to establish at least one supplemental oversight procedure authorized by at least one real world auxiliary supervisory entity to provide at least one consequential result in the at least one virtual world environment based at least in part on real world status information associated with at least one real world user corresponding to the at least one designated virtual character and at least one virtual world attribute of the at least one designated virtual character.

4. The system of claim 1, wherein said at least one supplemental oversight procedure includes at least one provision enabling the at least one real world auxiliary supervisory authority to select one or more of the following actions: waiver of consequence, additional consequence, warning notification of possible consequence, proceed with a predetermined consequence, modified consequence, increased penalty, enhanced benefit, decreased penalty, decreased benefit, new penalty, and new benefit.

5. The system of claim 1, wherein the oversight module configured to establish at least one supplemental oversight procedure authorized by at least one real world auxiliary supervisory entity to control one or more virtual world aspects involving at least one designated virtual character based at least in part on real world status information associated with at least one real world user corresponding to the at least one designated virtual character comprises:
   an oversight module configured to establish at least one supplemental oversight procedure authorized by at least one real world auxiliary supervisory entity to control one or more virtual world aspects involving at least one designated virtual character based at least in part on real world status information associated with at least one real world group entity with which at least one real world user corresponding to the at least one designated virtual character is associated.

6. The system of claim 1, further comprising:
   at least one communication link between the at least one control module and the at least one real world auxiliary supervisory authority.

7. The system of claim 6, wherein the at least one communication link enables the at least one real world auxiliary supervisory authority to monitor one or more virtual world experiences involving the at least one designated virtual character.

8. The system of claim 6, wherein the at least one communication link enables the at least one real world auxiliary supervisory authority to implement at least one change affecting the one or more virtual world aspects involving the at least one designated virtual character.

9. The system of claim 1 further comprising:
   at least one bi-directional communication link via at least one network that is accessible by the at least one real world user corresponding to the at least one designated virtual character.

10. The system of claim 9, wherein the at least one bi-directional communication link enables the at least one real world user corresponding to the at least one designated virtual character to receive feedback status information regarding the at least one supplemental oversight procedure.

11. The system of claim 1, wherein the oversight module configured to establish at least one supplemental oversight procedure authorized by at least one real world auxiliary supervisory entity to control one or more virtual world aspects involving at least one designated virtual character based at least in part on real world status information associated with at least one real world user corresponding to the at least one designated virtual character comprises:
   an oversight module configured to establish at least one supplemental oversight procedure authorized by at least one real world auxiliary supervisory entity to control one or more virtual world aspects involving at least one designated virtual character based at least in part on real world school-related grade information associated with at least one real world user corresponding to the at least one designated virtual character.

12. The system of claim 11, wherein the at least one control module operably coupled with the at least one virtual world environment, wherein the at least one control module implements the at least one supplemental oversight procedure to control the one or more virtual world aspects involving the at least one designated virtual character based at least in part on the real world status information associated with the at least one real world user corresponding to the at least one designated virtual character comprises:
   at least one control module operably coupled with the at least one virtual world environment, wherein the at least one control module implements the at least one supplemental oversight procedure to constrain the one or more virtual world aspects involving the at least one designated virtual character based at least in part on the real world school-related grade information associated with the at least one real world user corresponding to the at least one designated virtual character indicating at least one grade that is below at least one specified value.

13. The system of claim 12, wherein the at least one control module operably coupled with the at least one virtual world environment, wherein the at least one control module implements the at least one supplemental oversight procedure to constrain the one or more virtual world aspects involving the at least one designated virtual character based at least in part on the real world school-related grade information associated with the at least one real world user corresponding to the at least one designated virtual character indicating at least one grade that is below at least one specified value comprises:
   at least one control module operably coupled with the at least one virtual world environment, wherein the at least one control module implements the at least one supplemental oversight procedure to at least partially limit access to at least one virtual world item by the at least one designated virtual character based at least in part on the real world school-related grade information associated with the at least one real world user corresponding to the at least one designated virtual character indicating at least one grade that is below at least one specified value.

14. The system of claim 13, wherein the at least one control module operably coupled with the at least one virtual world environment, wherein the at least one control module implements the at least one supplemental oversight procedure to at least partially limit access to at least one virtual world item by the at least one designated virtual character based at least in part on the real world school-related grade information associated with the at least one real world user corresponding to the at least one designated virtual character indicating at least one grade that is below at least one specified value comprises:
   at least one control module operably coupled with the at least one virtual world environment, wherein the at least one control module implements the at least one supplemental oversight procedure including obtaining updated real world school-related grade information associated with the at least one real world user corresponding to the at least one designated virtual character, determining, using the updated real world school-related grade information associated with the at least one real world user corresponding to the at least one designated virtual character, whether at least one grade is below at least one specified value, and, if at least one grade is below at least one specified value, at least partially limiting access to at least one virtual world item by the at least one designated virtual character.

15. The system of claim 14, further comprising:
at least one feedback module configured communicate informational status information associated with the at least one designated virtual world character to at least one email account associated with the at least one real world auxiliary supervisory entity.

* * * * *